(12) United States Patent
Stevens et al.

(10) Patent No.: US 9,348,649 B2
(45) Date of Patent: *May 24, 2016

(54) NETWORK RESOURCE MANAGEMENT SYSTEM UTILIZING PHYSICAL NETWORK IDENTIFICATION FOR CONVERGING OPERATIONS

(71) Applicant: International Business Machines Corporation, Armonk, NY (US)

(72) Inventors: Jerry W Stevens, Raleigh, NC (US); Patricia G Driever, Poughkeepsie, NY (US); Constantinos Kassimis, Research Triangle Park, NC (US); Gary O. McAfee, Research Triangle Park, NC (US); Alexandra Winter, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 300 days.

This patent is subject to a terminal disclaimer.

(21) Appl. No.: 13/948,151

(22) Filed: Jul. 22, 2013

(65) Prior Publication Data

US 2015/0026287 A1  Jan. 22, 2015

(51) Int. Cl.
*G06F 15/167* (2006.01)
*G06F 15/177* (2006.01)
(Continued)

(52) U.S. Cl.
CPC .............. *G06F 9/50* (2013.01); *G06F 9/45533* (2013.01); *G06F 9/5077* (2013.01); *G06F 15/167* (2013.01); *G06F 17/30286* (2013.01); *H04L 47/70* (2013.01); *G06F 2009/45595* (2013.01)

(58) Field of Classification Search
CPC ............ H04L 41/0206; H04L 41/0213; H04L 41/0803; H04L 41/0869; H04L 41/5035; H04L 41/5077; H04L 43/0882; H04L 43/0829
USPC .......... 709/212, 220, 225, 216; 711/118–119, 711/123, 136, 144
See application file for complete search history.

(56) References Cited

U.S. PATENT DOCUMENTS 5,257,379 A   10/1993  Cwiakala
7,275,175 B2   9/2007  Cardona et al.
(Continued)

OTHER PUBLICATIONS

Buonadonna, "Queue-Pair IP: A Hybrid Architecture for System Area Networks"; Intel Research Berkeley; Mar. 2002; pp. 1-12.
(Continued)

*Primary Examiner* — Farzana Huq
(74) *Attorney, Agent, or Firm* — Stephen R. Tkacs; Stephen J. Walder, Jr.; Parashos Kalaitzis

(57) ABSTRACT

The disclosed network resource management system employs a hardware configuration management (HCM) information handling system (IHS) that may couple to a single administered IHS or to multiple administered IHSs via an administrative network. An HCM tool in the HCM IHS may generate, modify and store hardware configuration information, including physical network identifications (PNet IDs), in an HCM database and share the HCM database with the administered IHSs. The administered IHS may be a remote direct memory access (RDMA) enabled network interface controller (RNIC) converging IHS. An RNIC converging tool may extract hardware configuration information, including PNet IDs, from the HCM database. The RNIC converging tool may utilize the hardware configuration information, including PNet IDs, to enable the RNIC converging IHS to communicate over a network with RDMA protocols.

18 Claims, 34 Drawing Sheets

(51) Int. Cl.
*G06F 15/173* (2006.01)
*G06F 12/00* (2006.01)
*G06F 13/00* (2006.01)
*G06F 13/28* (2006.01)
*G06F 9/50* (2006.01)
*G06F 17/30* (2006.01)
*G06F 9/455* (2006.01)
*H04L 12/911* (2013.01)

(56) References Cited

U.S. PATENT DOCUMENTS

| | | | |
|---|---|---|---|
| 7,940,706 | B2 | 5/2011 | Elko |
| 8,036,229 | B2 | 10/2011 | Banerjee |
| 2002/0059427 | A1 | 5/2002 | Tamaki et al. |
| 2006/0282529 | A1 | 12/2006 | Nordin |
| 2007/0002738 | A1 | 1/2007 | McGee |
| 2011/0085563 | A1 | 4/2011 | Kotha et al. |
| 2011/0093849 | A1* | 4/2011 | Chawla ............... H04L 41/0816 718/1 |
| 2011/0216669 | A1 | 9/2011 | Chawla et al. |
| 2012/0317289 | A1* | 12/2012 | Fitzpatrick ......... H04L 12/4641 709/226 |
| 2013/0290541 | A1* | 10/2013 | Hatasaki ............... G06F 9/5077 709/226 |
| 2014/0010109 | A1* | 1/2014 | Himura .................. H04L 41/12 370/254 |
| 2014/0213177 | A1 | 7/2014 | Terwilliger et al. |
| 2015/0012606 | A1* | 1/2015 | Gadipudi ................. G06F 9/00 709/212 |
| 2015/0026313 | A1* | 1/2015 | Chawla ............... H04L 41/5035 709/220 |
| 2015/0026314 | A1 | 1/2015 | Stevens et al. |
| 2015/0026339 | A1 | 1/2015 | Stevens et al. |
| 2015/0026677 | A1 | 1/2015 | Stevens et al. |
| 2015/0339151 | A1 | 11/2015 | Stevens et al. |
| 2015/0339161 | A1 | 11/2015 | Stevens et al. |
| 2015/0339251 | A1 | 11/2015 | Stevens et al. |
| 2015/0341354 | A1 | 11/2015 | Stevens et al. |

OTHER PUBLICATIONS

Challa, "Comparative Study of Axial Flux Permanent Magnet Brushless DC Motor Operating With the Winding Connected in Single-Phase and Two-Phase System"; A Thesis Submitted to the Graduate Faculty of the Louisiana State University and Agricultural and Mechanical College in the Department of Electrical Engineering; Aug. 2006; pp. 1-8.
Ching, "Link Aggregation"; Thecus Blog; Jan. 14, 2013; pp. 1-5.
Dante, "Get Ready for a New Dimension in Computing."; System z Technical Education; IBM Advanced Technical Skills in Gaithersburg, Maryland; 2011; pp. 1-144.
Deek, The Impact of Channel Bonding on 802.11n Network Management; ACM CoNEXT 2011, Dec. 6-9, 2011, Tokyo, Japan; pp. 1-12.
Feldman, "RoCE: An Ethernet-InfiniBand Love Story"; HPCwire, Apr. 22, 2010; pp. 1-11.
Filliater, "InfiniBand Technology and Usage Update"; Mellanox Technologies; SDC Storage Developer Conference, SNIA, Santa Clara; 2012; pp. 1-48.
Fischer, "Link Aggregation"; ADMIN Network & Security; © 2013 Linux New Media USA, LLC; pp. 1-4.
Fuller, "Sub-microsecond interconnects for processor connectivity—The opportunity"; EDN Networks, May 22, 2013; pp. 1-10.
Guijarro; "Experience and Lessons learnt from running High Availability Databases on Network Attached Storage"; International Conference on Computing in High Energy and Nuclear Physics (CHEP'07); Journal of Physics: Conference Series 119; 2008, IOP Publishing Ltd; pp. 1-10.
Hendel, Link Aggregation Trunking; Sun Microsystems IEEE 802—Tutorial Session Nov. 11, 1997; pp. 1-9.
Intel, "PCI-SIG SR-IOV Primer"; An Introduction to SR-IOV Technology; Jan. 2011; pp. 1-28.
Lowe, "What is SR-IOV?"; The weblog of an IT pro specializing in virtualization, storage, and servers; blog.scottlowe.org; Dec. 2, 2009; pp. 1-5.
Mellanox1, "RoCE vs. iWARP Competitive Analysis Brief"; Whitepaper; © Copyright 2010; Mellanox Technologies; www.mellanox.com; Nov. 2010; pp. 1-3.
Mellanox2, "InfiniBand Architecture Overview Back to Basic"; www.mellanox.com; © 2009 Mellanox Technologies; pp. 1-38.
Microsoft1, Overview of Single Root I/O Virtualization (SR-IOV); © 2013 Microsoft, Build date Jun. 19, 2013; p. 1.
Microsoft2, "SR-IOV Architecture"; © 2013 Microsoft. Build date Jun. 19, 2013; pp. 1-3.
Microsoft3, "Overview of SR-IOV Data Paths"; © 2013 Microsoft; Build date Jun. 19, 2013; pp. 1-2.
QLogic, "NIC Partitioning and SR-IOV"; Technology Brief; 2012; pp. 1-4.
Recio, "RDMA enabled NIC (RNIC) Verbs Overview"; dated Apr. 29, 2003; available from http://www.rdmaconsortium.org/home/RNIC_Verbs_Overview2.pdf, pp. 1-28.
Rouse, "PCI Express (PCIe or PCI-E)"; SearchDataCenter.com; Mar. 28, 2008; p. 1.
Singh, "I/O Configuration Using z/OS HCD and HCM"; ibm.com/redbooks; Apr. 2010; pp. 1-462.
Stevens, "Network Virtualization, Management, and Security"; IBM zEnterprise System; © 2010 IBM Corporation; pp. 1-40.
Torres, "Everything You Need to Know About the PCI Express"; Hardware Secrets; Jul. 12, 2012; pp. 1-8.
Wiki, "RDMA over Converged Ethernet"; From Wikipedia; http://en.wikipedia.org/w/index.php? title=RDMA_over_Converged_Ethernet&oldid=564939508; last modified on Jul. 19, 2013; pp. 1-3.
Woodruff, "Introduction to the InfiniBand Core Software"; Proceedings of the Linux Symposium, vol. Two; Ottawa, Ontario Canada; Jul. 20-23, 2005; pp. 1-14.
ZCopy, "Quick Concepts Part 1—Introduction to RDMA"; Education and Sample Code for RDMA Programming; Powered by WordPress.com; Posted on Oct. 8, 2010; pp. 1-6.
U.S. Appl. No. 13/948,157.
U.S. Appl. No. 13/948,161.
U.S. Appl. No. 13/948,163.
U.S. Appl. No. 14/814,874.
U.S. Appl. No. 14/814,949.
U.S. Appl. No. 14/815,096.
U.S. Appl. No. 14/815,191.

* cited by examiner

| MSN | PID | LID | TYPE | LPAR ACCESS LIST | | | | | | | PNET ID 1 | PNET ID 2 | |
|---|---|---|---|---|---|---|---|---|---|---|---|---|---|
| 0000880B | 0008 | 00F0 | 0087 | 01 | 02 | 03 | | | | | NETA | NETA | 111 |
| 0000880B | 0020 | 0200 | 0008 | 01 | 02 | 03 | | | | | NETA | NETA | 112 |
| 0000880B | 0009 | 00F4 | 0087 | 04 | 05 | | | | | | NETB | NETB | 116 |
| 0000880B | 0021 | 0204 | 0008 | 04 | 05 | | | | | | NETB | NETB | 117 |
| 0000880B | 020A | 00F7 | 0087 | 06 | 07 | | | | | | NETC | NETC | 121 |
| 0000880B | 0222 | 0207 | 0008 | 06 | 07 | | | | | | NETC | NETC | 122 |
| 0000880B | 0111 | 04C0 | 008D | 01 | 02 | 03 | 04 | 05 | 06 | 07 | | | 129-1 |
| 0000880B | 0111 | 04C1 | 008D | 01 | 02 | 03 | 04 | 05 | 06 | 07 | | | 129-2 |
| 0000880B | 0111 | 04C2 | 008D | 01 | 02 | 03 | 04 | 05 | 06 | 07 | | | 129-3 |
| 0000880B | 0111 | 04C3 | 008D | 01 | 02 | 03 | 04 | 05 | 06 | 07 | | | 129-4 |
| 0000880B | 0111 | 04C4 | 008D | 01 | 02 | 03 | 04 | 05 | 06 | 07 | | | 129-5 |
| 0000880B | 0111 | 04C5 | 008D | 01 | 02 | 03 | 04 | 05 | 06 | 07 | | | 129-6 |
| 0000880B | 0111 | 04C6 | 008D | 01 | 02 | 03 | 04 | 05 | 06 | 07 | | | 129-7 |
| 8A0024FC | 0007 | 00B1 | 0087 | | | | | | | | NETA | NETA | 114 |
| 8A0024FC | 0012 | 00C6 | 0008 | | | | | | | | NETA | NETA | 115 |
| 578A7CE6 | 005A | 0200 | 0087 | | | | | | | | NETB | NETB | 119 |
| 578A7CE6 | 0402 | 001C | 0008 | | | | | | | | NETB | NETB | 120 |
| 578A7CE6 | 005B | 0201 | 0087 | | | | | | | | NETC | NETC | 124 |
| 578A7CE6 | 0444 | 001D | 0008 | | | | | | | | NETC | NETC | 125 |
| A453E85C | 0002 | 0105 | 0087 | | | | | | | | NETC | NETC | 126 |
| A453E85C | 0005 | 00A2 | 0008 | | | | | | | | NETC | NETC | 127 |

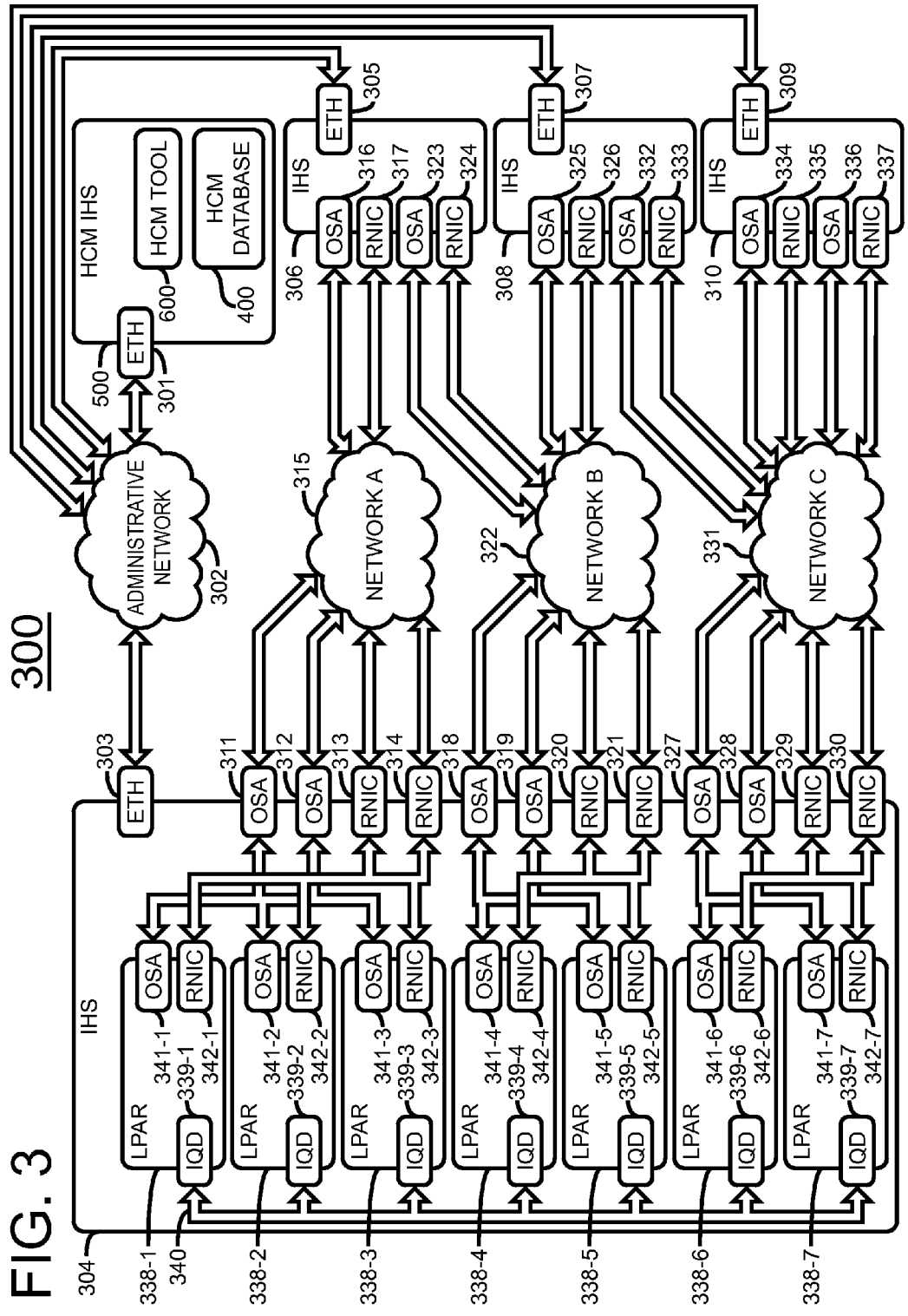

| MSN | PID | LID | TYPE | LPAR ACCESS LIST | | | | | | | PNET ID 1 | PNET ID 2 | |
|---|---|---|---|---|---|---|---|---|---|---|---|---|---|
| 000F880A | 0008 | 00F0 | 0087 | 01 | 02 | 03 | | | | | NETA | NETA | 311 |
| 000F880A | 0009 | 00F1 | 0087 | 01 | 02 | 03 | | | | | NETA | NETA | 312 |
| 000F880A | 020A | 0010 | 0008 | 01 | 02 | 03 | | | | | NETA | NETA | 313 |
| 000F880A | 020B | 0011 | 0008 | 01 | 02 | 03 | | | | | NETA | NETA | 314 |
| 000F880A | 0330 | 00F5 | 0087 | 04 | 05 | | | | | | NETB | NETB | 318 |
| 000F880A | 0331 | 00F6 | 0087 | 04 | 05 | | | | | | NETB | NETB | 319 |
| 000F880A | 020C | 0015 | 0008 | 04 | 05 | | | | | | NETB | NETB | 320 |
| 000F880A | 020D | 0016 | 0008 | 04 | 05 | | | | | | NETB | NETB | 321 |
| 000F880A | 0111 | 00F9 | 0087 | 06 | 07 | | | | | | NETC | NETC | 327 |
| 000F880A | 0112 | 00FA | 0087 | 06 | 07 | | | | | | NETC | NETC | 328 |
| 000F880A | 020E | 0019 | 0008 | 06 | 07 | | | | | | NETC | NETC | 329 |
| 000F880A | 020F | 0020 | 0008 | 06 | 07 | | | | | | NETC | NETC | 330 |
| 000F880A | 0222 | 06D0 | 008D | 01 | 02 | 03 | 04 | 05 | 06 | 07 | | | 339-1 |
| 000F880A | 0222 | 06D1 | 008D | 01 | 02 | 03 | 04 | 05 | 06 | 07 | | | 339-2 |
| 000F880A | 0222 | 06D2 | 008D | 01 | 02 | 03 | 04 | 05 | 06 | 07 | | | 339-3 |
| 000F880A | 0222 | 06D3 | 008D | 01 | 02 | 03 | 04 | 05 | 06 | 07 | | | 339-4 |
| 000F880A | 0222 | 06D4 | 008D | 01 | 02 | 03 | 04 | 05 | 06 | 07 | | | 339-5 |
| 000F880A | 0222 | 06D5 | 008D | 01 | 02 | 03 | 04 | 05 | 06 | 07 | | | 339-6 |
| 000F880A | 0222 | 06D6 | 008D | 01 | 02 | 03 | 04 | 05 | 06 | 07 | | | 339-7 |
| A467E85D | 0005 | 00D1 | 0087 | | | | | | | | NETA | NETA | 316 |
| A467E85D | 0016 | 0CB1 | 0008 | | | | | | | | NETA | NETA | 317 |
| A467E85D | 0006 | 00D2 | 0087 | | | | | | | | NETB | NETB | 323 |
| A467E85D | 0017 | 0CB2 | 0008 | | | | | | | | NETB | NETB | 324 |
| 007A0052 | 00A1 | 00F0 | 0087 | | | | | | | | NETB | NETB | 325 |
| 007A0052 | 00D1 | 00F1 | 0008 | | | | | | | | NETB | NETB | 326 |
| 007A0052 | 00A2 | 00F2 | 0087 | | | | | | | | NETC | NETC | 332 |
| 007A0052 | 00D2 | 00F3 | 0008 | | | | | | | | NETC | NETC | 333 |
| C6200070 | 0016 | 00CA | 0087 | | | | | | | | NETC | NETC | 334 |
| C6200070 | 0032 | 00CB | 0008 | | | | | | | | NETC | NETC | 335 |
| C6200070 | 0022 | 00CC | 0087 | | | | | | | | NETC | NETC | 336 |
| C6200070 | 000A | 00CD | 0008 | | | | | | | | NETC | NETC | 337 |

| MSN | PID | LID | TYPE | LPAR ACCESS LIST | | | | | | PNET ID 1 | PNET ID 2 | |
|---|---|---|---|---|---|---|---|---|---|---|---|---|
| 00D5380C | 0008 | 00F0 | 0087 | 01 | 02 | 03 | | | | NETA | NETA | ⟋711 |
| 00D5380C | 0009 | 02F0 | 0008 | 01 | 02 | 03 | | | | NETA | NETA | ⟋712 |
| 00D5380C | 020A | 00F4 | 0087 | 04 | 05 | | | | | NETB | NETB | ⟋716 |
| 00D5380C | 020B | 02F4 | 0008 | 04 | 05 | | | | | NETB | NETB | ⟋717 |
| 00D5380C | 0330 | 00F7 | 0087 | 06 | 07 | | | | | NETC | NETC | ⟋721 |
| 00D5380C | 0331 | 02F7 | 0008 | 06 | 07 | | | | | NETC | NETC | ⟋722 |
| 0007880A | 020C | 0022 | 0087 | | | | | | | NETA | NETA | ⟋714 |
| 0007880A | 020D | 0023 | 0008 | | | | | | | NETA | NETA | ⟋715 |
| 003F230A | 0111 | 0DA1 | 0087 | | | | | | | NETB | NETB | ⟋719 |
| 003F230A | 0112 | 0DA2 | 0008 | | | | | | | NETB | NETB | ⟋720 |
| 003F230A | 020E | 0024 | 0087 | | | | | | | NETC | NETC | ⟋724 |
| 003F230A | 020F | 0025 | 0008 | | | | | | | NETC | NETC | ⟋725 |
| 668A2B01 | 0117 | 06D0 | 0087 | | | | | | | NETC | NETC | ⟋726 |

FIG. 10       1000

| MSN | PID | LID | TYPE | LPAR ACCESS LIST | | | | | | | | PNET ID 1 | PNET ID 2 | |
|---|---|---|---|---|---|---|---|---|---|---|---|---|---|---|
| 000F3801 | 0011 | 00F0 | 0087 | 01 | 02 | 03 | 04 | 08 | 09 | 0A | 0B | NETA | NETA | 909 |
| 000F3801 | 0020 | 05C0 | 0008 | 01 | 02 | 03 | 04 | 08 | 09 | 0A | 0B | NETA | NETA | 910 |
| 000F3801 | 0012 | 00F9 | 0087 | 04 | 05 | 06 | 07 | | | | | NETA | NETA | 911 |
| 000F3801 | 0021 | 05C9 | 0008 | 04 | 05 | 06 | 07 | | | | | NETA | NETA | 912 |
| 000F3801 | 0013 | 00FE | 0087 | 03 | | | | | | | | NETA | NETA | 913 |
| 000F3801 | 0022 | 05CE | 0008 | 03 | | | | | | | | NETA | NETA | 914 |
| 000F3801 | 0014 | 0100 | 0087 | 02 | 04 | 06 | 08 | 0A | | | | NETA | NETA | 915 |
| 000F3801 | 0023 | 0600 | 0008 | 02 | 04 | 06 | 08 | 0A | | | | NETA | NETA | 916 |
| 000F3801 | 0015 | 0106 | 0087 | 01 | 02 | 03 | 04 | 05 | 06 | 07 | 08 | NETA | NETA | 917 |
| 000F3801 | 0016 | 010F | 0087 | 01 | 02 | 03 | 04 | 07 | 09 | 0A | 0B | NETA | NETA | 918 |
| 000F3801 | 0017 | 0118 | 0087 | 01 | 03 | 05 | 07 | 08 | 09 | 0A | 0B | NETA | NETA | 919 |
| 000F3801 | 0018 | 0120 | 0087 | 01 | 02 | 03 | 04 | 05 | 06 | 07 | 08 | NETB | NETB | 925 |
| 000F3801 | 0024 | 0606 | 0008 | 01 | 02 | 03 | 04 | 05 | 06 | 07 | 08 | NETB | NETB | 926 |
| 000F3801 | 0019 | 0129 | 0087 | 09 | 0A | 0B | | | | | | NETB | NETB | 927 |
| 000F3801 | 0025 | 060F | 0008 | 09 | 0A | 0B | | | | | | NETB | NETB | 928 |
| 000F3801 | 001A | 012D | 0087 | 01 | 03 | 05 | 07 | | | | | NETB | NETB | 929 |
| 000F3801 | 0026 | 0613 | 0008 | 01 | 03 | 05 | 07 | | | | | NETB | NETB | 930 |
| 000F3801 | 0027 | 0618 | 0008 | 01 | 02 | 03 | 04 | 05 | 06 | 07 | 08 | NETB | NETB | 931 |
| 000F3801 | 0028 | 0621 | 0008 | 01 | 02 | 03 | 04 | 07 | 09 | 0A | 0B | NETB | NETB | 932 |
| 000F3801 | 0029 | 062A | 0008 | 01 | 02 | 03 | 04 | 05 | 06 | 07 | 08 | NETB | NETB | 933 |
| 000F3801 | 002A | 0633 | 0008 | 01 | 02 | 03 | 04 | 07 | 09 | 0A | 0B | NETB | NETB | 934 |
| 03006FF7 | 0101 | 0F01 | 0087 | | | | | | | | | NETA | NETA | 921 |
| 03006FF7 | 0201 | 0F02 | 0008 | | | | | | | | | NETA | NETA | 922 |
| 03006FF7 | 0102 | 0F03 | 0087 | | | | | | | | | NETA | NETA | 923 |
| 03006FF7 | 0202 | 0F04 | 0008 | | | | | | | | | NETA | NETA | 924 |
| D832900A | 0055 | DD06 | 0087 | | | | | | | | | NETB | NETB | 936 |
| D832900A | 0057 | DD07 | 0008 | | | | | | | | | NETB | NETB | 937 |
| D832900A | 0056 | DD08 | 0087 | | | | | | | | | NETB | NETB | 938 |
| D832900A | 0058 | DD09 | 0008 | | | | | | | | | NETB | NETB | 939 |

FIG. 14        1400

| MSN | PID | LID | TYPE | LPAR ACCESS LIST | | | | | | | PNET ID 1 | PNET ID 2 | |
|---|---|---|---|---|---|---|---|---|---|---|---|---|---|
| 0A0A0B11 | 0006 | 00F1 | 0087 | 01 | 02 | 03 | | | | | NETA | NETA | 1311 |
| 0A0A0B11 | 0007 | 00F5 | 0087 | 04 | 05 | | | | | | NETB | NETB | 1314 |
| 0A0A0B11 | 0008 | 00F8 | 0087 | 06 | 07 | | | | | | NETC | NETC | 1317 |
| 0A0A0B11 | 0112 | 04C1 | 008D | 01 | 02 | 03 | | | | | NETA | | 1321-1 |
| 0A0A0B11 | 0112 | 04C2 | 008D | 01 | 02 | 03 | | | | | NETA | | 1321-2 |
| 0A0A0B11 | 0112 | 04C3 | 008D | 01 | 02 | 03 | | | | | NETA | | 1321-3 |
| 0A0A0B11 | 0113 | 04C5 | 008D | 04 | 05 | | | | | | NETB | | 1321-4 |
| 0A0A0B11 | 0113 | 04C6 | 008D | 04 | 05 | | | | | | NETB | | 1321-5 |
| 0A0A0B11 | 0114 | 04C8 | 008D | 06 | 07 | | | | | | NETC | | 1321-6 |
| 0A0A0B11 | 0114 | 04C9 | 008D | 06 | 07 | | | | | | NETC | | 1321-7 |
| 0000F12A | 0022 | 0DA1 | 0087 | | | | | | | | NETA | NETA | 1313 |
| DDD32AA | 0054 | 00C1 | 0087 | | | | | | | | NETB | NETB | 1316 |
| 000000B2 | 0001 | 0DD4 | 0087 | | | | | | | | NETC | NETC | 1319 |

| MSN | PID | LID | TYPE | LPAR ACCESS LIST | | | | | | | PNET ID 1 | PNET ID 2 | |
|---|---|---|---|---|---|---|---|---|---|---|---|---|---|
| 03F00A21 | 0006 | 00F1 | 0087 | 01 | 02 | 03 | | | | | NETA | NETA | 1509 |
| 03F00A21 | 0007 | 00F5 | 0087 | 04 | 05 | 06 | 07 | | | | NETB | NETB | 1512 |
| 03F00A21 | 0111 | 04C0 | 008D | 01 | 02 | 03 | | | | | NETA | | 1516-1 |
| 03F00A21 | 0111 | 04C1 | 008D | 01 | 02 | 03 | | | | | NETA | | 1516-2 |
| 03F00A21 | 0111 | 04C2 | 008D | 01 | 02 | 03 | | | | | NETA | | 1516-3 |
| 03F00A21 | 0112 | 04C4 | 008D | 04 | 05 | 06 | 07 | | | | NETB | | 1516-4 |
| 03F00A21 | 0112 | 04C5 | 008D | 04 | 05 | 06 | 07 | | | | NETB | | 1516-5 |
| 03F00A21 | 0112 | 04C6 | 008D | 04 | 05 | 06 | 07 | | | | NETB | | 1516-6 |
| 03F00A21 | 0112 | 04C7 | 008D | 04 | 05 | 06 | 07 | | | | NETB | | 1516-7 |
| 31400ADA | 0031 | 00F3 | 0087 | | | | | | | | NETA | NETA | 1511 |
| 2338282D | 0022 | 0DA1 | 0087 | 01 | 02 | | | | | | NETB | NETB | 1514 |
| 2338282D | 0200 | 06D1 | 008D | 01 | 02 | | | | | | NETB | | 1524-1 |
| 2338282D | 0200 | 06D2 | 008D | 01 | 02 | | | | | | NETB | | 1524-2 |

| MSN | PID | LID | TYPE | LPAR ACCESS LIST | | | | | | PNET ID 1 | PNET ID 2 | |
|---|---|---|---|---|---|---|---|---|---|---|---|---|
| 0000FFA1 | 0006 | 00F1 | 0087 | 01 | 02 | 03 | | | | NETA | NETA | ←1911 |
| 0000FFA1 | 0007 | 00F5 | 0087 | 01 | 02 | 03 | | | | NETA | NETA | ←1912 |
| 0000FFA1 | 0111 | 04C0 | 0008 | 01 | 02 | 03 | | | | NETA | NETA | ←1913 |
| 0000FFA1 | 0112 | 04C4 | 0008 | 01 | 02 | 03 | | | | NETA | NETA | ←1914 |
| 0000FFA1 | 0008 | 00F9 | 0087 | 04 | 05 | | | | | NETB | NETB | ←1920 |
| 0000FFA1 | 0009 | 00FC | 0087 | 04 | 05 | | | | | NETB | NETB | ←1921 |
| 0000FFA1 | 0113 | 04C8 | 0008 | 04 | 05 | | | | | NETB | NETB | ←1922 |
| 0000FFA1 | 0114 | 04CB | 0008 | 04 | 05 | | | | | NETB | NETB | ←1923 |
| 0000FFA1 | 000A | 00FF | 0087 | 06 | 07 | | | | | NETC | NETC | ←1929 |
| 0000FFA1 | 000B | 0102 | 0087 | 06 | 07 | | | | | NETC | NETC | ←1930 |
| 0000FFA1 | 0115 | 04CE | 0008 | 06 | 07 | | | | | NETC | NETC | ←1931 |
| 0000FFA1 | 0116 | 04D1 | 0008 | 06 | 07 | | | | | NETC | NETC | ←1932 |
| 00DDA254 | 0001 | 00A3 | 0087 | | | | | | | NETA | NETA | ←1916 |
| 00DDA254 | 0003 | 00B1 | 0008 | | | | | | | NETA | NETA | ←1917 |
| 00DDA254 | 0002 | 00A4 | 0087 | | | | | | | NETA | NETA | ←1918 |
| 00DDA254 | 0004 | 00B2 | 0008 | | | | | | | NETA | NETA | ←1919 |
| FAF33922 | 0023 | 00F6 | 0087 | | | | | | | NETB | NETB | ←1925 |
| FAF33922 | 0032 | 00FF | 0008 | | | | | | | NETB | NETB | ←1926 |
| FAF33922 | 0024 | 00F7 | 0087 | | | | | | | NETB | NETB | ←1927 |
| FAF33922 | 0033 | 0100 | 0008 | | | | | | | NETB | NETB | ←1928 |
| 363B77A2 | 0011 | 00C2 | 0087 | | | | | | | NETC | NETC | ←1934 |
| 363B77A2 | 0002 | 0D01 | 0008 | | | | | | | NETC | NETC | ←1935 |
| 363B77A2 | 0012 | 00C3 | 0087 | | | | | | | NETC | NETC | ←1936 |
| 363B77A2 | 0003 | 0D02 | 0008 | | | | | | | NETC | NETC | ←1937 |

FIG. 22      2200

| MSN | PID | LID | TYPE | LPAR ACCESS LIST | | | | | | PNET ID 1 | PNET ID 2 | |
|---|---|---|---|---|---|---|---|---|---|---|---|---|
| 0DC0FFB2 | 0001 | 00F1 | 0087 | 01 | 02 | 03 | | | | NETA | NETA | ⟋2109 |
| 0DC0FFB2 | 0002 | 00F5 | 0087 | 01 | 02 | 03 | | | | NETA | NETA | ⟋2110 |
| 0DC0FFB2 | 0111 | 0FF1 | 0008 | 01 | 02 | 03 | | | | NETA | NETA | ⟋2111 |
| 0DC0FFB2 | 0112 | 0FF5 | 0008 | 01 | 02 | 03 | | | | NETA | NETA | ⟋2112 |
| 0DC0FFB2 | 0003 | 00F9 | 0087 | 01 | 02 | 03 | | | | NETA | NETA | ⟋2113 |
| 0DC0FFB2 | 0113 | 0FF9 | 0008 | 01 | 02 | 03 | | | | NETA | NETA | ⟋2114 |
| 0DC0FFB2 | 0004 | 00FD | 0087 | 04 | 05 | | | | | NETB | NETB | ⟋2120 |
| 0DC0FFB2 | 0114 | 0FFD | 0008 | 04 | 05 | | | | | NETB | NETB | ⟋2121 |
| 0DC0FFB2 | 0005 | 0100 | 0087 | 04 | 05 | | | | | NETB | NETB | ⟋2122 |
| 0DC0FFB2 | 0006 | 0103 | 0087 | 04 | 05 | | | | | NETB | NETB | ⟋2123 |
| 0DC0FFB2 | 0115 | 1000 | 0008 | 04 | 05 | | | | | NETB | NETB | ⟋2124 |
| 0DC0FFB2 | 0116 | 1003 | 0008 | 04 | 05 | | | | | NETB | NETB | ⟋2125 |
| 0000D100 | 0033 | 0D01 | 0087 | | | | | | | NETA | NETA | ⟋2116 |
| 0000D100 | 0025 | 0D03 | 0008 | | | | | | | NETA | NETA | ⟋2117 |
| 0000D100 | 0034 | 0D02 | 0087 | | | | | | | NETA | NETA | ⟋2118 |
| 0000D100 | 0026 | 0D04 | 0008 | | | | | | | NETA | NETA | ⟋2119 |
| FFFFA200 | 0011 | 000A | 0087 | 01 | 02 | | | | | NETB | NETB | ⟋2127 |
| FFFFA200 | 0012 | 000B | 0087 | 01 | 02 | | | | | NETB | NETB | ⟋2128 |
| FFFFA200 | 0021 | 0F01 | 0008 | 01 | 02 | | | | | NETB | NETB | ⟋2129 |
| FFFFA200 | 0022 | 0F02 | 0008 | 01 | 02 | | | | | NETB | NETB | ⟋2130 |

FIG. 26   2600

| MSN | PID | LID | TYPE | LPAR ACCESS LIST | | | | | | | PNET ID 1 | PNET ID 2 | |
|---|---|---|---|---|---|---|---|---|---|---|---|---|---|
| 0CCC0AB2 | 0001 | 00F1 | 0087 | 01 | 02 | 03 | | | | | NETA | NETA | 2512 |
| 0CCC0AB2 | 0111 | 00A1 | 0008 | 01 | 02 | 03 | | | | | NETA | NETA | 2513 |
| 0CCC0AB2 | 0002 | 00F5 | 0087 | 04 | 05 | | | | | | NETB | NETB | 2517 |
| 0CCC0AB2 | 0112 | 00A5 | 0008 | 04 | 05 | | | | | | NETB | NETB | 2518 |
| 0CCC0AB2 | 0003 | 00F8 | 0087 | 06 | 07 | | | | | | NETC | NETC | 2522 |
| 0CCC0AB2 | 0113 | 00A8 | 0008 | 06 | 07 | | | | | | NETC | NETC | 2523 |
| DFA22601 | 0001 | 00F4 | 0087 | | | | | | | | NETA | NETA | 2515 |
| DFA22601 | 0002 | 00A4 | 0008 | | | | | | | | NETA | NETA | 2516 |
| 33300FB8 | 0001 | 00F5 | 0087 | | | | | | | | NETB | NETB | 2520 |
| 33300FB8 | 0011 | 00F6 | 0008 | | | | | | | | NETB | NETB | 2521 |
| 33300FB8 | 0002 | 00A5 | 0087 | | | | | | | | NETC | NETC | 2525 |
| 33300FB8 | 0012 | 00A6 | 0008 | | | | | | | | NETC | NETC | 2526 |
| 0000FC32 | 0031 | 0D01 | 0087 | | | | | | | | NETC | NETC | 2527 |
| 0000FC32 | 0033 | 0D03 | 0008 | | | | | | | | NETC | NETC | 2528 |

FIG. 27   2700

| PNET ID | MSN | LPAR ACCESS LIST | | | | | | | |
|---|---|---|---|---|---|---|---|---|---|
| NETB | 0CCC0AB2 | 04 | 05 | | | | | | |
| NETB | 33300FB8 | | | | | | | | |
| NETC | 0CCC0AB2 | 07 | | | | | | | |
| NETC | 33300FB8 | | | | | | | | |
| NETC | 0000FC32 | | | | | | | | |

FIG. 29     2900

| MSN | PID | LID | TYPE | LPAR ACCESS LIST | | | | | | | PNET ID 1 | PNET ID 2 | |
|---|---|---|---|---|---|---|---|---|---|---|---|---|---|
| 000AFA11 | 0001 | 00F1 | 0087 | 01 | 02 | 03 | | | | | NETA | NETA | 2812 |
| 000AFA11 | 0002 | 00F5 | 0087 | 01 | 02 | 03 | | | | | NETA | NETA | 2813 |
| 000AFA11 | 0011 | 00A1 | 0008 | 01 | 02 | 03 | | | | | NETA | NETA | 2814 |
| 000AFA11 | 0012 | 00A5 | 0008 | 01 | 02 | 03 | | | | | NETA | NETA | 2815 |
| 000AFA11 | 0003 | 00F9 | 0087 | 04 | 05 | | | | | | NETB | NETB | 2819 |
| 000AFA11 | 0004 | 00FC | 0087 | 04 | 05 | | | | | | NETB | NETB | 2820 |
| 000AFA11 | 0013 | 00A9 | 0008 | 04 | 05 | | | | | | NETB | NETB | 2821 |
| 000AFA11 | 0014 | 00AC | 0008 | 04 | 05 | | | | | | NETB | NETB | 2822 |
| 000AFA11 | 0005 | 00FF | 0087 | 06 | 07 | | | | | | NETC | NETC | 2830 |
| 000AFA11 | 0006 | 0102 | 0087 | 06 | 07 | | | | | | NETC | NETC | 2831 |
| 000AFA11 | 0015 | 00AF | 0008 | 06 | 07 | | | | | | NETC | NETC | 2832 |
| 000AFA11 | 0016 | 00B2 | 0008 | 06 | 07 | | | | | | NETC | NETC | 2833 |
| 0000FC32 | 0001 | 0D01 | 0087 | | | | | | | | NETA | NETA | 2817 |
| 0000FC32 | 0021 | 0D03 | 0008 | | | | | | | | NETA | NETA | 2818 |
| 0000FC32 | 0002 | 0D02 | 0087 | | | | | | | | NETB | NETB | 2824 |
| 0000FC32 | 0022 | 0D04 | 0008 | | | | | | | | NETB | NETB | 2825 |
| DDDD00AB | 0001 | 0C01 | 0087 | | | | | | | | NETB | NETB | 2826 |
| DDDD00AB | 0011 | 0C03 | 0008 | | | | | | | | NETB | NETB | 2827 |
| DDDD00AB | 0002 | 0C02 | 0087 | | | | | | | | NETB | NETB | 2828 |
| DDDD00AB | 0022 | 0C04 | 0008 | | | | | | | | NETB | NETB | 2829 |
| ACA000F1 | 0001 | 00B1 | 0087 | 01 | 02 | | | | | | NETC | NETC | 2835 |
| ACA000F1 | 0002 | 00B4 | 0087 | 01 | 02 | | | | | | NETC | NETC | 2836 |
| ACA000F1 | 0021 | 00C1 | 0008 | 01 | 02 | | | | | | NETC | NETC | 2837 |
| ACA000F1 | 0022 | 00C4 | 0008 | 01 | 02 | | | | | | NETC | NETC | 2838 |

FIG. 30     3000

| PNET ID | MSN | LPAR ACCESS LIST | | | | | | | |
|---|---|---|---|---|---|---|---|---|---|
| NETB | 000AFA11 | 04 | 05 | | | | | | |
| NETB | 0000FC32 | | | | | | | | |
| NETB | DDDD00AB | | | | | | | | |
| NETC | 000AFA11 | 07 | | | | | | | |
| NETC | ACA000F1 | 02 | | | | | | | |

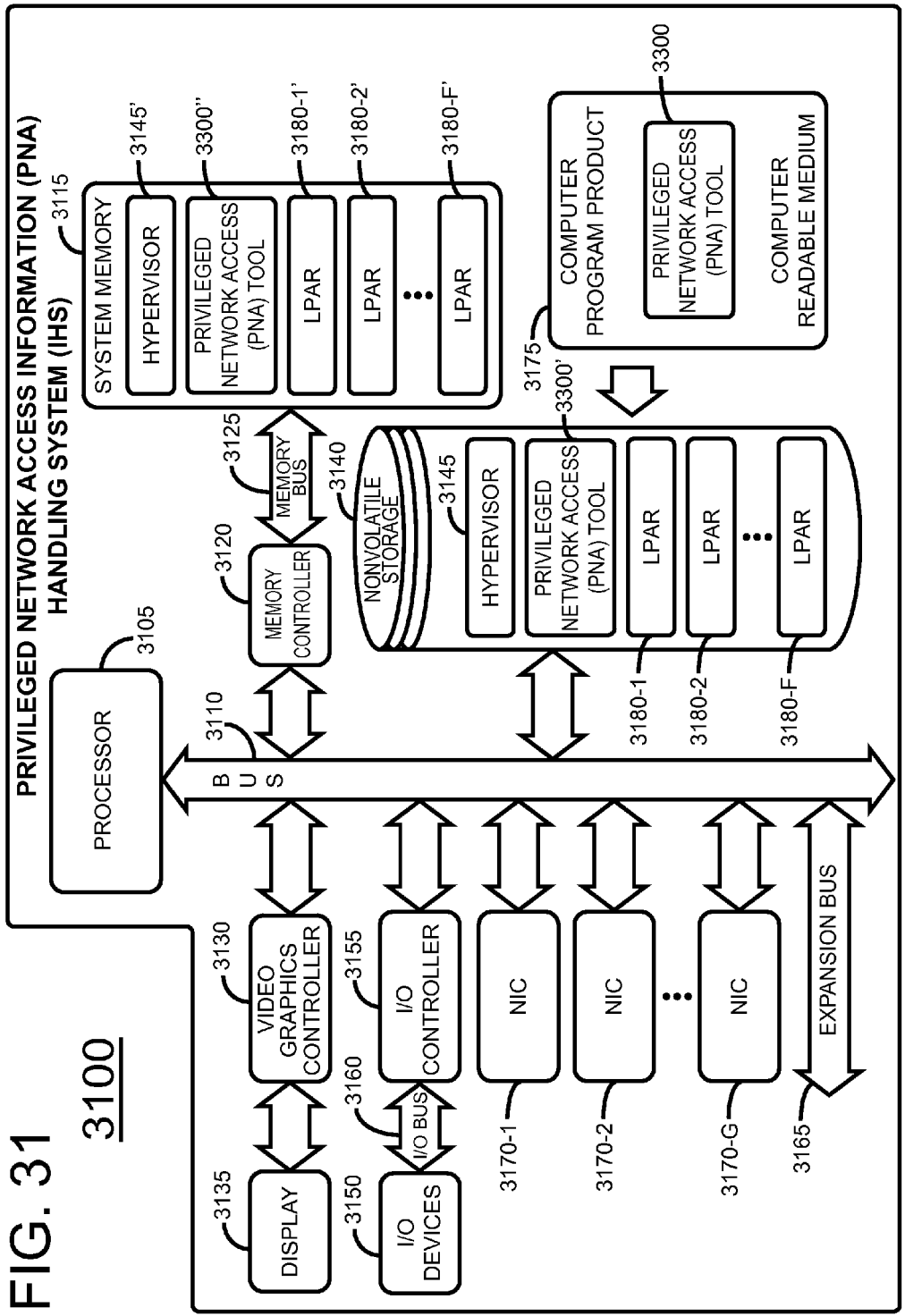

3200

NETWORK RESOURCE MANAGEMENT SYSTEM UTILIZING PHYSICAL NETWORK IDENTIFICATION FOR CONVERGING OPERATIONS

BACKGROUND

The disclosures herein relate generally to information handling systems (IHSs), and more specifically, to IHSs that communicate with other particular IHSs. Multiple IHSs may be connected together via a communication network. Multiple IHSs may also be connected together via multiple communication networks. A hardware configuration management system on a first IHS may share information about the hardware configuration of a second IHS via a communication network.

BRIEF SUMMARY

In one embodiment, a method for converging operations in an information handling system (IHS) is provided. The method includes receiving, by a hypervisor of a first IHS, an HCM database that includes configuration information including physical network identifier (PNet IDs) entries and respective associated physical adapter type entries and respective associated logical partition (LPAR) access information entries. The method also includes transmitting, by the hypervisor of the first IHS, the HCM database to a remote direct memory access network interface controller (RNIC) converging tool. The method further includes extracting, by the RNIC converging tool, configuration information from the HCM database, the configuration information including PNet IDs entries and respective associated physical adapter type entries and respective associated logical partition (LPAR) access information entries, thus providing extracted RNIC converging configuration information. The method still further includes grouping on a per PNet ID basis, by the RNIC converging tool, particular physical adapter types from the extracted RNIC converging configuration information.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 2 depicts one embodiment of an HCM database that may be used in the disclosed HCM system.

FIG. 3 is a block diagram showing another embodiment of the disclosed HCM system utilizing PNet IDs.

FIG. 4 depicts one embodiment of the HCM database that may be used in the disclosed HCM system.

FIG. 8 depicts one embodiment of an HCM database that may be used in the disclosed RNIC converging system.

FIG. 10 depicts one embodiment of the HCM database that may be used in the disclosed RNIC converging system.

FIG. 14 depicts one embodiment of a HCM database that may be used in the disclosed bridging system.

FIG. 16 depicts one embodiment of the HCM database that may be used in the disclosed bridging system.

FIG. 20 depicts one embodiment of a HCM database that may be used in the disclosed load balancing system.

FIG. 22 depicts one embodiment of the HCM database that may be used in the disclosed load balancing system.

FIG. 26 depicts one embodiment of a HCM database that may be used in the disclosed privileged network access (PNA) system.

FIG. 27 depicts one embodiment of a privileged network access management (PNAM) database that may be used in the disclosed privileged network access system.

FIG. 29 depicts one embodiment of the HCM database that may be used in the disclosed privileged network access (PNA) system.

FIG. 30 depicts one embodiment of the PNAM database that may be used in the disclosed privileged network access (PNA) system.

FIG. 31 is a block diagram of a privileged network access IHS that may be used in the disclosed privileged network access (PNA) system.

DETAILED DESCRIPTION

Figure 1:
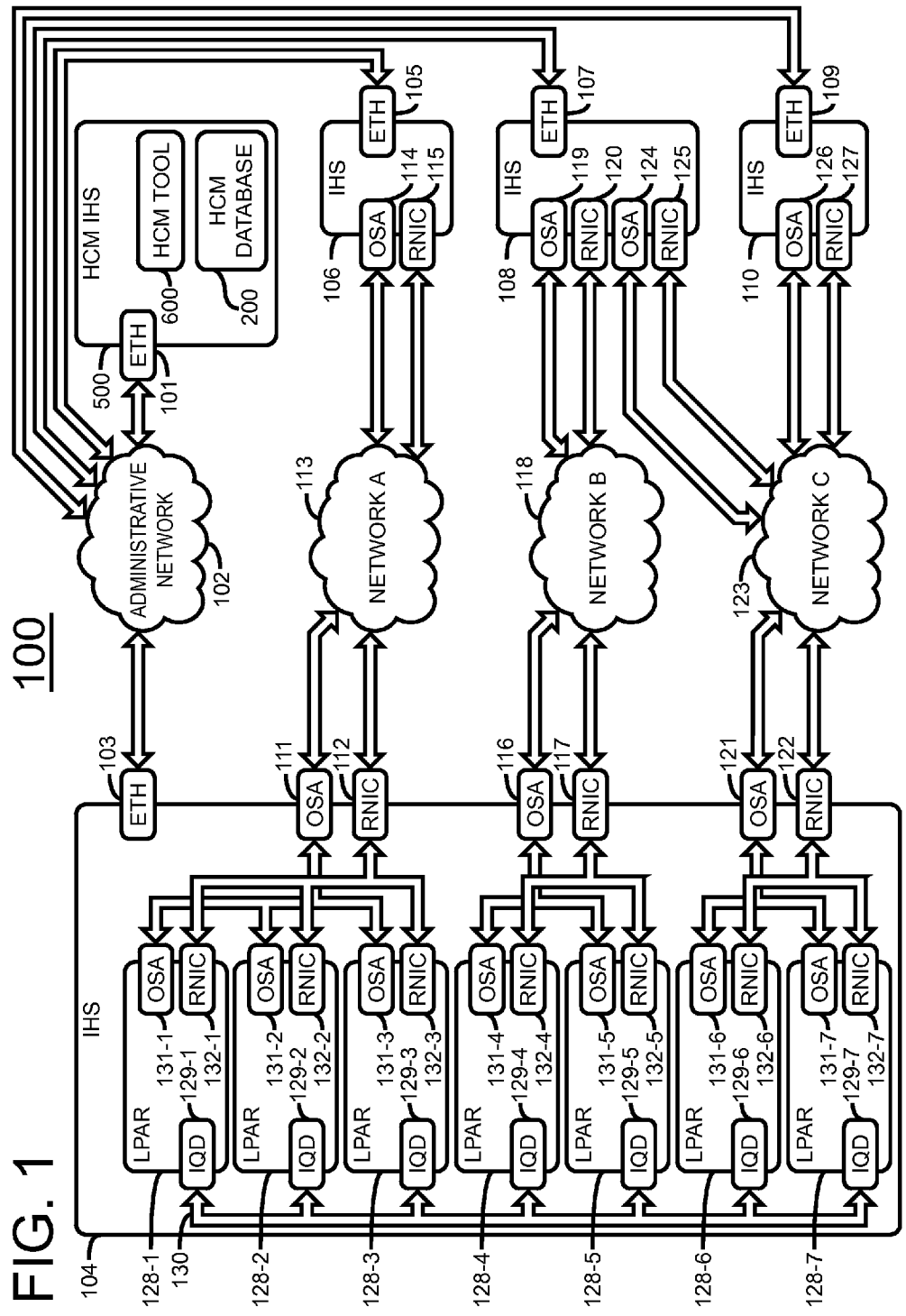
FIG. 1 is a block diagram showing one embodiment of the disclosed hardware configuration management (HCM) system utilizing physical network identifiers (PNet IDs).

The disclosed network resource management system employs a hardware configuration management (HCM) information handling system (IHS) that may couple to a single administered IHS or to multiple administered IHSs via an administrative network. An HCM tool in the HCM IHS may generate, modify and store hardware configuration management information in an HCM database in the HCM IHS. The HCM database stores hardware configuration information that may include, but is not limited to, machine serial numbers (MSNs), physical identifications (PIDs), logical identifications (LIDs), types, logical partition (LPAR) access lists and physical network identifications (PNet IDs). A PNet ID is an identifier that informs an IHS with respect to a particular network to which an adapter of the IHS connects, as explained in more detail below.

In one embodiment, the HCM tool may transmit the HCM database to a hypervisor agent of an administered IHS via the administrative network. In another embodiment, the HCM tool may transmit the HCM database to a hypervisor agent of an administered IHS via a serial connection. The hypervisor agent of the administered IHS may receive the HCM database and allow the hypervisor of the administered IHS to access the HCM database.

In one embodiment, the administered IHS may be a remote direct memory access (RDMA) enabled network interface controller (RNIC) converging IHS. RDMA is remote direct memory access, a technology that enables an IHS to exchange information with another IHS without involving the processor, cache or operating system. The hypervisor of the RNIC converging IHS may transmit the HCM database to an RNIC converging tool in the RNIC converging IHS. The RNIC converging tool may extract hardware configuration information from the HCM database. The RNIC converging tool may utilize the hardware configuration information to enable the RNIC converging IHS to communicate over a network with RDMA protocols, as discussed in more detail below.

In another embodiment, the administered IHS may be a bridging IHS. The hypervisor of the bridging IHS may transmit the HCM database to a bridging tool in the bridging IHS. The bridging tool may extract hardware configuration information from the HCM database. The bridging tool may utilize the hardware configuration information to enable the bridging IHS to bridge networks internal to the bridging IHS with networks external to the bridging IHS, as discussed in more detail below.

In another embodiment, the administered IHS may be a load balancing IHS. The hypervisor of the load balancing IHS may transmit the HCM database to a load balancing tool in the load balancing IHS. The load balancing tool may extract hardware configuration information from the HCM database. The load balancing tool may utilize the hardware configuration information to enable the load balancing IHS to balance adapter loads in the load balancing IHS. The load balancing tool may also utilize the hardware configuration information to enable the load balancing IHS to failover from a failing adapter to other adapters in the load balancing IHS, as discussed in more detail below.

In another embodiment, the administered IHS may be a privileged network access (PNA) IHS. The hypervisor agent of the PNA IHS may receive a privileged network access management (PNAM) database from a PNAM tool in a PNAM IHS via the administrative network. The hypervisor agent of the PNA IHS may allow the hypervisor of the PNA IHS to access the PNAM database. The hypervisor of the PNA IHS may transmit the HCM database and the PNAM database to a PNA tool in the PNA IHS. The PNA tool may extract hardware configuration information from the HCM database and privileged network access information from the PNAM database. The PNA tool may utilize the hardware configuration information and privileged network access information to enable the PNA IHS to limit access to privileged networks, as discussed in more detail below.

I. HCM System

FIG. 1 is a block diagram showing one embodiment of the disclosed hardware configuration management (HCM) system 100 utilizing physical network identifiers (PNet IDs). HCM system 100 may utilize network adapter 101, administrative network 102 and network adapter 103 to couple HCM IHS 500 to administered IHS 104. HCM system 100 may utilize network adapter 101, administrative network 102 and network adapter 105 to couple HCM IHS 500 to administered IHS 106. HCM system 100 may utilize network adapter 101, administrative network 102 and network adapter 107 to couple HCM IHS 500 to administered IHS 108. HCM system 100 may utilize network adapter 101, administrative network 102 and network adapter 109 to couple HCM IHS 500 to administered IHS 110. Administered IHSs 104, 106, 108 and 110 couple via administrative network 102 to HCM IHS 500 to enable HCM IHS 500 to administer HCM database 200 with HCM tool 600 to the administered IHSs.

HCM system 100 may utilize network adapter 111 and/or network adapter 112 via NETWORK A 113 via network adapter 114 and/or network adapter 115 to couple administered IHS 104 to administered IHS 106. HCM system 100 may utilize network adapter 116 and/or network adapter 117 via NETWORK B 118 via network adapter 119 and/or network adapter 120 to couple administered IHS 104 to administered IHS 108. HCM system 100 may utilize network adapter 121 and/or network adapter 122 via NETWORK C 123 via network adapter 124 and/or network adapter 125 to couple administered IHS 104 to administered IHS 108. HCM system 100 may utilize network adapter 121 and/or network adapter 122 via NETWORK C 123 via network adapter 126 and/or network adapter 127 to couple administered IHS 104 to administered IHS 110.

In one embodiment, network adapter 101, 103, 105, 107 and 109 may be Ethernet (ETH) adapters. Network adapters 111, 114, 116, 119, 121, 124 and 126 may be open system adapters (OSAs). Network adapters 112, 115, 117, 120, 122, 125 and network adapter 127 may be remote direct memory access (RDMA) enabled network adapter controllers (RNICs). In one embodiment, administrative network 102, NETWORK A 113, NETWORK B 118 and NETWORK C 123 may provide local area network (LAN) communications and/or wide area network (WAN) communications and/or virtual LAN communications and/or intranet communications and/or Internet communications to structures that couple thereto.

Administered IHS 104 may include a hypervisor (not shown) that may create logical partition (LPAR) 128-1, LPAR 128-2, LPAR 128-3, LPAR 128-4, LPAR 128-5, LPAR 128-6 and LPAR 128-7 in administered IHS 104. LPAR 128-1, LPAR 128-2, LPAR 128-3, LPAR 128-4, LPAR 128-5, LPAR 128-6 and LPAR 128-7 may respectively include virtual internal network adapter 129-1, virtual internal network adapter 129-2, virtual internal network adapter 129-3, virtual internal network adapter 129-4, virtual internal network adapter 129-5, virtual internal network adapter 129-6 and virtual internal network adapter 129-7. Virtual internal network adapter 129-1, 129-2, 129-3, 129-4, 129-5, 129-6 and 129-7 may be internal queued direct (IQD) communication adapters and couple to one another via administered IHS 104 IQD network 130. Administered IHS 104 IQD network 130 may be a channel, i.e., a bus.

LPAR 128-1, LPAR 128-2 and LPAR 128-3 may include virtual network adapter 131-1, virtual network adapter 131-2 and virtual network adapter 131-3, respectively. Virtual network adapter 131-1, virtual network adapter 131-2 and virtual network adapter 131-3 may couple to network adapter 111 via a channel. LPAR 128-4 and LPAR 128-5 may include virtual network adapter 131-4 and virtual network adapter 131-5, respectively. Virtual network adapter 131-4 and virtual network adapter 131-5 may couple to network adapter 116 via a channel. LPAR 128-6 and LPAR 128-7 may include virtual network adapter 131-6 and virtual network adapter 131-7, respectively. Virtual network adapter 131-6 and virtual network adapter 131-7 may couple to network adapter 121 via a channel.

LPAR 128-1, LPAR 128-2 and LPAR 128-3 may include virtual network adapter 132-1, virtual network adapter 132-2 and virtual network adapter 132-3, respectively. Virtual network adapter 132-1, virtual network adapter 132-2 and virtual network adapter 132-3 may couple to network adapter 112 via a channel. LPAR 128-4 and LPAR 128-5 may include virtual network adapter 132-4 and virtual network adapter 132-5, respectively. Virtual network adapter 132-4 and virtual network adapter 132-5 may couple to network adapter 117 via a channel. LPAR 128-6 and LPAR 128-7 may include virtual network adapter 132-6 and virtual network adapter 132-7, respectively. Virtual network adapter 132-6 and virtual network adapter 132-7 may couple to network adapter 122 via a channel.

FIG. 2 depicts one embodiment of HCM database 200 in the disclosed HCM system 100. HCM tool 600 may store the hardware configuration information in HCM database 200 on a per adapter basis. In one embodiment, for each network adapter in HCM system 100, HCM tool 600 may store, from the leftmost column to the rightmost column, the machine serial number (MSN), physical identification (PID), logical identification (LID), adapter type, logical partition (LPAR) access list, physical network identification (PNet ID) for a first port of the network adapter, and the PNet ID for the second port of the network adapter.

In one embodiment, the machine serial number (MSN) may be a four byte hex value that identifies the IHS of the adapter. In one embodiment, the physical identification (PID) may be a physical channel ID (PCHID), i.e., the physical card slot in an I/O drawer of an IHS. In another embodiment, the PID may be a virtual channel identification (VCHID), a virtual ID given because internal adapters do not have a physical card slot in an IHS. In one embodiment, the logical identification (LID) may be a logical channel identification (CHPID). In another embodiment, the LID may be a function identification (FID), i.e. logical identification.

In one embodiment, the adapter type may be a two byte hex value that identifies the type of adapter. For example, OSA, RNIC and IQD adapters may be 0087, 0008, and 008D, respectively. In one embodiment, the logical partition (LPAR) access list may include eight one byte hex values that represent which LPARs in the IHS may access the particular adapter. In one embodiment, PNet ID 1 may include a four-character string identifying the physical network coupled to the first port of the adapter. PNet ID 2 may include a four-character string identifying the physical network coupled to the second port of the adapter.

As shown in HCM database 200, the hardware configuration information of adapter 111 includes MSN of 0000880B, PID of 0008, LID of 00F0, type of 0087, LPAR access list of 01, 02 and 03, and PNet ID 1 and PNet ID 2 of NETA. In other words, adapter 111 is located in physical channel 0008 in administered IHS 104 and may be identified logically by administered IHS 104 as 00F0. Adapter 111 is a physical OSA network adapter and couples to NETWORK A 113 on both ports 1 and 2. LPAR 128-1, 128-2 and 128-3 of administered IHS 104 may access adapter 111 to communicate via NETWORK A 113.

The hardware configuration information of adapter 112 includes MSN of 0000880B, PID of 0020, LID of 0200, type of 0008, LPAR access list of 01, 02 and 03, and PNet ID 1 and PNet ID 2 of NETA. In other words, adapter 112 is located in physical channel 0020 in administered IHS 104 and may be identified logically by administered IHS 104 as 0200. Adapter 112 is a physical RNIC network adapter and couples to NETWORK A 113 on both ports 1 and 2. LPAR 128-1, 128-2 and 128-3 of administered IHS 104 may access adapter 112 to communicate via NETWORK A 113.

The hardware configuration information of adapter 116 includes MSN of 0000880B, PID of 0009, LID of 00F4, type of 0087, LPAR access list of 04 and 05, and PNet ID 1 and PNet ID 2 of NETB. In other words, adapter 116 is located in physical channel 0009 in administered IHS 104 and may be identified logically by administered IHS 104 as 00F4. Adapter 116 is a physical OSA network adapter and couples to NETWORK B 118 on both ports 1 and 2. LPAR 128-4 and 128-5 of administered IHS 104 may access adapter 116 to communicate via NETWORK B 118.

The hardware configuration information of adapter 117 includes MSN of 0000880B, PID of 0021, LID of 0204, type of 0008, LPAR access list of 04 and 05, and PNet ID 1 and PNet ID 2 of NETB. In other words, adapter 117 is located in physical channel 0021 in administered IHS 104 and may be identified logically by administered IHS 104 as 0204. Adapter 117 is a physical RNIC network adapter and couples to NETWORK B 118 on both ports 1 and 2. LPAR 128-4 and 128-5 of administered IHS 104 may access adapter 117 to communicate via NETWORK B 118.

The hardware configuration information of adapter 121 includes MSN of 0000880B, PID of 020A, LID of 00F7, type of 0087, LPAR access list of 06 and 07, and PNet ID 1 and PNet ID 2 of NETC. In other words, adapter 121 is located in physical channel 020A in administered IHS 104 and may be identified logically by administered IHS 104 as 00F7. Adapter 121 is a physical OSA network adapter and couples to NETWORK C 123 on both ports 1 and 2. LPAR 128-6 and 128-7 of administered IHS 104 may access adapter 121 to communicate via NETWORK C 123.

The hardware configuration information of adapter 122 includes MSN of 0000880B, PID of 0222, LID of 0207, type of 0008, LPAR access list of 06 and 07, and PNet ID 1 and PNet ID 2 of NETC. In other words, adapter 122 is located in physical channel 0222 in administered IHS 104 and may be identified logically by administered IHS 104 as 0207. Adapter 122 is a physical RNIC network adapter and couples to NETWORK C 123 on both ports 1 and 2. LPAR 128-6 and 128-7 of administered IHS 104 may access adapter 121 to communicate via NETWORK C 123.

The hardware configuration information of adapter 129-1 includes MSN of 0000880B, PID of 0111, LID of 04C0$_3$ type of 008D, LPAR access list of 01, 02, 03, 04, 05, 06 and 07, and PNet ID 1 and PNet ID 2 with no entries. In other words, adapter 129-1 is a virtual adapter with a virtual channel 0111 in administered IHS 104 and may be identified logically by administered IHS 104 as 04C0. Adapter 129-1 is an IQD virtual network adapter and couples to IQD network 130 on virtual channel 0111. LPAR 128-1, 128-2, 128-3, 128-4, 128-

5, 128-6 and 128-7 of administered IHS 104 may access adapter 129-1 to communicate via IQD network 130.

The hardware configuration information of adapter 129-2 includes MSN of 0000880B, PID of 0111, LID of 04C1, type of 008D, LPAR access list of 01, 02, 03, 04, 05, 06 and 07, and PNet ID 1 and PNet ID 2 with no entries. In other words, adapter 129-2 is a virtual adapter with a virtual channel 0111 in administered IHS 104 and may be identified logically by administered IHS 104 as 04C1. Adapter 129-2 is an IQD virtual network adapter and couples to IQD network 130 on virtual channel 0111. LPAR 128-1, 128-2, 128-3, 128-4, 128-5, 128-6 and 128-7 of administered IHS 104 may access adapter 129-2 to communicate via IQD network 130.

The hardware configuration information of adapter 129-3 includes MSN of 0000880B, PID of 0111, LID of 04C2, type of 008D, LPAR access list of 01, 02, 03, 04, 05, 06 and 07, and PNet ID 1 and PNet ID 2 with no entries. In other words, adapter 129-3 is a virtual adapter with a virtual channel 0111 in administered IHS 104 and may be identified logically by administered IHS 104 as 04C2. Adapter 129-3 is an IQD virtual network adapter and couples to IQD network 130 on virtual channel 0111. LPAR 128-1, 128-2, 128-3, 128-4, 128-5, 128-6 and 128-7 of administered IHS 104 may access adapter 129-3 to communicate via IQD network 130.

The hardware configuration information of adapter 129-4 includes MSN of 0000880B, PID of 0111, LID of 04C3, type of 008D, LPAR access list of 01, 02, 03, 04, 05, 06 and 07, and PNet ID 1 and PNet ID 2 with no entries. In other words, adapter 129-4 is a virtual adapter with a virtual channel 0111 in administered IHS 104 and may be identified logically by administered IHS 104 as 04C3. Adapter 129-4 is an IQD virtual network adapter and couples to IQD network 130 on virtual channel 0111. LPAR 128-1, 128-2, 128-3, 128-4, 128-5, 128-6 and 128-7 of administered IHS 104 may access adapter 129-4 to communicate via IQD network 130.

The hardware configuration information of adapter 129-5 includes MSN of 0000880B, PID of 0111, LID of 04C4, type of 008D, LPAR access list of 01, 02, 03, 04, 05, 06 and 07, and PNet ID 1 and PNet ID 2 with no entries. In other words, adapter 129-5 is a virtual adapter with a virtual channel 0111 in administered IHS 104 and may be identified logically by administered IHS 104 as 04C4. Adapter 129-5 is an IQD virtual network adapter and couples to IQD network 130 on virtual channel 0111. LPAR 128-1, 128-2, 128-3, 128-4, 128-5, 128-6 and 128-7 of administered IHS 104 may access adapter 129-5 to communicate via IQD network 130.

The hardware configuration information of adapter 129-6 includes MSN of 0000880B, PID of 0111, LID of 04C5, type of 008D, LPAR access list of 01, 02, 03, 04, 05, 06 and 07, and PNet ID 1 and PNet ID 2 with no entries. In other words, adapter 129-6 is a virtual adapter with a virtual channel 0111 in administered IHS 104 and may be identified logically by administered IHS 104 as 04C5. Adapter 129-6 is an IQD virtual network adapter and couples to IQD network 130 on virtual channel 0111. LPAR 128-1, 128-2, 128-3, 128-4, 128-5, 128-6 and 128-7 of administered IHS 104 may access adapter 129-6 to communicate via IQD network 130.

The hardware configuration information of adapter 129-7 includes MSN of 0000880B, PID of 0111, LID of 04C6, type of 008D, LPAR access list of 01, 02, 03, 04, 05, 06 and 07, and PNet ID 1 and PNet ID 2 with no entries. In other words, adapter 129-7 is a virtual adapter with a virtual channel 0111 in administered IHS 104 and may be identified logically by administered IHS 104 as 04C6. Adapter 129-7 is an IQD virtual network adapter and couples to IQD network 130 on virtual channel 0111. LPAR 128-1, 128-2, 128-3, 128-4, 128-5, 128-6 and 128-7 of administered IHS 104 may access adapter 129-7 to communicate via IQD network 130.

The hardware configuration information of adapter 114 includes MSN of 8A0024FC, PID of 0007, LID of 0061, type of 0087, LPAR access list with no entries, and PNet ID 1 and PNet ID 2 of NETA. In other words, adapter 114 is located in physical channel 0007 in administered IHS 106 and may be identified logically by administered IHS 106 as 0061. Adapter 114 is a physical OSA network adapter and couples to NETWORK A 113 on both ports 1 and 2. Administered IHS 106 may access adapter 114 to communicate via NETWORK A 113.

The hardware configuration information of adapter 115 includes MSN of 8A0024FC, PID of 0012, LID of 0006, type of 0008, LPAR access list with no entries, and PNet ID 1 and PNet ID 2 of NETA. In other words, adapter 115 is located in physical channel 0012 in administered IHS 106 and may be identified logically by administered IHS 106 as 0006. Adapter 115 is a physical RNIC network adapter and couples to NETWORK A 113 on both ports 1 and 2. Administered IHS 106 may access adapter 115 to communicate via NETWORK A 113.

The hardware configuration information of adapter 119 includes MSN of 578A7CE6, PID of 005A, LID of 0200, type of 0087, LPAR access list with no entries, and PNet ID 1 and PNet ID 2 of NETB. In other words, adapter 119 is located in physical channel 005A in administered IHS 108 and may be identified logically by administered IHS 108 as 0200. Adapter 119 is a physical OSA network adapter and couples to NETWORK B 118 on both ports 1 and 2. Administered IHS 108 may access adapter 119 to communicate via NETWORK B 118.

The hardware configuration information of adapter 120 includes MSN of 578A7CE6, PID of 0402, LID of 001C, type of 0008, LPAR access list with no entries, and PNet ID 1 and PNet ID 2 of NETB. In other words, adapter 120 is located in physical channel 0402 in administered IHS 108 and may be identified logically by administered IHS 108 as 001C. Adapter 120 is a physical RNIC network adapter and couples to NETWORK B 118 on both ports 1 and 2. Administered IHS 108 may access adapter 115 to communicate via NETWORK B 118.

The hardware configuration information of adapter 124 includes MSN of 578A7CE6, PID of 005B, LID of 0201, type of 0087, LPAR access list with no entries, and PNet ID 1 and PNet ID 2 of NETC. In other words, adapter 124 is located in physical channel 005B in administered IHS 108 and may be identified logically by administered IHS 108 as 0201. Adapter 124 is a physical OSA network adapter and couples to NETWORK C 123 on both ports 1 and 2. Administered IHS 108 may access adapter 124 to communicate via NETWORK C 123.

The hardware configuration information of adapter 125 includes MSN of 578A7CE6, PID of 0444, LID of 001 D, type of 0008, LPAR access list with no entries, and PNet ID 1 and PNet ID 2 of NETC. In other words, adapter 125 is located in physical channel 0444 in administered IHS 108 and may be identified logically by administered IHS 108 as 001D. Adapter 125 is a physical RNIC network adapter and couples to NETWORK C 123 on both ports 1 and 2. Administered IHS 108 may access adapter 125 to communicate via NETWORK C 123.

The hardware configuration information of adapter 126 includes MSN of A453E85C, PID of 0002, LID of 0105, type of 0087, LPAR access list with no entries, and PNet ID 1 and PNet ID 2 of NETC. In other words, adapter 126 is located in physical channel 0002 in administered IHS 110 and may be identified logically by administered IHS 110 as 0105. Adapter 126 is a physical OSA network adapter and couples to NETWORK C 123 on both ports 1 and 2. Administered IHS 110 may access adapter 126 to communicate via NETWORK C 123.

The hardware configuration information of adapter 127 includes MSN of A453E85C, PID of 0005, LID of 00A2, type of 0008, LPAR access list with no entries, and PNet ID 1 and PNet ID 2 of NETC. In other words, adapter 127 is located in physical channel 0005 in administered IHS 110 and may be identified logically by administered IHS 110 as 00A2. Adapter 127 is a physical RNIC network adapter and couples to NETWORK C 123 on both ports 1 and 2. Administered IHS 110 may access adapter 127 to communicate via NETWORK C 123.

In one embodiment, HCM tool 600 in HCM IHS 500 may transmit the HCM database to a hypervisor agent of administered IHS 104, 106, 108 and/or 110 via administrative network 102. For example, the hypervisor agent of administered IHS 104 may receive HCM database 200 and allow the hypervisor of administered IHS 104 to extract hardware configuration information from HCM database 200. The hypervisor of administered IHS 104 may configure administered IHS 104 as shown in HCM database 200.

In one embodiment, a user may assign PNet ID, "NETA" to NETWORK A 113, "NETB" to NETWORK B 118, and "NETC" to NETWORK C 123, with HCM tool 600. A user may use HCM tool 600 to provision adapters 111, 112 for network A by assigning a PNet ID of "NETA" therewith. If more adapters are required due to bandwidth limitations between administered IHS 104 and NETWORK A 113, additional adapters may easily be provisioned by assigning a PNet ID of "NETA" to the adapter, with HCM tool 600.

FIG. 3 is a block diagram showing one embodiment of the disclosed hardware configuration management (HCM) system 300 utilizing physical network identifiers (PNet IDs). HCM system 300 may utilize network adapter 301, administrative network 302 and network adapter 303 to couple HCM IHS 500 to administered IHS 304. HCM system 300 may utilize network adapter 301, administrative network 302 and network adapter 305 to couple HCM IHS 500 to administered IHS 306. HCM system 300 may utilize network adapter 301, administrative network 302 and network adapter 307 to couple HCM IHS 500 to administered IHS 308. HCM system 300 may utilize network adapter 301, administrative network 302 and network adapter 309 to couple HCM IHS 500 to administered IHS 310. Administered IHSs 304, 306, 308 and 310 couple via administrative network 302 to HCM IHS 500 to enable HCM IHS 500 to administer HCM database 400 with HCM tool 600 to the administered IHSs.

HCM system 300 may utilize network adapter 311 and/or network adapter 312 and/or network adapter 313 and/or network adapter 314 via NETWORK A 315 via network adapter 316 and/or network adapter 317 to couple administered IHS 304 to administered IHS 306. HCM system 300 may utilize network adapter 318 and/or network adapter 319 and/or network adapter 320 and/or network adapter 321 via NETWORK B 322 via network adapter 323 and/or network adapter 324 to couple administered IHS 304 to administered IHS 306. HCM system 300 may utilize network adapter 318 and/or network adapter 319 and/or network adapter 320 and/or network adapter 321 via NETWORK B 322 via network adapter 325 and/or network adapter 326 to couple administered IHS 304 to administered IHS 308. HCM system 300 may utilize network adapter 327 and/or network adapter 328 and/or network adapter 329 and/or network adapter 330 via NETWORK C 331 via network adapter 332 and/or network adapter 333 to couple administered IHS 304 to administered IHS 308. HCM system 300 may utilize network adapter 327 and/or network adapter 328 and/or network adapter 329 and/or network adapter 330 via NETWORK C 331 via network adapter 334 and/or network adapter 335 and/or network adapter 336 and/or network adapter 337 to couple administered IHS 304 to administered IHS 310.

In one embodiment, network adapter 301, 303, 305, 307 and 309 may be Ethernet (ETH) adapters. Network adapters 311, 312, 316, 318, 319, 323, 325, 327, 328, 334 and 336 may be open system adapters (OSAs). Network adapters 313, 314, 317, 320, 321, 326, 329, 330, 333, 335 and 337 may be remote direct memory access (RDMA) enabled network adapter controllers (RNICs). In one embodiment, administrative network 302, NETWORK A 315, NETWORK B 322 and NETWORK C 331 may provide local area network (LAN) communications and/or wide area network (WAN) communications and/or virtual LAN communications and/or intranet communications and/or Internet communications to structures that couple thereto.

Administered IHS 304 may include a hypervisor (not shown) that may create logical partition (LPAR) 338-1, LPAR 338-2, LPAR 338-3, LPAR 338-4, LPAR 338-5, LPAR 338-6 and LPAR 338-7 in administered IHS 304. LPAR 338-1, LPAR 338-2, LPAR 338-3, LPAR 338-4, LPAR 338-5, LPAR 338-6 and LPAR 338-7 may respectively include virtual internal network adapter 339-1, virtual internal network adapter 339-2, virtual internal network adapter 339-3, virtual internal network adapter 339-4, virtual internal network adapter 339-5, virtual internal network adapter 339-6 and virtual internal network adapter 339-7. Virtual internal network adapter 339-1, 339-2, 339-3, 339-4, 339-5, 339-6 and 339-7 may be internal queued direct (IQD) communication adapters and couple to one another via administered IHS 304 IQD network 340. Administered IHS 304 IQD network 340 may be a channel, i.e., a bus.

LPAR 338-1, LPAR 338-2 and LPAR 338-3 may include virtual network adapter 341-1, virtual network adapter 341-2 and virtual network adapter 341-3, respectively. Virtual network adapter 341-1, virtual network adapter 341-2 and virtual network adapter 341-3 may couple to network adapter 311 and network adapter 312 via a channel. LPAR 338-4 and LPAR 338-5 may include virtual network adapter 341-4 and virtual network adapter 341-5, respectively. Virtual network adapter 341-4 and virtual network adapter 341-5 may couple to network adapter 318 and network adapter 319 via a channel. LPAR 338-6 and LPAR 338-7 may include virtual network adapter 341-6 and virtual network adapter 341-7, respectively. Virtual network adapter 341-6 and virtual network adapter 341-7 may couple to network adapter 327 and network adapter 328 via a channel.

LPAR 338-1, LPAR 338-2 and LPAR 338-3 may include virtual network adapter 342-1, virtual network adapter 342-2 and virtual network adapter 342-3, respectively. Virtual network adapter 342-1, virtual network adapter 342-2 and virtual network adapter 342-3 may couple to network adapter 313 and network adapter 314 via a channel. LPAR 338-4 and LPAR 338-5 may include virtual network adapter 342-4 and virtual network adapter 342-5, respectively. Virtual network adapter 342-4 and virtual network adapter 342-5 may couple to network adapter 320 and network adapter 321 via a channel. LPAR 338-6 and LPAR 338-7 may include virtual network adapter 342-6 and virtual network adapter 342-7, respectively. Virtual network adapter 342-6 and virtual network adapter 342-7 may couple to network adapter 329 and network adapter 330 via a channel.

FIG. 4 depicts one embodiment of HCM database 400 in the disclosed HCM system 300. HCM tool 600 may store the hardware configuration information in HCM database 400 on a per adapter basis. In one embodiment, for each network adapter in HCM system 300, HCM tool 600 may store, from the leftmost column to the rightmost column, the machine serial number (MSN), physical identification (PID), logical identification (LID), adapter type, logical partition (LPAR) access list, physical network identification (PNet ID) for a first port of the network adapter, and the PNet ID for the second port of the network adapter.

As shown in HCM database 400, the hardware configuration information of adapter 311 includes MSN of 000F880A, PID of 0008, LID of 00F0, type of 0087, LPAR access list of 01, 02 and 03, and PNet ID 1 and PNet ID 2 of NETA. In other words, adapter 311 is located in physical channel 0008 in administered IHS 304 and may be identified logically by administered IHS 304 as 00F0. Adapter 311 is a physical OSA network adapter and couples to NETWORK A 315 on both ports 1 and 2. LPAR 338-1, 338-2 and 338-3 of administered IHS 304 may access adapter 311 to communicate via NETWORK A 315.

The hardware configuration information of adapter 312 includes MSN of 000F880A, PID of 0009, LID of 00F1, type of 0087, LPAR access list of 01, 02 and 03, and PNet ID 1 and PNet ID 2 of NETA. In other words, adapter 312 is located in physical channel 0009 in administered IHS 304 and may be identified logically by administered IHS 304 as 00F1. Adapter 312 is a physical OSA network adapter and couples to NETWORK A 315 on both ports 1 and 2. LPAR 338-1, 338-2 and 338-3 of administered IHS 304 may access adapter 312 to communicate via NETWORK A 315.

The hardware configuration information of adapter 313 includes MSN of 000F880A, PID of 020A, LID of 0010, type of 0008, LPAR access list of 01, 02 and 03, and PNet ID 1 and PNet ID 2 of NETA. In other words, adapter 313 is located in physical channel 020A in administered IHS 304 and may be identified logically by administered IHS 304 as 0010. Adapter 313 is a physical RNIC network adapter and couples to NETWORK A 315 on both ports 1 and 2. LPAR 338-1, 338-2 and 338-3 of administered IHS 304 may access adapter 313 to communicate via NETWORK A 315.

The hardware configuration information of adapter 314 includes MSN of 000F880A, PID of 020B, LID of 0011, type of 0008, LPAR access list of 01, 02 and 03, and PNet ID 1 and PNet ID 2 of NETA. In other words, adapter 314 is located in physical channel 020B in administered IHS 304 and may be identified logically by administered IHS 304 as 0011. Adapter 314 is a physical RNIC network adapter and couples to NETWORK A 315 on both ports 1 and 2. LPAR 338-1, 338-2 and 338-3 of administered IHS 304 may access adapter 314 to communicate via NETWORK A 315.

The hardware configuration information of adapter 318 includes MSN of 000F880A, PID of 0330, LID of 00F5, type of 0087, LPAR access list of 04 and 05, and PNet ID 1 and PNet ID 2 of NETB. In other words, adapter 318 is located in physical channel 0330 in administered IHS 304 and may be identified logically by administered IHS 304 as 00F5. Adapter 318 is a physical OSA network adapter and couples to NETWORK B 322 on both ports 1 and 2. LPAR 338-4 and 338-5 of administered IHS 304 may access adapter 318 to communicate via NETWORK B 322.

The hardware configuration information of adapter 319 includes MSN of 000F880A, PID of 0331, LID of 00F6, type of 0087, LPAR access list of 04 and 05, and PNet ID 1 and PNet ID 2 of NETB. In other words, adapter 319 is located in physical channel 0331 in administered IHS 304 and may be identified logically by administered IHS 304 as 00F6. Adapter 319 is a physical OSA network adapter and couples to NETWORK B 322 on both ports 1 and 2. LPAR 338-4 and 338-5 of administered IHS 304 may access adapter 319 to communicate via NETWORK B 322.

The hardware configuration information of adapter 320 includes MSN of 000F880A, PID of 020C, LID of 0015, type of 0008, LPAR access list of 04 and 05, and PNet ID 1 and PNet ID 2 of NETB. In other words, adapter 320 is located in physical channel 020C in administered IHS 304 and may be identified logically by administered IHS 304 as 0015. Adapter 320 is a physical RNIC network adapter and couples to NETWORK B 322 on both ports 1 and 2. LPAR 338-4 and 338-5 of administered IHS 304 may access adapter 320 to communicate via NETWORK B 322.

The hardware configuration information of adapter 321 includes MSN of 000F880A, PID of 020D, LID of 0016, type of 0008, LPAR access list of 04 and 05, and PNet ID 1 and PNet ID 2 of NETB. In other words, adapter 321 is located in physical channel 020D in administered IHS 304 and may be identified logically by administered IHS 304 as 0016. Adapter 321 is a physical RNIC network adapter and couples to NETWORK B 322 on both ports 1 and 2. LPAR 338-4 and 338-5 of administered IHS 304 may access adapter 321 to communicate via NETWORK B 322.

The hardware configuration information of adapter 327 includes MSN of 000F880A, PID of 0111, LID of 00F9, type of 0087, LPAR access list of 06 and 07, and PNet ID 1 and PNet ID 2 of NETC. In other words, adapter 327 is located in physical channel 0111 in administered IHS 304 and may be identified logically by administered IHS 304 as 00F9. Adapter 327 is a physical OSA network adapter and couples to NETWORK C 331 on both ports 1 and 2. LPAR 338-6 and 338-7 of administered IHS 304 may access adapter 327 to communicate via NETWORK C 331.

The hardware configuration information of adapter 328 includes MSN of 000F880A, PID of 0112, LID of 00FA, type of 0087, LPAR access list of 06 and 07, and PNet ID 1 and PNet ID 2 of NETC. In other words, adapter 328 is located in physical channel 0112 in administered IHS 304 and may be identified logically by administered IHS 304 as 00FA. Adapter 328 is a physical OSA network adapter and couples to NETWORK C 331 on both ports 1 and 2. LPAR 338-6 and 338-7 of administered IHS 304 may access adapter 328 to communicate via NETWORK C 331.

The hardware configuration information of adapter 329 includes MSN of 000F880A, PID of 020E, LID of 0019, type of 0008, LPAR access list of 06 and 07, and PNet ID 1 and PNet ID 2 of NETC. In other words, adapter 329 is located in physical channel 020E in administered IHS 304 and may be identified logically by administered IHS 304 as 0019. Adapter 329 is a physical RNIC network adapter and couples to NETWORK C 331 on both ports 1 and 2. LPAR 338-6 and 338-7 of administered IHS 304 may access adapter 329 to communicate via NETWORK C 331.

The hardware configuration information of adapter 330 includes MSN of 000F880A, PID of 020F, LID of 0020, type of 0008, LPAR access list of 06 and 07, and PNet ID 1 and PNet ID 2 of NETC. In other words, adapter 330 is located in physical channel 020F in administered IHS 304 and may be identified logically by administered IHS 304 as 0020. Adapter 330 is a physical RNIC network adapter and couples to NETWORK C 331 on both ports 1 and 2. LPAR 338-6 and 338-7 of administered IHS 304 may access adapter 330 to communicate via NETWORK C 331.

The hardware configuration information of adapter 339-1 includes MSN of 000F880A, PID of 0222, LID of 06D0, type of 008D, LPAR access list of 01, 02, 03, 04, 05, 06 and 07, and PNet ID 1 and PNet ID 2 with no entries. In other words, adapter 339-1 is a virtual adapter with a virtual channel 0222 in administered IHS 304 and may be identified logically by administered IHS 304 as 06D0. Adapter 339-1 is an IQD virtual network adapter and couples to IQD network 340 on virtual channel 0222. LPAR 338-1, 338-2, 338-3, 338-4, 338-5, 338-6 and 338-7 of administered IHS 304 may access adapter 339-1 to communicate via IQD network 340.

The hardware configuration information of adapter 339-2 includes MSN of 000F880A, PID of 0222, LID of 06D1, type of 008D, LPAR access list of 01, 02, 03, 04, 05, 06 and 07, and PNet ID 1 and PNet ID 2 with no entries. In other words, adapter 339-2 is a virtual adapter with a virtual channel 0222 in administered IHS 304 and may be identified logically by administered IHS 304 as 06D1. Adapter 339-2 is an IQD virtual network adapter and couples to IQD network 340 on virtual channel 0222. LPAR 338-1, 338-2, 338-3, 338-4, 338-5, 338-6 and 338-7 of administered IHS 304 may access adapter 339-2 to communicate via IQD network 340.

The hardware configuration information of adapter 339-3 includes MSN of 000F880A, PID of 0222, LID of 06D2, type of 008D, LPAR access list of 01, 02, 03, 04, 05, 06 and 07, and PNet ID 1 and PNet ID 2 with no entries. In other words, adapter 339-3 is a virtual adapter with a virtual channel 0222 in administered IHS 304 and may be identified logically by administered IHS 304 as 06D2. Adapter 339-3 is an IQD virtual network adapter and couples to IQD network 340 on virtual channel 0222. LPAR 338-1, 338-2, 338-3, 338-4, 338-5, 338-6 and 338-7 of administered IHS 304 may access adapter 339-3 to communicate via IQD network 340.

The hardware configuration information of adapter 339-4 includes MSN of 000F880A, PID of 0222, LID of 06D3, type of 008D, LPAR access list of 01, 02, 03, 04, 05, 06 and 07, and PNet ID 1 and PNet ID 2 with no entries. In other words, adapter 339-4 is a virtual adapter with a virtual channel 0222 in administered IHS 304 and may be identified logically by administered IHS 304 as 06D3. Adapter 339-4 is an IQD virtual network adapter and couples to IQD network 340 on virtual channel 0222. LPAR 338-1, 338-2, 338-3, 338-4, 338-5, 338-6 and 338-7 of administered IHS 304 may access adapter 339-4 to communicate via IQD network 340.

The hardware configuration information of adapter 339-5 includes MSN of 000F880A, PID of 0222, LID of 06D4, type of 008D, LPAR access list of 01, 02, 03, 04, 05, 06 and 07, and PNet ID 1 and PNet ID 2 with no entries. In other words, adapter 339-5 is a virtual adapter with a virtual channel 0222 in administered IHS 304 and may be identified logically by administered IHS 304 as 06D4. Adapter 339-5 is an IQD virtual network adapter and couples to IQD network 340 on virtual channel 0222. LPAR 338-1, 338-2, 338-3, 338-4, 338-5, 338-6 and 338-7 of administered IHS 304 may access adapter 339-5 to communicate via IQD network 340.

The hardware configuration information of adapter 339-6 includes MSN of 000F880A, PID of 0222, LID of 06D5, type of 008D, LPAR access list of 01, 02, 03, 04, 05, 06 and 07, and PNet ID 1 and PNet ID 2 with no entries. In other words, adapter 339-6 is a virtual adapter with a virtual channel 0222 in administered IHS 304 and may be identified logically by administered IHS 304 as 06D5. Adapter 339-6 is an IQD virtual network adapter and couples to IQD network 340 on virtual channel 0222. LPAR 338-1, 338-2, 338-3, 338-4, 338-5, 338-6 and 338-7 of administered IHS 304 may access adapter 339-6 to communicate via IQD network 340.

The hardware configuration information of adapter 339-7 includes MSN of 000F880A, PID of 0222, LID of 06D6, type of 008D, LPAR access list of 01, 02, 03, 04, 05, 06 and 07, and PNet ID 1 and PNet ID 2 with no entries. In other words, adapter 339-7 is a virtual adapter with a virtual channel 0222 in administered IHS 304 and may be identified logically by administered IHS 304 as 06D6. Adapter 339-7 is an IQD virtual network adapter and couples to IQD network 340 on virtual channel 0222. LPAR 338-1, 338-2, 338-3, 338-4, 338-5, 338-6 and 338-7 of administered IHS 304 may access adapter 339-7 to communicate via IQD network 340.

The hardware configuration information of adapter 316 includes MSN of A467E85D, PID of 0005, LID of 00D1, type of 0087, LPAR access list with no entries, and PNet ID 1 and PNet ID 2 of NETA. In other words, adapter 316 is located in physical channel 0005 in administered IHS 306 and may be identified logically by administered IHS 306 as 00D1. Adapter 316 is a physical OSA network adapter and couples to NETWORK A 315 on both ports 1 and 2. Administered IHS 306 may access adapter 316 to communicate via NETWORK A 315.

The hardware configuration information of adapter 317 includes MSN of A467E85D, PID of 0016, LID of 0CB1, type of 0008, LPAR access list with no entries, and PNet ID 1 and PNet ID 2 of NETA. In other words, adapter 317 is located in physical channel 0016 in administered IHS 306 and may be identified logically by administered IHS 306 as 0CB1. Adapter 317 is a physical RNIC network adapter and couples to NETWORK A 315 on both ports 1 and 2. Administered IHS 306 may access adapter 317 to communicate via NETWORK A 315.

The hardware configuration information of adapter 323 includes MSN of A467E85D, PID of 0006, LID of 00D2, type of 0087, LPAR access list with no entries, and PNet ID 1 and PNet ID 2 of NETB. In other words, adapter 323 is located in physical channel 0006 in administered IHS 306 and may be identified logically by administered IHS 306 as 00D2. Adapter 323 is a physical OSA network adapter and couples to NETWORK B 322 on both ports 1 and 2. Administered IHS 306 may access adapter 323 to communicate via NETWORK B 322.

The hardware configuration information of adapter 324 includes MSN of A467E85D, PID of 0017, LID of 0CB2, type of 0008, LPAR access list with no entries, and PNet ID 1 and PNet ID 2 of NETB. In other words, adapter 324 is located in physical channel 0017 in administered IHS 306 and may be identified logically by administered IHS 306 as 0CB2. Adapter 324 is a physical RNIC network adapter and couples to NETWORK B 322 on both ports 1 and 2. Administered IHS 306 may access adapter 324 to communicate via NETWORK B 322.

The hardware configuration information of adapter 325 includes MSN of 007A0052, PID of 00A1, LID of 00F0, type of 0087, LPAR access list with no entries, and PNet ID 1 and PNet ID 2 of NETB. In other words, adapter 325 is located in physical channel 00A1 in administered IHS 308 and may be identified logically by administered IHS 308 as 00F0. Adapter 325 is a physical OSA network adapter and couples to NETWORK B 322 on both ports 1 and 2. Administered IHS 308 may access adapter 325 to communicate via NETWORK B 322.

The hardware configuration information of adapter 326 includes MSN of 007A0052, PID of 00D1, LID of 00F1, type of 0008, LPAR access list with no entries, and PNet ID 1 and PNet ID 2 of NETB. In other words, adapter 326 is located in physical channel 00D1 in administered IHS 308 and may be identified logically by administered IHS 308 as 00F1. Adapter 326 is a physical RNIC network adapter and couples to NETWORK B 322 on both ports 1 and 2. Administered IHS 308 may access adapter 326 to communicate via NETWORK B 322.

The hardware configuration information of adapter 332 includes MSN of 007A0052, PID of 00A2, LID of 00F2, type of 0087, LPAR access list with no entries, and PNet ID 1 and PNet ID 2 of NETC. In other words, adapter 332 is located in physical channel 00A2 in administered IHS 308 and may be identified logically by administered IHS 308 as 00F2. Adapter 332 is a physical OSA network adapter and couples to NETWORK C 331 on both ports 1 and 2. Administered IHS 308 may access adapter 332 to communicate via NETWORK C 331.

The hardware configuration information of adapter 333 includes MSN of 007A0052, PID of 00D2, LID of 00F3, type of 0008, LPAR access list with no entries, and PNet ID 1 and PNet ID 2 of NETC. In other words, adapter 333 is located in physical channel 00D2 in administered IHS 308 and may be identified logically by administered IHS 308 as 00F3. Adapter 333 is a physical RNIC network adapter and couples to NETWORK C 331 on both ports 1 and 2. Administered IHS 308 may access adapter 333 to communicate via NETWORK C 331.

The hardware configuration information of adapter 334 includes MSN of C6200070, PID of 0016, LID of 00CA, type of 0087, LPAR access list with no entries, and PNet ID 1 and PNet ID 2 of NETC. In other words, adapter 334 is located in physical channel 0016 in administered IHS 310 and may be identified logically by administered IHS 310 as 00CA. Adapter 334 is a physical OSA network adapter and couples to NETWORK C 331 on both ports 1 and 2. Administered IHS 310 may access adapter 334 to communicate via NETWORK C 331.

The hardware configuration information of adapter 335 includes MSN of C6200070, PID of 0032, LID of 00CB, type of 0008, LPAR access list with no entries, and PNet ID 1 and PNet ID 2 of NETC. In other words, adapter 335 is located in physical channel 0032 in administered IHS 310 and may be identified logically by administered IHS 310 as 00CB. Adapter 335 is a physical RNIC network adapter and couples to NETWORK C 331 on both ports 1 and 2. Administered IHS 310 may access adapter 335 to communicate via NETWORK C 331.

The hardware configuration information of adapter 336 includes MSN of C6200070, PID of 0022, LID of 00CC, type of 0087, LPAR access list with no entries, and PNet ID 1 and PNet ID 2 of NETC. In other words, adapter 336 is located in physical channel 0022 in administered IHS 310 and may be identified logically by administered IHS 310 as 00CC. Adapter 336 is a physical OSA network adapter and couples to NETWORK C 331 on both ports 1 and 2. Administered IHS 310 may access adapter 336 to communicate via NETWORK C 331.

The hardware configuration information of adapter 337 includes MSN of C6200070, PID of 000A, LID of 00CD, type of 0008, LPAR access list with no entries, and PNet ID 1 and PNet ID 2 of NETC. In other words, adapter 337 is located in physical channel 000A in administered IHS 310 and may be identified logically by administered IHS 310 as 00CD. Adapter 337 is a physical RNIC network adapter and couples to NETWORK C 331 on both ports 1 and 2. Administered IHS 310 may access adapter 337 to communicate via NETWORK C 331.

In one embodiment, HCM tool 600 in HCM IHS 500 may transmit the HCM database to a hypervisor agent of administered IHS 104, 106, 108 and/or 110 via administrative network 102. For example, the hypervisor agent of administered IHS 104 may receive HCM database 200 and allow the hypervisor of administered IHS 104 to extract hardware configuration information from HCM database 400. The hypervisor of administered IHS 104 may configure administered IHS 104 as shown in HCM database 400.

Figure 5:
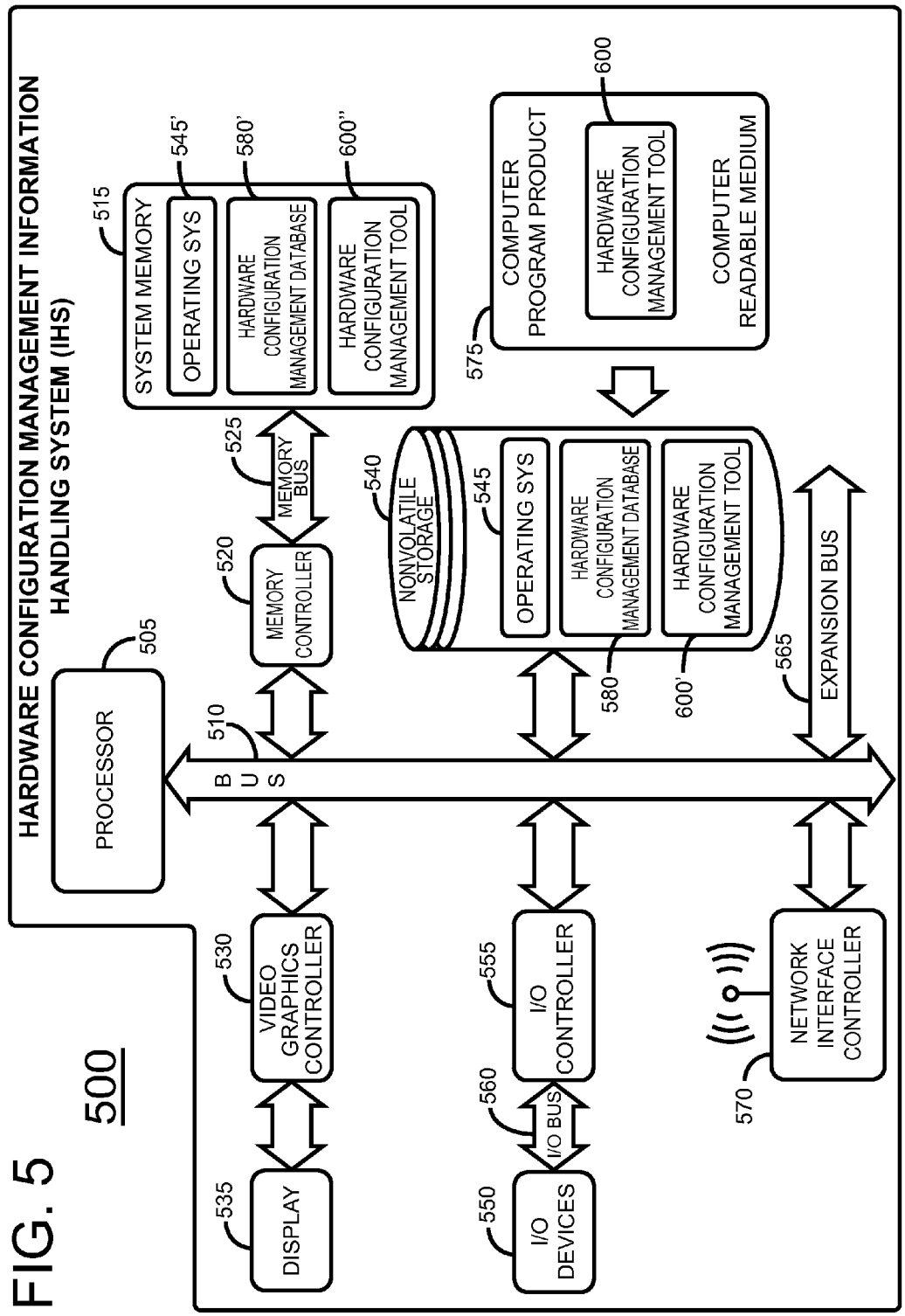
FIG. 5 is a block diagram of an HCM information handling system (IHS) that may be used in the disclosed HCM system.

FIG. 5 is a block diagram of an HCM information handling system (IHS) 500 that may be used in the disclosed HCM system. HCM IHS 500 includes a processor 505 that may include multiple cores. HCM IHS 500 processes, transfers, communicates, modifies, stores or otherwise handles information in digital form, analog form or other form. HCM IHS 500 includes a bus 510 that couples processor 505 to memory 515 via a memory controller 520 and memory bus 525. System memory 515 may also be referred to as main memory. System memory 515 may be a static random access memory (SRAM) array or a dynamic random access memory (DRAM) array. Processor 505 may also include local memory such as L1, L2 and L3 caches. A video graphics controller 530 couples display 535 to bus 510. Nonvolatile storage 540, such as a hard disk drive, solid-state drive (SSD), CD drive, DVD drive, or other nonvolatile storage couples to bus 510 to provide HCM IHS 500 with permanent storage of information. System memory 515 and nonvolatile storage 540 are both forms of memory stores. Nonvolatile storage 540 stores an operating system 545 (OPERATING SYS) that governs operation of HCM IHS 500. I/O devices 550, such as speakers, a keyboard and a pointing device, couple to bus 510 via I/O controller 555 and I/O bus 560.

One or more expansion busses 565, such as USB, IEEE 1394 bus, ATA, SATA, PCI, PCIE, DVI, HDMI and other busses, couple to bus 510 to facilitate the connection of peripherals and devices to HCM IHS 500. A network interface controller (NIC) 570 couples to bus 510 to enable HCM IHS 500 to connect by wire or wirelessly to a network and other information handling systems. NIC 570 may also be called a network communication adapter, network interface adapter, network adapter, network interface or an adapter. NIC 570 may take many forms. For example, NIC 570 may take the form of an Ethernet (ETH) adapter, open systems adapter (OSA), RDMA enabled network interface controller (RNIC) or other network communication adapter.

While FIG. 5 shows one IHS that employs processor 505, the IHS may take many forms. For example, HCM IHS 500 may take the form of a desktop, portable, laptop, notebook, tablet or other form factor computer or data processing system. HCM IHS 500 may take other form factors such as a gaming device, a personal digital assistant (PDA), a portable telephone device, a communication device or other devices that include a processor and memory.

HCM IHS 500 includes a hardware configuration management (HCM) tool computer program product 600 on digital media 575 such as a CD, DVD or other media. For simplicity, the term HCM tool will be used below. HCM IHS 500 may store HCM tool 600 in nonvolatile storage 540 as HCM tool 600'. HCM IHS 500 may also store operating system 545 (OPERATING SYS) and HCM database 580 in nonvolatile storage 540. When HCM IHS 500 initializes, the IHS loads operating system 545 into system memory 515 for execution as operating system 545'. HCM IHS 500 also loads HCM database 580 and HCM tool 600' into system memory 515 for execution as HCM database 580' and HCM tool 600", respectively.

Figure 6:
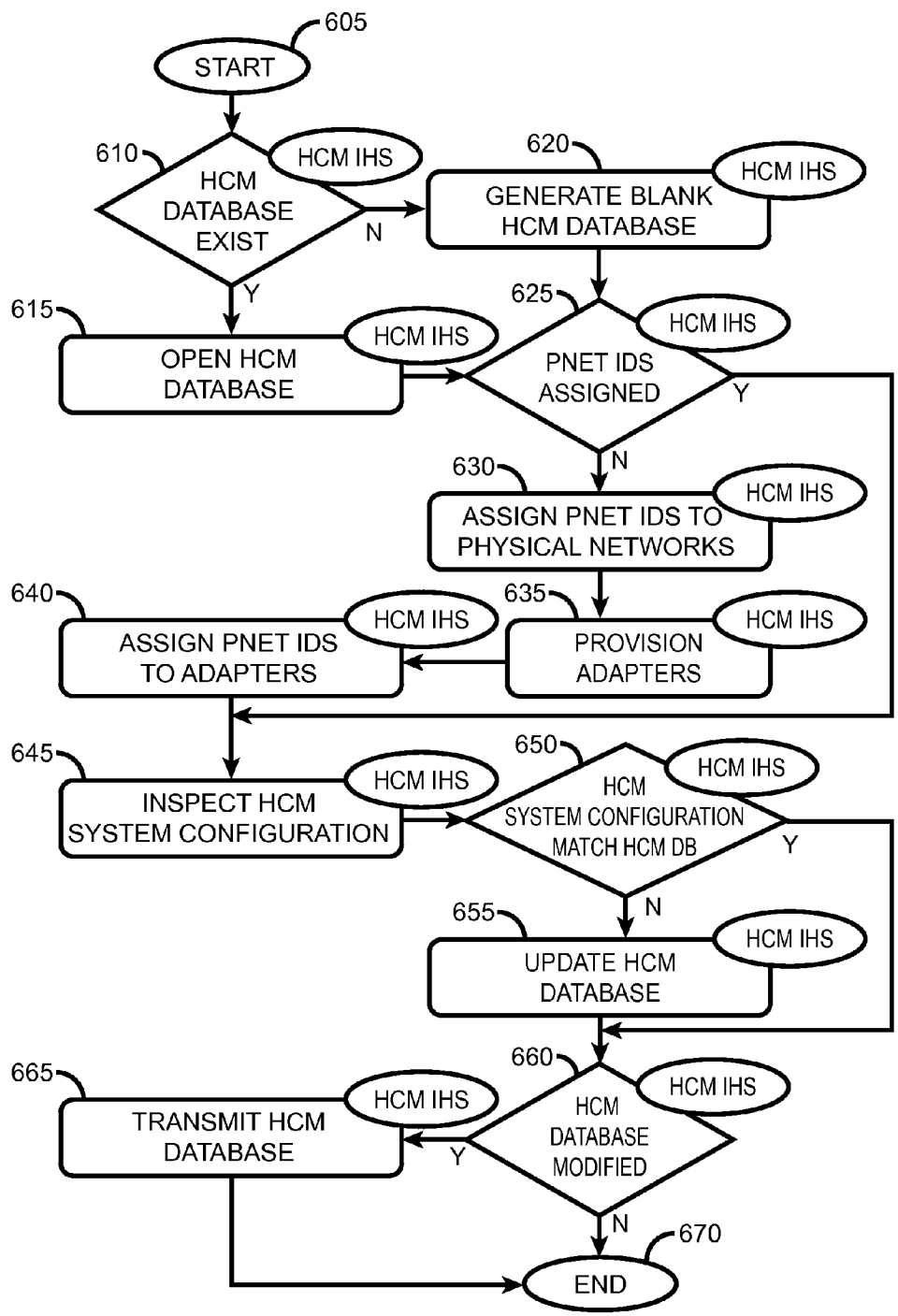
FIG. 6 is a flowchart that shows a representative process flow of an HCM tool that may be used in the disclosed HCM system.

FIG. 6 is a flowchart that shows a representative process flow of an HCM tool 600 that may be used in the disclosed HCM system. Process flow commences when HCM tool 600 in HCM IHS 500 initializes, as per block 605. The HCM tool 600 may determine if HCM database 580 exists in HCM IHS 500, as per block 610. If HCM database 580 exists in HCM IHS 500, HCM tool 600 opens HCM database 580 for modification, as per block 615. However, if HCM database 580 does not exist in HCM IHS 500, HCM tool 600 generates a blank HCM database 580 in HCM IHS 500 and opens the HCM database 580 for modification, as per block 620.

HCM database 580 may store entries on a per adapter basis, i.e., each row in HCM database 580 may contain information that pertains to a specific network adapter. Process flow continues as HCM tool 600 checks the entries in HCM database 580 and determines if rows in HCM database 580 are assigned physical network identifications (PNet IDs), as per block 625. If HCM tool 600 determines that rows of HCM database 580 have not been assigned PNet IDs, HCM tool 600 may generate a PNet ID and assign the particular PNet ID to a particular physical network and store the generated PNet IDs in HCM database 580, as per block 630. For example, HCM tool 600 may generate a PNet ID of "NETA" for NETWORK A 113, "NETB" for NETWORK B 118, and/or "NETC" for NETWORK C 123. In one embodiment, a user may input PNet IDs to the HCM tool 600 and the user may assign particular PNet IDs to particular physical networks with HCM tool 600.

HCM tool 600 may provision the network adapters of each administered IHS in the HCM system. HCM tool 600 may modify rows of HCM database 580 to include logical partition (LPAR) designations of LPARs in the particular administered IHS that may access each particular network adapter, as per block 635. For example, HCM tool 600 may provision LPARs 01, 02, and 03 of administered IHS 104 to utilize network adapter 111, as shown in the first row of HCM database 200 in FIG. 2, i.e., the hardware configuration information related to network adapter 111. In one embodiment, a user may utilize the HCM tool 600 to provision the network adapters of each administered IHS in the HCM system. The user may input LPAR designations of LPARs in the particular administered IHS that may access each particular network adapter, to the HCM tool 600. The HCM tool 600 may modify the rows of HCM database 580 to include the LPAR designations of LPARs in the particular administered IHS that may access each particular network adapter.

HCM tool 600 may then assign PNet IDs to the network adapters of each administered IHS in the HCM system. HCM tool 600 may modify rows of HCM database 580 to include PNet IDs of the physical networks to which the particular network adapters connect, as per block 640. For example, as shown in FIG. 1, since both ports of network adapter 111 physically connect to NETWORK A 113, HCM tool 600 may assign PNet ID "NETA" to both ports of network adapter 111, by storing, "NETA" in the first row, "PNET ID1" column of HCM database 200 and by storing, "NETA" in the first row, "PNET ID2" column of HCM database 200. In one embodiment, a user may utilize the HCM tool 600 to assign PNet IDs to network adapters of each administered IHS in the HCM system. The user may input and/or select PNet IDs with HCM tool 600 and assign the PNet IDs to particular network adapters with HCM tool 600. The HCM tool 600 may then modify the rows of HCM database 580 to include the assigned PNet IDs with the particular network adapter.

If HCM tool 600 determines that rows of HCM database 580 have been assigned PNet IDs, as per block 625, process flow continues at block 645. HCM tool 600 inspects the configuration of the HCM system that may include the machine serial number (MSN), physical identification (PID), logical identification (LID), type, LPAR access list, PNet ID1 and PNet ID2 on a per adapter basis, as per block 645. HCM tool 600 may also inspect the hardware configuration information of each network adapter in HCM database 580.

If HCM tool 600 determines that the HCM system configuration does not match HCM database 580, as per block 650, HCM tool 600 updates the information stored in HCM database 580 with the inspected configuration of the HCM system, as per block 655. In one embodiment, a user may view HCM database 580 with HCM tool 600 and determine if HCM database 580 matches the HCM system configuration. If HCM database 580 does not match the HCM system configuration, the user may input the HCM system configuration to the HCM tool 600. HCM tool 600 may then store the HCM system configuration input by the user to HCM database 580.

If HCM tool 600 determines that the HCM system configuration does match HCM database 580, as per block 650, process flow continues at block 660. If HCM tool 600 determines that HCM database 580 has been modified and/or generated, as per block 660, HCM tool 600 may transmit HCM database 580 to any or all administered IHSs, as per block 665. For example, as shown in FIG. 1, HCM tool 600 may transmit HCM database 200 to administered IHS 104, 106, 108 and/or 110 via administrative network 102. In one embodiment, a user may input or select a transmit command in HCM tool 600, causing HCM tool 600 to transmit HCM database 580 to any or all administered IHSs. In another embodiment HCM tool 600 may transmit HCM database 580 to any or all administered IHSs at a user specified time interval. If HCM tool 600 determines that the HCM database 580 has not been modified and/or generated, as per block 660, process flow continues at block 670. Process flow terminates at end block 670. Alternatively, process flow may continue at start block 605.

II. RNIC Converging System

Figure 7:
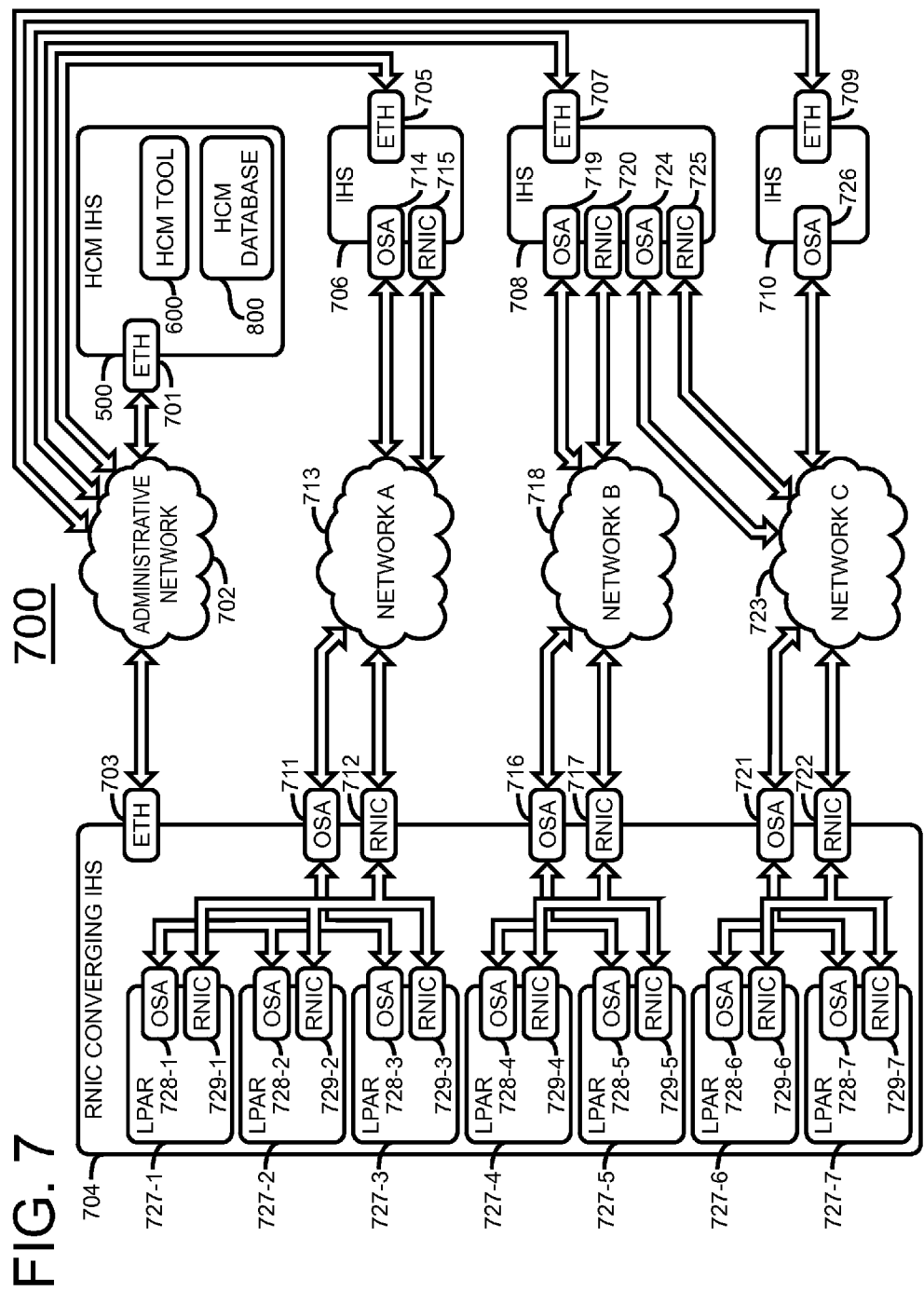
FIG. 7 is a block diagram showing one embodiment of the disclosed remote direct memory access (RDMA) enabled network adapter controller (RNIC) converging system utilizing PNet IDs.

FIG. 7 is a block diagram showing one embodiment of the disclosed remote direct memory access (RDMA) enabled network adapter controller (RNIC) converging system 700 utilizing PNet IDs. RNIC converging system 700 may utilize network adapter 701, administrative network 702 and network adapter 703 to couple HCM IHS 500 to administered IHS 704. Administered IHS 704 may also be referred to as RNIC converging IHS 704. RNIC converging system 700 may utilize network adapter 701, administrative network 702 and network adapter 705 to couple HCM IHS 500 to administered IHS 706. RNIC converging system 700 may utilize network adapter 701, administrative network 702 and network adapter 707 to couple HCM IHS 500 to administered IHS 708. RNIC converging system 700 may utilize network adapter 701, administrative network 702 and network adapter 709 to couple HCM IHS 500 to administered IHS 710. Administered IHSs 704, 706, 708 and 710 couple via administrative network 702 to HCM IHS 500 to enable HCM IHS 500 to administer HCM database 800 with HCM tool 600 to the administered IHSs.

RNIC converging system 700 may utilize network adapter 711 and/or network adapter 712 via NETWORK A 713 via network adapter 714 and/or network adapter 715 to couple RNIC converging IHS 704 to administered IHS 706. RNIC converging system 700 may utilize network adapter 716 and/or network adapter 717 via NETWORK B 718 via network adapter 719 and/or network adapter 720 to couple RNIC converging IHS 704 to administered IHS 708. RNIC converging system 700 may utilize network adapter 721 and/or network adapter 722 via NETWORK C 723 via network adapter 724 and/or network adapter 725 to couple RNIC converging IHS 704 to administered IHS 708. RNIC converging system 700 may utilize network adapter 721 and/or network adapter 722 via NETWORK C 723 via network adapter 726 to couple RNIC converging IHS 704 to administered IHS 710.

In one embodiment, network adapter 701, 703, 705, 707 and 709 may be Ethernet (ETH) adapters. Network adapters 711, 714, 716, 719, 721, 724 and 726 may be open system adapters (OSAs). Network adapters 712, 715, 717, 720, 722 and 725 may be remote direct memory access (RDMA) enabled network adapter controllers (RNICs). In one embodiment, administrative network 702, NETWORK A 713, NETWORK B 718 and NETWORK C 723 may provide local area network (LAN) communications and/or wide area network (WAN) communications and/or virtual LAN communications and/or intranet communications and/or Internet communications to structures that couple thereto.

RNIC converging IHS 704 may include a hypervisor (not shown) that may create logical partition (LPAR) 727-1, LPAR 727-2, LPAR 727-3, LPAR 727-4, LPAR 727-5, LPAR 727-6 and LPAR 727-7 in RNIC converging IHS 704. LPAR 727-1, LPAR 727-2 and LPAR 727-3 may include virtual network adapter 728-1, virtual network adapter 728-2 and virtual network adapter 728-3, respectively. Virtual network adapter 728-1, virtual network adapter 728-2 and virtual network adapter 728-3 may couple to network adapter 711 via a channel, i.e., a bus. LPAR 727-4 and LPAR 727-5 may include virtual network adapter 728-4 and virtual network adapter 728-5, respectively. Virtual network adapter 728-4 and virtual network adapter 728-5 may couple to network adapter 716 via a channel. LPAR 727-6 and LPAR 727-7 may include virtual network adapter 728-6 and virtual network adapter 728-7, respectively. Virtual network adapter 728-6 and virtual network adapter 728-7 may couple to network adapter 721 via a channel.

LPAR 727-1, LPAR 727-2 and LPAR 727-3 may include virtual network adapter 729-1, virtual network adapter 729-2 and virtual network adapter 729-3, respectively. Virtual network adapter 729-1, virtual network adapter 729-2 and virtual network adapter 729-3 may couple to network adapter 712 via a channel. LPAR 727-4 and LPAR 727-5 may include virtual network adapter 729-4 and virtual network adapter 729-5, respectively. Virtual network adapter 729-4 and virtual network adapter 729-5 may couple to network adapter 717 via a channel. LPAR 727-6 and LPAR 727-7 may include virtual network adapter 729-6 and virtual network adapter 729-7, respectively. Virtual network adapter 729-6 and virtual network adapter 729-7 may couple to network adapter 722 via a channel.

FIG. 8 depicts one embodiment of HCM database 800 in the disclosed RNIC converging system 700. HCM tool 600 may store the hardware configuration information in HCM database 800 on a per adapter basis. In one embodiment, for each network adapter in RNIC converging system 700, HCM tool 600 may store, from the leftmost column to the rightmost column, the machine serial number (MSN), physical identification (PID), logical identification (LID), adapter type, logical partition (LPAR) access list, physical network identification (PNet ID) for a first port of the network adapter, and the PNet ID for the second port of the network adapter.

As shown in HCM database 800, the hardware configuration information of adapter 711 includes MSN of 00D5380C, PID of 0008, LID of 00F0, type of 0087, LPAR access list of 01, 02 and 03, and PNet ID 1 and PNet ID 2 of NETA. In other words, adapter 711 is located in physical channel 0008 in RNIC converging IHS 704 and may be identified logically by RNIC converging IHS 704 as 00F0. Adapter 711 is a physical OSA network adapter and couples to NETWORK A 713 on both ports 1 and 2. LPAR 727-1, 727-2 and 727-3 of RNIC converging IHS 704 may access adapter 711 to communicate via NETWORK A 713.

The hardware configuration information of adapter 712 includes MSN of 00D5380C, PID of 0009, LID of 02F0, type of 0008, LPAR access list of 01, 02 and 03, and PNet ID 1 and PNet ID 2 of NETA. In other words, adapter 712 is located in physical channel 0009 in RNIC converging IHS 704 and may be identified logically by RNIC converging IHS 704 as 02F0. Adapter 712 is a physical RNIC network adapter and couples to NETWORK A 713 on both ports 1 and 2. LPAR 727-1, 727-2 and 727-3 of RNIC converging IHS 704 may access adapter 712 to communicate via NETWORK A 713.

The hardware configuration information of adapter 716 includes MSN of 00D5380C, PID of 020A, LID of 00F4, type of 0087, LPAR access list of 04 and 05, and PNet ID 1 and PNet ID 2 of NETB. In other words, adapter 716 is located in physical channel 020A in RNIC converging IHS 704 and may be identified logically by RNIC converging IHS 704 as 00F4. Adapter 716 is a physical OSA network adapter and couples to NETWORK B 718 on both ports 1 and 2. LPAR 727-4 and 727-5 of RNIC converging IHS 704 may access adapter 716 to communicate via NETWORK B 718.

The hardware configuration information of adapter 717 includes MSN of 00D5380C, PID of 020B, LID of 02F4, type of 0008, LPAR access list of 04 and 05, and PNet ID 1 and PNet ID 2 of NETB. In other words, adapter 717 is located in physical channel 020B in RNIC converging IHS 704 and may be identified logically by RNIC converging IHS 704 as 02F4. Adapter 717 is a physical RNIC network adapter and couples to NETWORK B 718 on both ports 1 and 2. LPAR 727-4 and 727-5 of RNIC converging IHS 704 may access adapter 717 to communicate via NETWORK B 718.

The hardware configuration information of adapter 721 includes MSN of 00D5380C, PID of 0330, LID of 00F7, type of 0087, LPAR access list of 06 and 07, and PNet ID 1 and PNet ID 2 of NETC. In other words, adapter 721 is located in physical channel 0330 in RNIC converging IHS 704 and may be identified logically by RNIC converging IHS 704 as 00F7. Adapter 721 is a physical OSA network adapter and couples to NETWORK C 723 on both ports 1 and 2. LPAR 727-6 and 727-7 of RNIC converging IHS 704 may access adapter 721 to communicate via NETWORK C 723.

The hardware configuration information of adapter 722 includes MSN of 00D5380C, PID of 0331, LID of 02F7, type of 0008, LPAR access list of 06 and 07, and PNet ID 1 and PNet ID 2 of NETC. In other words, adapter 722 is located in physical channel 0331 in RNIC converging IHS 704 and may be identified logically by RNIC converging IHS 704 as 02F7. Adapter 722 is a physical RNIC network adapter and couples to NETWORK C 723 on both ports 1 and 2. LPAR 727-6 and 727-7 of RNIC converging IHS 704 may access adapter 722 to communicate via NETWORK C 723.

The hardware configuration information of adapter 714 includes MSN of 0007880A, PID of 020C, LID of 0022, type of 0087, LPAR access list with no entries, and PNet ID 1 and PNet ID 2 of NETA. In other words, adapter 714 is located in physical channel 020C in administered IHS 706 and may be identified logically by administered IHS 706 as 0022. Adapter 714 is a physical OSA network adapter and couples to NETWORK A 713 on both ports 1 and 2. Administered IHS 706 may access adapter 714 to communicate via NETWORK A 713.

The hardware configuration information of adapter 715 includes MSN of 0007880A, PID of 020D, LID of 0023, type of 0008, LPAR access list with no entries, and PNet ID 1 and PNet ID 2 of NETA. In other words, adapter 715 is located in physical channel 020D in administered IHS 706 and may be identified logically by administered IHS 706 as 0023. Adapter 715 is a physical RNIC network adapter and couples to NETWORK A 713 on both ports 1 and 2. Administered IHS 706 may access adapter 715 to communicate via NETWORK A 713.

The hardware configuration information of adapter 719 includes MSN of 003F230A, PID of 0111, LID of 0DA1, type of 0087, LPAR access list with no entries, and PNet ID 1 and PNet ID 2 of NETB. In other words, adapter 719 is located in physical channel 0111 in administered IHS 708 and may be identified logically by administered IHS 708 as 0DA1. Adapter 719 is a physical OSA network adapter and couples to NETWORK B 718 on both ports 1 and 2. Administered IHS 708 may access adapter 719 to communicate via NETWORK B 718.

The hardware configuration information of adapter 720 includes MSN of 003F230A, PID of 0112, LID of 0DA2, type of 0008, LPAR access list with no entries, and PNet ID 1 and PNet ID 2 of NETB. In other words, adapter 720 is located in physical channel 0112 in administered IHS 708 and may be identified logically by administered IHS 708 as 0DA2. Adapter 720 is a physical RNIC network adapter and couples to NETWORK B 718 on both ports 1 and 2. Administered IHS 708 may access adapter 720 to communicate via NETWORK B 718.

The hardware configuration information of adapter 724 includes MSN of 003F230A, PID of 020E, LID of 0024, type of 0087, LPAR access list with no entries, and PNet ID 1 and PNet ID 2 of NETC. In other words, adapter 724 is located in physical channel 020E in administered IHS 708 and may be identified logically by administered IHS 708 as 0024. Adapter 724 is a physical OSA network adapter and couples to NETWORK C 723 on both ports 1 and 2. Administered IHS 708 may access adapter 724 to communicate via NETWORK C 723.

The hardware configuration information of adapter 725 includes MSN of 003F230A, PID of 020F, LID of 0025, type of 0008, LPAR access list with no entries, and PNet ID 1 and PNet ID 2 of NETC. In other words, adapter 725 is located in physical channel 020F in administered IHS 708 and may be identified logically by administered IHS 708 as 0025. Adapter 725 is a physical RNIC network adapter and couples to NETWORK C 723 on both ports 1 and 2. Administered IHS 708 may access adapter 725 to communicate via NETWORK C 723.

The hardware configuration information of adapter 726 includes MSN of 668A2B01, PID of 0117, LID of 06D0, type of 0087, LPAR access list with no entries, and PNet ID 1 and PNet ID 2 of NETC. In other words, adapter 726 is located in physical channel 0117 in administered IHS 710 and may be identified logically by administered IHS 710 as 06D0. Adapter 726 is a physical OSA network adapter and couples to NETWORK C 723 on both ports 1 and 2. Administered IHS 710 may access adapter 726 to communicate via NETWORK C 723.

As illustrated in FIG. 7, RNIC converging tool 1200 may group OSA adapter 711 with RNIC adapter 712. RNIC converging tool 1200 may sort the adapters by PNet IDs and by type to group OSA and RNIC type adapters together. RNIC converging tool 1200 may group OSA adapter 711 with RNIC adapter 712, allowing the adapters to function together on NETWORK A 713. These grouped adapters, i.e. RNIC converged adapters, allow LPARs to easily utilize the adapters for RDMA communications. RDMA is remote direct memory access, a technology that enables an IHS to exchange information with another IHS without involving the processor, cache or operating system.

Figure 9:
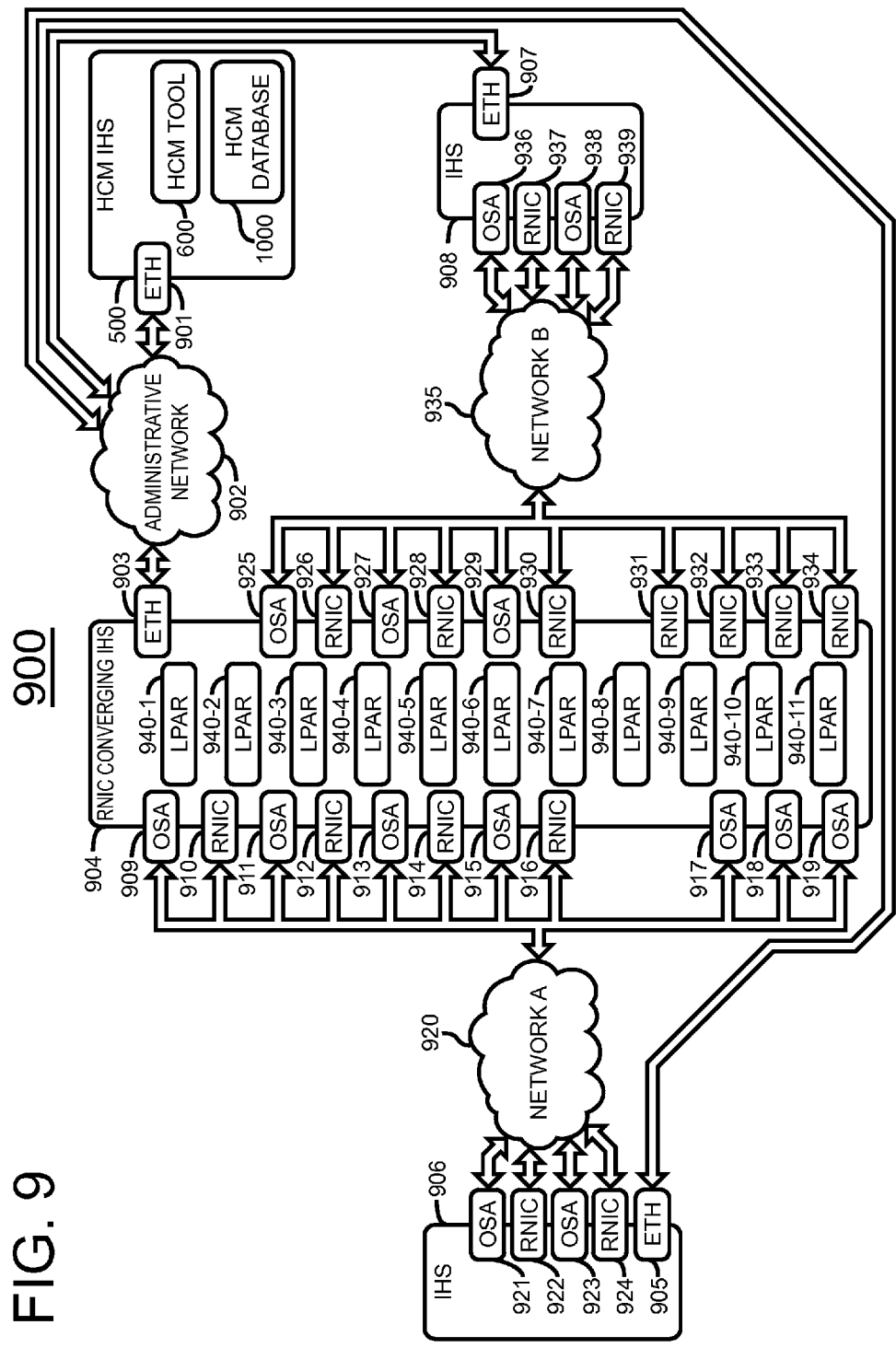
FIG. 9 is a block diagram showing another embodiment of the disclosed RNIC converging system utilizing PNet IDs.

FIG. 9 is a block diagram showing one embodiment of the disclosed remote RNIC converging system 900 utilizing PNet IDs. RNIC converging system 900 may utilize network adapter 901, administrative network 902 and network adapter 903 to couple HCM IHS 500 to administered IHS 904. Administered IHS 904 may also be referred to as RNIC converging IHS 904. RNIC converging system 900 may utilize network adapter 901, administrative network 902 and network adapter 905 to couple HCM IHS 500 to administered IHS 906. RNIC converging system 900 may utilize network adapter 901, administrative network 902 and network adapter 907 to couple HCM IHS 500 to administered IHS 908. Administered IHSs 904, 906 and 908 couple via administrative network 902 to HCM IHS 500 to enable HCM IHS 500 to administer HCM database 1000 with HCM tool 600 to the administered IHSs.

RNIC converging system 900 may utilize network adapter 909 and/or network adapter 910 and/or network adapter 912 and/or network adapter 913 and/or network adapter 914 and/or network adapter 915 and/or network adapter 916 and/or network adapter 917 and/or network adapter 918 and/or network adapter 919 via NETWORK A 920 via network adapter 921 and/or network adapter 922 and/or network adapter 923 and/or network adapter 924 to couple RNIC converging IHS 904 to administered IHS 906. RNIC converging system 900 may utilize network adapter 925 and/or network adapter 926 and/or network adapter 927 and/or network adapter 928 and/or network adapter 929 and/or network adapter 930 and/or network adapter 931 and/or network adapter 932 and/or network adapter 933 and/or network adapter 934 via NETWORK B 935 via network adapter 936 and/or network adapter 937 and/or network adapter 938 and/or network adapter 939 to couple RNIC converging IHS 904 to administered IHS 908.

In one embodiment, network adapter 901, 903, 905 and 907 may be Ethernet (ETH) adapters. Network adapters 909, 911, 913, 915, 917, 918, 919, 921, 923, 925, 927 and 929 may be open system adapters (OSAs). Network adapters 910, 912, 914, 916, 922, 924, 926, 928, 930, 931, 932, 933 and 934 may be remote direct memory access (RDMA) enabled network adapter controllers (RNICs). In one embodiment, administrative network 902, NETWORK A 920 and NETWORK B 935 may provide local area network (LAN) communications and/or wide area network (WAN) communications and/or virtual LAN communications and/or intranet communications and/or Internet communications to structures that couple thereto.

RNIC converging IHS 904 may include a hypervisor (not shown) that may create logical partition (LPAR) 940-1, LPAR 940-2, LPAR 940-3, LPAR 940-4, LPAR 940-5, LPAR 940-6, LPAR 940-7, LPAR 940-8, LPAR 940-9, LPAR 940-10 and LPAR 940-11 in RNIC converging IHS 904. LPAR 940-1, LPAR 940-2, LPAR 940-3, LPAR 940-4, LPAR 940-5, LPAR 940-6, LPAR 940-7, LPAR 940-8, LPAR 940-9, LPAR 940-10 and LPAR 940-11 may include virtual network adapters. In one embodiment, the virtual network adapters may be ETH, OSA or RNIC type virtual network adapters.

Referring to the HCM database 1000 of FIG. 10 in conjunction with the RNIC converging system 900 of FIG. 9, LPAR 940-1, LPAR 940-2, LPAR 940-3, LPAR 940-4, LPAR 940-8, LPAR 940-9, LPAR 940-10 and LPAR 940-11 may each include a respective OSA type virtual network adapter. The OSA type virtual network adapters of LPAR 940-1, LPAR 940-2, 940-3, 940-4, LPAR 940-8, LPAR 940-9, LPAR 940-10 and LPAR 940-11 may couple to network adapter 909 via a channel, i.e., a bus. LPAR 940-1, LPAR 940-2, LPAR 940-3, LPAR 940-4, LPAR 940-8, LPAR 940-9, LPAR 940-10 and LPAR 940-11 may each include a respective RNIC type virtual network adapter. The RNIC type virtual network adapters of LPAR 940-1, LPAR 940-2, 940-3, 940-4, LPAR 940-8, LPAR 940-9, LPAR 940-10 and LPAR 940-11 may couple to network adapter 910 via a channel.

LPAR 940-4, LPAR 940-5, LPAR 940-6 and LPAR 940-7 may each include a respective OSA type virtual network adapter. The OSA type virtual network adapters of LPAR 940-4, LPAR 940-5, 940-6 and LPAR 940-7 may couple to network adapter 911 via a channel. LPAR 940-4, LPAR 940-5, LPAR 940-6 and LPAR 940-7 may each include a respective RNIC type virtual network adapter. The RNIC type virtual network adapters of LPAR 940-4, LPAR 940-5, 940-6 and LPAR 940-7 may couple to network adapter 912 via a channel.

LPAR 940-3 may include an OSA type virtual network adapter. The OSA type virtual network adapter of LPAR 940-3 may couple to network adapter 913 via a channel. LPAR 940-3 may include an RNIC type virtual network adapter. The RNIC type virtual network adapters of LPAR 940-3 may couple to network adapter 914 via a channel.

LPAR 940-2, LPAR 940-4, LPAR 940-6, LPAR 940-8 and LPAR 940-10 may each include a respective OSA type virtual network adapter. The OSA type virtual network adapters of LPAR 940-2, LPAR 940-4, 940-6, LPAR 940-8 and LPAR 940-10 may couple to network adapter 915 via a channel. LPAR 940-2, LPAR 940-4, LPAR 940-6, LPAR 940-8 and LPAR 940-10 may each include a respective RNIC type virtual network adapter. The RNIC type virtual network adapters of LPAR 940-2, LPAR 940-4, 940-6, LPAR 940-8 and LPAR 940-10 may couple to network adapter 916 via a channel.

LPAR 940-1, LPAR 940-2, LPAR 940-3, LPAR 940-4, LPAR 940-5, LPAR 940-6, LPAR 940-7 and LPAR 940-8 may each include a respective OSA type virtual network adapter. The OSA type virtual network adapters of LPAR 940-1, LPAR 940-2, 940-3, 940-4, LPAR 940-5, LPAR 940-6, LPAR 940-7 and LPAR 940-8 may couple to network adapter 917 via a channel. LPAR 940-1, LPAR 940-2, LPAR 940-3, LPAR 940-4, LPAR 940-7, LPAR 940-9, LPAR 940-10 and LPAR 940-11 may each include a respective OSA type virtual network adapter. The OSA type virtual network adapters of LPAR 940-1, LPAR 940-2, 940-3, 940-4, LPAR 940-7, LPAR 940-9, LPAR 940-10 and LPAR 940-11 may couple to network adapter 918 via a channel. LPAR 940-1, LPAR 940-3, LPAR 940-5, LPAR 940-7, LPAR 940-8, LPAR 940-9, LPAR 940-10 and LPAR 940-11 may each include a respective OSA type virtual network adapter. The OSA type virtual network adapters of LPAR 940-1, LPAR 940-3, 940-5, 940-7, LPAR 940-8, LPAR 940-9, LPAR 940-10 and LPAR 940-11 may couple to network adapter 919 via a channel.

LPAR 940-1, LPAR 940-2, LPAR 940-3, LPAR 940-4, LPAR 940-5, LPAR 940-6, LPAR 940-7 and LPAR 940-8 may each include a respective OSA type virtual network adapter. The OSA type virtual network adapters of LPAR 940-1, LPAR 940-2, 940-3, 940-4, LPAR 940-5, LPAR 940-6, LPAR 940-7 and LPAR 940-8 may couple to network adapter 925 via a channel. LPAR 940-1, LPAR 940-2, LPAR 940-3, LPAR 940-4, LPAR 940-5, LPAR 940-6, LPAR 940-7 and LPAR 940-8 may each include a respective RNIC type virtual network adapter. The RNIC type virtual network adapters of LPAR 940-1, LPAR 940-2, 940-3, 940-4, LPAR 940-5, LPAR 940-6, LPAR 940-7 and LPAR 940-8 may couple to network adapter 926 via a channel.

LPAR 940-9, LPAR 940-10 and LPAR 940-11 may each include a respective OSA type virtual network adapter. The OSA type virtual network adapters of LPAR 940-9, LPAR 940-10 and LPAR 940-11 may couple to network adapter 927 via a channel. LPAR 940-9, LPAR 940-10 and LPAR 940-11 may each include a respective RNIC type virtual network adapter. The RNIC type virtual network adapters of LPAR 940-9, LPAR 940-10 and LPAR 940-11 may couple to network adapter 928 via a channel.

LPAR 940-1, LPAR 940-3, LPAR 940-5 and LPAR 940-7 may each include a respective OSA type virtual network adapter. The OSA type virtual network adapters of LPAR 940-1, LPAR 940-3, LPAR 940-5 and LPAR 940-7 may couple to network adapter 929 via a channel. LPAR 940-1, LPAR 940-3, LPAR 940-5 and LPAR 940-7 may each include a respective RNIC type virtual network adapter. The RNIC type virtual network adapters of LPAR 940-1, LPAR 940-3, LPAR 940-5 and LPAR 940-7 may couple to network adapter 930 via a channel.

LPAR 940-1, LPAR 940-2, LPAR 940-3, LPAR 940-4, LPAR 940-5, LPAR 940-6, LPAR 940-7 and LPAR 940-8 may each include a respective RNIC type virtual network adapter. The RNIC type virtual network adapters of LPAR 940-1, LPAR 940-2, 940-3, 940-4, LPAR 940-5, LPAR 940-6, LPAR 940-7 and LPAR 940-8 may couple to network adapter 931 via a channel. LPAR 940-1, LPAR 940-2, LPAR 940-3, LPAR 940-4, LPAR 940-7, LPAR 940-9, LPAR 940-10 and LPAR 940-11 may each include a respective RNIC type virtual network adapter. The RNIC type virtual network adapters of LPAR 940-1, LPAR 940-2, 940-3, 940-4, LPAR 940-7, LPAR 940-9, LPAR 940-10 and LPAR 940-11 may couple to network adapter 932 via a channel.

LPAR 940-1, LPAR 940-2, LPAR 940-3, LPAR 940-4, LPAR 940-5, LPAR 940-6, LPAR 940-7 and LPAR 940-8 may each include a respective RNIC type virtual network adapter. The RNIC type virtual network adapters of LPAR 940-1, LPAR 940-2, 940-3, 940-4, LPAR 940-5, LPAR 940-6, LPAR 940-7 and LPAR 940-8 may couple to network adapter 933 via a channel. LPAR 940-1, LPAR 940-2, LPAR 940-3, LPAR 940-4, LPAR 940-7, LPAR 940-9, LPAR 940-10 and LPAR 940-11 may each include a respective RNIC type virtual network adapter. The RNIC type virtual network adapters of LPAR 940-1, LPAR 940-2, 940-3, 940-4, LPAR 940-7, LPAR 940-9, LPAR 940-10 and LPAR 940-11 may couple to network adapter 934 via a channel.

FIG. 10 depicts one embodiment of HCM database 1000 in the disclosed RNIC converging system 900. HCM tool 600 may store the hardware configuration information in HCM database 1000 on a per adapter basis. In one embodiment, for each network adapter in RNIC converging system 900, HCM tool 600 may store, from the leftmost column to the rightmost column, the machine serial number (MSN), physical identification (PID), logical identification (LID), adapter type, logical partition (LPAR) access list, physical network identification (PNet ID) for a first port of the network adapter, and the PNet ID for the second port of the network adapter.

As shown in HCM database 1000, the hardware configuration information of adapter 909 includes MSN of 000F3801, PID of 0011, LID of 00F0, type of 0087, LPAR access list of 01, 02, 03, 04, 08, 09, 0A and 0B, and PNet ID 1 and PNet ID 2 of NETA. In other words, adapter 909 is located in physical channel 0011 in RNIC converging IHS 904 and may be identified logically by RNIC converging IHS 904 as 00F0. Adapter 909 is a physical OSA network adapter and couples to NETWORK A 920 on both ports 1 and 2. LPAR 940-1, 940-2, 940-3, 940-4, 940-8, 940-9, 940-10 and 940-11 of RNIC converging IHS 904 may access adapter 909 to communicate via NETWORK A 920.

The hardware configuration information of adapter 910 includes MSN of 000F3801, PID of 0020, LID of 05C0, type of 0008, LPAR access list of 01, 02, 03, 04, 08, 09, 0A and 0B, and PNet ID 1 and PNet ID 2 of NETA. In other words, adapter 910 is located in physical channel 0020 in RNIC converging IHS 904 and may be identified logically by RNIC converging IHS 904 as 05C0. Adapter 910 is a physical RNIC network adapter and couples to NETWORK A 920 on both ports 1 and 2. LPAR 940-1, 940-2, 940-3, 940-4, 940-8, 940-9, 940-10 and 940-11 of RNIC converging IHS 904 may access adapter 910 to communicate via NETWORK A 920.

The hardware configuration information of adapter 911 includes MSN of 000F3801, PID of 0012, LID of 00F9, type of 0087, LPAR access list of 04, 05, 06 and 07, and PNet ID 1 and PNet ID 2 of NETA. In other words, adapter 911 is located in physical channel 0012 in RNIC converging IHS 904 and may be identified logically by RNIC converging IHS 904 as 00F9. Adapter 911 is a physical OSA network adapter and couples to NETWORK A 920 on both ports 1 and 2. LPAR 940-4, 940-5, 940-6 and 940-7 of RNIC converging IHS 904 may access adapter 911 to communicate via NETWORK A 920.

The hardware configuration information of adapter 912 includes MSN of 000F3801, PID of 0021, LID of 05C9, type of 0008, LPAR access list of 04, 05, 06 and 07, and PNet ID 1 and PNet ID 2 of NETA. In other words, adapter 912 is located in physical channel 0021 in RNIC converging IHS 904 and may be identified logically by RNIC converging IHS 904 as 05C9. Adapter 912 is a physical RNIC network adapter and couples to NETWORK A 920 on both ports 1 and 2. LPAR 940-4, 940-5, 940-6 and 940-7 of RNIC converging IHS 904 may access adapter 912 to communicate via NETWORK A 920.

The hardware configuration information of adapter 913 includes MSN of 000F3801, PID of 0013, LID of 00FE, type of 0087, LPAR access list of 03, and PNet ID 1 and PNet ID 2 of NETA. In other words, adapter 913 is located in physical channel 0013 in RNIC converging IHS 904 and may be identified logically by RNIC converging IHS 904 as 00FE. Adapter 913 is a physical OSA network adapter and couples to NETWORK A 920 on both ports 1 and 2. LPAR 940-3 of RNIC converging IHS 904 may access adapter 913 to communicate via NETWORK A 920.

The hardware configuration information of adapter 914 includes MSN of 000F3801, PID of 0022, LID of 05CE, type of 0008, LPAR access list of 03, and PNet ID 1 and PNet ID 2 of NETA. In other words, adapter 914 is located in physical channel 0022 in RNIC converging IHS 904 and may be identified logically by RNIC converging IHS 904 as 05CE. Adapter 914 is a physical RNIC network adapter and couples to NETWORK A 920 on both ports 1 and 2. LPAR 940-3 of RNIC converging IHS 904 may access adapter 914 to communicate via NETWORK A 920.

The hardware configuration information of adapter 915 includes MSN of 000F3801, PID of 0014, LID of 0100, type of 0087, LPAR access list of 02, 04, 06, 08 and 0A, and PNet ID 1 and PNet ID 2 of NETA. In other words, adapter 915 is located in physical channel 0014 in RNIC converging IHS 904 and may be identified logically by RNIC converging IHS 904 as 0100. Adapter 915 is a physical OSA network adapter and couples to NETWORK A 920 on both ports 1 and 2. LPAR 940-2, 940-4, 940-6, 940-8 and 940-10 of RNIC converging IHS 904 may access adapter 915 to communicate via NETWORK A 920.

The hardware configuration information of adapter 916 includes MSN of 000F3801, PID of 0023, LID of 0600, type of 0008, LPAR access list of 02, 04, 06, 08 and 0A, and PNet ID 1 and PNet ID 2 of NETA. In other words, adapter 916 is located in physical channel 0023 in RNIC converging IHS 904 and may be identified logically by RNIC converging IHS 904 as 0600. Adapter 916 is a physical RNIC network adapter and couples to NETWORK A 920 on both ports 1 and 2. LPAR 940-2, 940-4, 940-6, 940-8 and 940-10 of RNIC converging IHS 904 may access adapter 916 to communicate via NETWORK A 920.

The hardware configuration information of adapter 917 includes MSN of 000F3801, PID of 0015, LID of 0106, type of 0087, LPAR access list of 01, 02, 03, 04, 05, 06, 07 and 08, and PNet ID 1 and PNet ID 2 of NETA. In other words, adapter 917 is located in physical channel 0015 in RNIC converging IHS 904 and may be identified logically by RNIC converging IHS 904 as 0106. Adapter 917 is a physical OSA network adapter and couples to NETWORK A 920 on both ports 1 and 2. LPAR 940-1, 940-2, 940-3, 940-4, 940-5, 940-6, 940-7 and 940-8 of RNIC converging IHS 904 may access adapter 917 to communicate via NETWORK A 920.

The hardware configuration information of adapter 918 includes MSN of 000F3801, PID of 0016, LID of 010F, type of 0087, LPAR access list of 01, 02, 03, 04, 07, 09, 0A and 0B, and PNet ID 1 and PNet ID 2 of NETA. In other words, adapter 918 is located in physical channel 0016 in RNIC converging IHS 904 and may be identified logically by RNIC converging IHS 904 as 010F. Adapter 918 is a physical OSA network adapter and couples to NETWORK A 920 on both ports 1 and 2. LPAR 940-1, 940-2, 940-3, 940-4, 940-7, 940-9, 940-10 and 940-11 of RNIC converging IHS 904 may access adapter 918 to communicate via NETWORK A 920.

The hardware configuration information of adapter 919 includes MSN of 000F3801, PID of 0017, LID of 0118, type of 0087, LPAR access list of 01, 03, 05, 07, 08, 09, 0A and 0B, and PNet ID 1 and PNet ID 2 of NETA. In other words, adapter 919 is located in physical channel 0017 in RNIC converging IHS 904 and may be identified logically by RNIC converging IHS 904 as 0118. Adapter 919 is a physical OSA network adapter and couples to NETWORK A 920 on both ports 1 and 2. LPAR 940-1, 940-3, 940-5, 940-7, 940-8, 940-9, 940-10 and 940-11 of RNIC converging IHS 904 may access adapter 919 to communicate via NETWORK A 920.

The hardware configuration information of adapter 925 includes MSN of 000F3801, PID of 0018, LID of 0120, type of 0087, LPAR access list of 01, 02, 03, 04, 05, 06, 07 and 08, and PNet ID 1 and PNet ID 2 of NETB. In other words, adapter 925 is located in physical channel 0018 in RNIC converging IHS 904 and may be identified logically by RNIC converging IHS 904 as 0120. Adapter 925 is a physical OSA network adapter and couples to NETWORK B 935 on both ports 1 and 2. LPAR 940-1, 940-2, 940-3, 940-4, 940-5, 940-6, 940-7 and 940-8 of RNIC converging IHS 904 may access adapter 925 to communicate via NETWORK B 935.

The hardware configuration information of adapter 926 includes MSN of 000F3801, PID of 0024, LID of 0606, type of 0008, LPAR access list of 01, 02, 03, 04, 05, 06, 07 and 08, and PNet ID 1 and PNet ID 2 of NETB. In other words, adapter 926 is located in physical channel 0024 in RNIC converging IHS 904 and may be identified logically by RNIC converging IHS 904 as 0606. Adapter 926 is a physical RNIC network adapter and couples to NETWORK B 935 on both ports 1 and 2. LPAR 940-1, 940-2, 940-3, 940-4, 940-5, 940-6, 940-7 and 940-8 of RNIC converging IHS 904 may access adapter 926 to communicate via NETWORK B 935.

The hardware configuration information of adapter 927 includes MSN of 000F3801, PID of 0019, LID of 0129, type of 0087, LPAR access list of 09, 0A and 0B, and PNet ID 1 and PNet ID 2 of NETB. In other words, adapter 927 is located in physical channel 0019 in RNIC converging IHS 904 and may be identified logically by RNIC converging IHS 904 as 0129. Adapter 927 is a physical OSA network adapter and couples to NETWORK B 935 on both ports 1 and 2. LPAR 940-9, 940-10 and 940-11 of RNIC converging IHS 904 may access adapter 927 to communicate via NETWORK B 935.

The hardware configuration information of adapter 928 includes MSN of 000F3801, PID of 0025, LID of 060F, type of 0008, LPAR access list of 09, 0A and 0B, and PNet ID 1 and PNet ID 2 of NETB. In other words, adapter 928 is located in physical channel 0025 in RNIC converging IHS 904 and may be identified logically by RNIC converging IHS 904 as 060F. Adapter 928 is a physical RNIC network adapter and couples to NETWORK B 935 on both ports 1 and 2. LPAR 940-9, 940-10 and 940-11 of RNIC converging IHS 904 may access adapter 928 to communicate via NETWORK B 935.

The hardware configuration information of adapter 929 includes MSN of 000F3801, PID of 001A, LID of 012D, type of 0087, LPAR access list of 01, 03, 05 and 07, and PNet ID 1 and PNet ID 2 of NETB. In other words, adapter 929 is located in physical channel 001A in RNIC converging IHS 904 and may be identified logically by RNIC converging IHS 904 as 012D. Adapter 929 is a physical OSA network adapter and couples to NETWORK B 935 on both ports 1 and 2. LPAR 940-1, 940-3, 940-5 and 940-7 of RNIC converging IHS 904 may access adapter 929 to communicate via NETWORK B 935.

The hardware configuration information of adapter 930 includes MSN of 000F3801, PID of 0026, LID of 0613, type of 0008, LPAR access list of 01, 03, 05 and 07, and PNet ID 1 and PNet ID 2 of NETB. In other words, adapter 930 is located in physical channel 0026 in RNIC converging IHS 904 and may be identified logically by RNIC converging IHS 904 as 0613. Adapter 930 is a physical RNIC network adapter and couples to NETWORK B 935 on both ports 1 and 2. LPAR 940-1, 940-3, 940-5 and 940-7 of RNIC converging IHS 904 may access adapter 930 to communicate via NETWORK B 935.

The hardware configuration information of adapter 931 includes MSN of 000F3801, PID of 0027, LID of 0618, type of 0008, LPAR access list of 01, 02, 03, 04, 05, 06, 07 and 08, and PNet ID 1 and PNet ID 2 of NETB. In other words, adapter 931 is located in physical channel 0027 in RNIC converging IHS 904 and may be identified logically by RNIC converging IHS 904 as 0618. Adapter 931 is a physical RNIC network adapter and couples to NETWORK B 935 on both ports 1 and 2. LPAR 940-1, 940-2, 940-3, 940-4, 940-5, 940-6, 940-7 and 940-8 of RNIC converging IHS 904 may access adapter 931 to communicate via NETWORK B 935.

The hardware configuration information of adapter 932 includes MSN of 000F3801, PID of 0028, LID of 0621, type of 0008, LPAR access list of 01, 02, 03, 04, 07, 09, 0A and 0B, and PNet ID 1 and PNet ID 2 of NETB. In other words, adapter 932 is located in physical channel 0028 in RNIC converging IHS 904 and may be identified logically by RNIC converging IHS 904 as 0621. Adapter 932 is a physical RNIC network adapter and couples to NETWORK B 935 on both ports 1 and 2. LPAR 940-1, 940-2, 940-3, 940-4, 940-7, 940-9, 940-10 and 940-11 of RNIC converging IHS 904 may access adapter 932 to communicate via NETWORK B 935.

The hardware configuration information of adapter 933 includes MSN of 000F3801, PID of 0029, LID of 062A, type of 0008, LPAR access list of 01, 02, 03, 04, 05, 06, 07 and 08, and PNet ID 1 and PNet ID 2 of NETB. In other words, adapter 933 is located in physical channel 0029 in RNIC converging IHS 904 and may be identified logically by RNIC converging IHS 904 as 062A. Adapter 933 is a physical RNIC network adapter and couples to NETWORK B 935 on both ports 1 and 2. LPAR 940-1, 940-2, 940-3, 940-4, 940-5, 940-6, 940-7 and 940-8 of RNIC converging IHS 904 may access adapter 933 to communicate via NETWORK B 935.

The hardware configuration information of adapter 934 includes MSN of 000F3801, PID of 002A, LID of 0633, type of 0008, LPAR access list of 01, 02, 03, 04, 07, 09, 0A and 0B, and PNet ID 1 and PNet ID 2 of NETB. In other words, adapter 934 is located in physical channel 002A in RNIC converging IHS 904 and may be identified logically by RNIC converging IHS 904 as 0633. Adapter 934 is a physical RNIC network adapter and couples to NETWORK B 935 on both ports 1 and 2. LPAR 940-1, 940-2, 940-3, 940-4, 940-7, 940-9, 940-10 and 940-11 of RNIC converging IHS 904 may access adapter 934 to communicate via NETWORK B 935.

The hardware configuration information of adapter 921 includes MSN of 03006FF7, PID of 0101, LID of 0F01, type of 0087, LPAR access list with no entries, and PNet ID 1 and PNet ID 2 of NETA. In other words, adapter 921 is located in physical channel 0101 in administered IHS 906 and may be identified logically by administered IHS 906 as 0F01. Adapter 921 is a physical OSA network adapter and couples to NETWORK A 920 on both ports 1 and 2. Administered IHS 906 may access adapter 921 to communicate via NETWORK A 920.

The hardware configuration information of adapter 922 includes MSN of 03006FF7, PID of 0201, LID of 0F02, type of 0008, LPAR access list with no entries, and PNet ID 1 and PNet ID 2 of NETA. In other words, adapter 922 is located in physical channel 0201 in administered IHS 906 and may be identified logically by administered IHS 906 as 0F02. Adapter 922 is a physical RNIC network adapter and couples to NETWORK A 920 on both ports 1 and 2. Administered IHS 906 may access adapter 922 to communicate via NETWORK A 920.

The hardware configuration information of adapter 923 includes MSN of 03006FF7, PID of 0102, LID of 0F03, type of 0087, LPAR access list with no entries, and PNet ID 1 and PNet ID 2 of NETA. In other words, adapter 923 is located in physical channel 0102 in administered IHS 906 and may be identified logically by administered IHS 906 as 0F03. Adapter 923 is a physical OSA network adapter and couples to NETWORK A 920 on both ports 1 and 2. Administered IHS 906 may access adapter 923 to communicate via NETWORK A 920.

The hardware configuration information of adapter 924 includes MSN of 03006FF7, PID of 0202, LID of 0F04, type of 0008, LPAR access list with no entries, and PNet ID 1 and PNet ID 2 of NETA. In other words, adapter 924 is located in physical channel 0202 in administered IHS 906 and may be identified logically by administered IHS 906 as 0F04. Adapter 924 is a physical RNIC network adapter and couples to NETWORK A 920 on both ports 1 and 2. Administered IHS 906 may access adapter 924 to communicate via NETWORK A 920.

The hardware configuration information of adapter 936 includes MSN of D832900A, PID of 0055, LID of DD06, type of 0087, LPAR access list with no entries, and PNet ID 1 and PNet ID 2 of NETB. In other words, adapter 936 is located in physical channel 0055 in administered IHS 908 and may be identified logically by administered IHS 908 as DD06. Adapter 936 is a physical OSA network adapter and couples to NETWORK B 935 on both ports 1 and 2. Administered IHS 908 may access adapter 936 to communicate via NETWORK B 935.

The hardware configuration information of adapter 937 includes MSN of D832900A, PID of 0057, LID of DD07, type of 0008, LPAR access list with no entries, and PNet ID 1 and PNet ID 2 of NETB. In other words, adapter 937 is located in physical channel 0057 in administered IHS 908 and may be identified logically by administered IHS 908 as DD07. Adapter 937 is a physical RNIC network adapter and couples to NETWORK B 935 on both ports 1 and 2. Administered IHS 908 may access adapter 937 to communicate via NETWORK B 935.

The hardware configuration information of adapter 938 includes MSN of D832900A, PID of 0056, LID of DD08, type of 0087, LPAR access list with no entries, and PNet ID 1 and PNet ID 2 of NETB. In other words, adapter 938 is located in physical channel 0056 in administered IHS 908 and may be identified logically by administered IHS 908 as DD08. Adapter 938 is a physical OSA network adapter and couples to NETWORK B 935 on both ports 1 and 2. Administered IHS 908 may access adapter 938 to communicate via NETWORK B 935.

The hardware configuration information of adapter 939 includes MSN of D832900A, PID of 0058, LID of DD09, type of 0008, LPAR access list with no entries, and PNet ID 1 and PNet ID 2 of NETB. In other words, adapter 939 is located in physical channel 0058 in administered IHS 908 and may be identified logically by administered IHS 908 as DD09. Adapter 939 is a physical RNIC network adapter and couples to NETWORK B 935 on both ports 1 and 2. Administered IHS 908 may access adapter 939 to communicate via NETWORK B 935.

As illustrated in FIG. 9, RNIC converging tool 1200 may group many OSA adapters with RNIC adapters, thus creating RNIC converged adapters. To create RNIC converged adapters, RNIC converging tool 1200 may sort the adapters by PNet IDs and adapter types. In one embodiment, RNIC converged adapters should be on the same network to function. Without PNet IDs and adapter types, RNIC converging tool 1200 would not be able to create RNIC converged adapters on the same network.

RNIC converged adapters allow OSA adapter 909 to initiate TCP/IP communications. When converged with RNIC adapter 910, RDMA communications may be more readily initiated and conducted. RNIC converged adapters allow LPARs to easily utilize the RNIC converging adapters for RDMA communications. RDMA communications may exhibit lower latency than TCP/IP communications. RDMA is remote direct memory access, a technology that enables an IHS to exchange information with another IHS without involving the processor, cache or operating system.

With respect to an RNIC converging IHS, the disclosed methodology logically causes two unlike adapters, such as OSA and RNIC adapters, that are connected to or associated with the same physical network to function together, i.e to converge, as if the two adapters were a single adapter (i.e. using standard TCP/IP protocol over the OSA and RDMA protocols over the RNIC.

Figure 11:
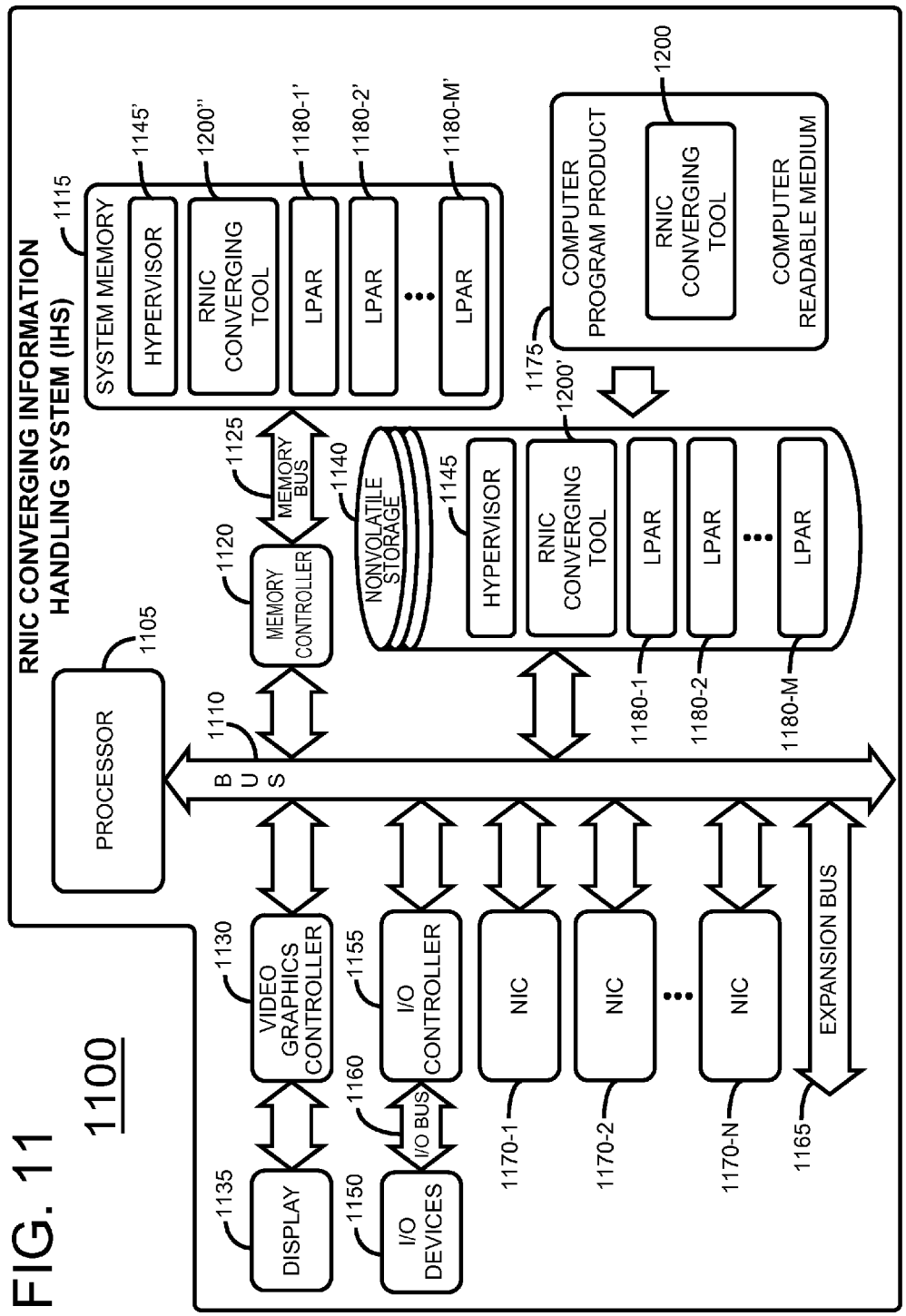
FIG. 11 is a block diagram of an RNIC converging IHS that may be used in the disclosed RNIC converging system.

FIG. 11 is a block diagram of an RNIC converging information handling system (IHS) 1100 that may be used in the disclosed RNIC converging system. RNIC converging IHS 1100 includes a processor 1105 that may include multiple cores. RNIC converging IHS 1100 processes, transfers, communicates, modifies, stores or otherwise handles information in digital form, analog form or other form. In one embodiment, RNIC converging IHS 1100 includes a bus 1110, i.e. channel 1110. In another embodiment, bus 1110 may be multiple busses, i.e., multiple channels. Bus 1110 may couple processor 1105 to memory 1115 via a memory controller 1120 and memory bus 1125. System memory 1115 may also be referred to as main memory. System memory 1115 may be a static random access memory (SRAM) array or a dynamic random access memory (DRAM) array. Processor 1105 may also include local memory such as L1, L2 and L3 caches.

In one embodiment, a video graphics controller 1130 couples display 1135 to bus 1110. In another embodiment, RNIC converging IHS 1100 may operate without display 1135 and/or video graphics controller 1130. Nonvolatile storage 1140, such as a hard disk drive, solid-state drive (SSD), CD drive, DVD drive, or other nonvolatile storage couples to bus 1110 to provide RNIC converging IHS 1100 with permanent storage of information. System memory 1115 and nonvolatile storage 1140 are both forms of memory stores. In one embodiment, nonvolatile storage 1140 stores a hypervisor 1145 (HYPERVISOR) that governs operation of RNIC converging IHS 1100. In another embodiment, nonvolatile storage 1140 may store an operating system (not shown) that governs operation of RNIC converging IHS 1100. In another embodiment, nonvolatile storage 1140 may store an operating system (not shown) that governs operation of RNIC converging IHS 1100, where the operating system includes a hypervisor (not shown).

I/O devices 1150, such as speakers, a keyboard and a pointing device, may couple to bus 1110 via I/O controller 1155 and I/O bus 1160. One or more expansion busses 1165, i.e. channels 1165, such as USB, IEEE 1394 bus, ATA, SATA, PCI, PCIE, DVI, HDMI and other busses, i.e. channels, couple to bus 1110 to facilitate the connection of peripherals and devices to RNIC converging IHS 1100. Network interface controllers (NICs), for example, NIC 1170-1, NIC 1170-2, ..., NIC 1170-N, wherein N is the number of NICs, may couple to bus 1110 to enable RNIC converging IHS 1100 to connect by wire or wirelessly to a network and other information handling systems. NIC 1170-1, NIC 1170-2, ..., NIC 1170-N may also be called a network communication adapter, network interface adapter, network adapter, network interface and/or an adapter. NIC 1170-1, NIC 1170-2, ..., NIC 1170-N may take many forms. For example, NIC 1170-1, NIC 1170-2, ..., NIC 1170-N may take the form of an Ethernet (ETH) adapter, open systems adapter (OSA), RDMA enabled network interface controller (RNIC) or other network communication adapter.

While FIG. 11 shows one IHS that employs processor 1105, the IHS may take many forms. For example, RNIC converging IHS 1100 may take the form of a mainframe, server, central processor complex (CPC), desktop, portable, laptop, notebook, tablet or other form factor computer or data processing system. RNIC converging IHS 1100 may take other form factors such as a gaming device, a personal digital assistant (PDA), a portable telephone device, a communication device or other devices that include a processor and memory.

RNIC converging IHS 1100 includes a RNIC converging tool computer program product 1200 on digital media 1175 such as a CD, DVD or other media. For simplicity, the term RNIC converging tool will be used below. RNIC converging IHS 1100 may store RNIC converging tool 1200 in nonvolatile storage 1140 as RNIC converging tool 1200'. RNIC converging IHS 1100 may also store hypervisor 1145 (HYPERVISOR) and logical partition (LPAR) 1180-1, LPAR 1180-2, ..., LPAR 1180-M, wherein M is the number of LPARs, in nonvolatile storage 1140.

In another embodiment, RNIC converging tool 1200' may be part of the hypervisor 1145 (not shown). In another embodiment, RNIC converging tool 1200' may be in LPAR 1180-1, LPAR 1180-2, ..., LPAR 1180-M. In another embodiment, RNIC converging IHS 1100 may store an operating system (not shown) that governs operation of RNIC converging IHS 1100, where the operating system includes a hypervisor (not shown) and where the operating system includes LPAR 1180-1, LPAR 1180-2, ..., LPAR 1180-M as virtual machines (not shown). When RNIC converging IHS 1100 initializes, the IHS loads hypervisor 1145 into system memory 1115 for execution as hypervisor 1145'. RNIC converging IHS 1100 also loads RNIC converging tool 1200' into system memory 1115 for execution as RNIC converging tool 1200". RNIC converging IHS 1100 may also load LPAR 1180-1, LPAR 1180-2, ..., LPAR 1180-M into system memory 1115 for execution as LPAR 1180-1', LPAR 1180-2', ..., LPAR 1180-M', respectively.

In another embodiment, when RNIC converging IHS 1100 initializes, the IHS may load an operating system (not shown) into system memory 1115 for execution. In another embodiment, when RNIC converging IHS 1100 initializes, the IHS may load an operating system (not shown) that includes a hypervisor (not shown) and includes LPAR 1180-1, LPAR 1180-2, ..., LPAR 1180-M as virtual machines (not shown) into system memory 1115 for execution.

Figure 12:
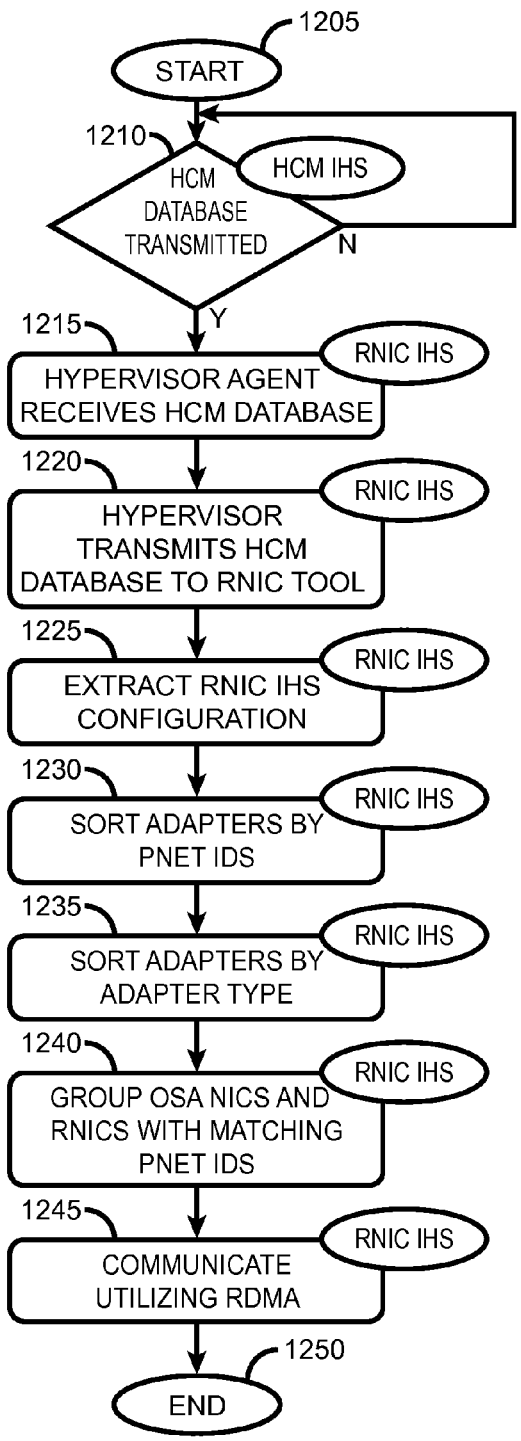
FIG. 12 is a flowchart that shows a representative process flow of an RNIC converging tool that may be used in the disclosed RNIC converging system.

FIG. 12 is a flowchart that shows a representative process flow of an RNIC converging tool 1200 that may be used in the disclosed RNIC converging system. Process flow commences when RNIC converging tool 1200 in RNIC converging IHS 1100 initializes, as per block 1205. If HCM tool 600 in HCM IHS 500 does not transmit HCM database 580, as per block 1210, process flow continues at block 1210. If HCM tool 600 in HCM IHS 500 does transmit HCM database 580, as per block 1210, a hypervisor agent in RNIC converging IHS 1100 may receive HCM database 580, as per block 1215. In one embodiment, the hypervisor agent in the RNIC converging IHS 1100 is included in hypervisor 1145.

The hypervisor agent may allow hypervisor 1145 to access HCM database 580. Hypervisor 1145 may transmit HCM database 580 to RNIC converging tool 1200, as per block 1220. RNIC converging tool 1200 may extract the hardware configuration information of RNIC converging IHS 1100 from the HCM database 580, as per block 1225. In one embodiment, the hardware configuration information of RNIC converging IHS 1100 from HCM database 580 may include, but is not limited to, on a per adapter basis, machine serial numbers (MSNs), physical identifications (PIDs), logical identifications (LIDs), adapter type, logical partition (LPAR) access list, physical network identification (PNet ID) of the first port of the adapter and the PNet ID of the second port of the adapter. In one embodiment, the adapter type "0087" may be an OSA adapter and the adapter type "0008" may be an RNIC adapter.

In one embodiment, the RNIC converging tool 1200 may share the extracted hardware configuration information of RNIC converging IHS 1100 with hypervisor 1145. Hypervisor 1145 may update the hardware configuration of RNIC converging IHS 1100 with the extracted hardware configuration information of RNIC converging IHS 1100. In another embodiment, the RNIC converging tool 1200 may share the extracted hardware configuration information of RNIC converging IHS 1100 with LPARs 1180-1, 1180-2, ..., 1180-M, where M is the number of LPARs in RNIC converging IHS 1100. LPARs 1180-1, 1180-2, ..., 1180-M may update their respective hardware configuration with the extracted hardware configuration information of RNIC converging IHS 1100.

RNIC converging tool 1200 may sort the extracted hardware configuration information by PNet IDs, as per block 1230. For example, the RNIC converging tool 1200 may list all adapters with the PNet ID of "NETA" first, followed by all adapters with the PNet ID of "NETB". RNIC converging tool 1200 may further sort the extracted configuration information by adapter type, as per block 1235. For example, the RNIC converging tool 1200 may list all adapters with the type "0087" and the PNet ID "NETA" first, followed by the adapters with the type "0008" and the PNet ID of "NETA", further followed by the adapters with the type "0087" and the PNet ID of "NETB".

In one embodiment, RNIC converging tool 1200 may group OSA adapters and RNIC adapters with matching PNet IDs, as per block 1240. For example, as shown in FIGS. 7 and 8, RNIC converging tool 1200 may group network adapter 711 and network adapter 712 together because adapter 711 is the type "0087", i.e. OSA, and adapter 712 is the type "0008", i.e. RNIC, and both adapters 711 and 712 have a PNet ID of "NETA". The RNIC converging tool 1200 may allow an LPAR with access to utilize the grouped adapters to communicate using RDMA, which may require both an OSA and RNIC adapter, as per block 1245. Process flow terminates at end block 1250. Alternatively, process flow may continue at start block 605.

III. Bridging System

Figure 13:
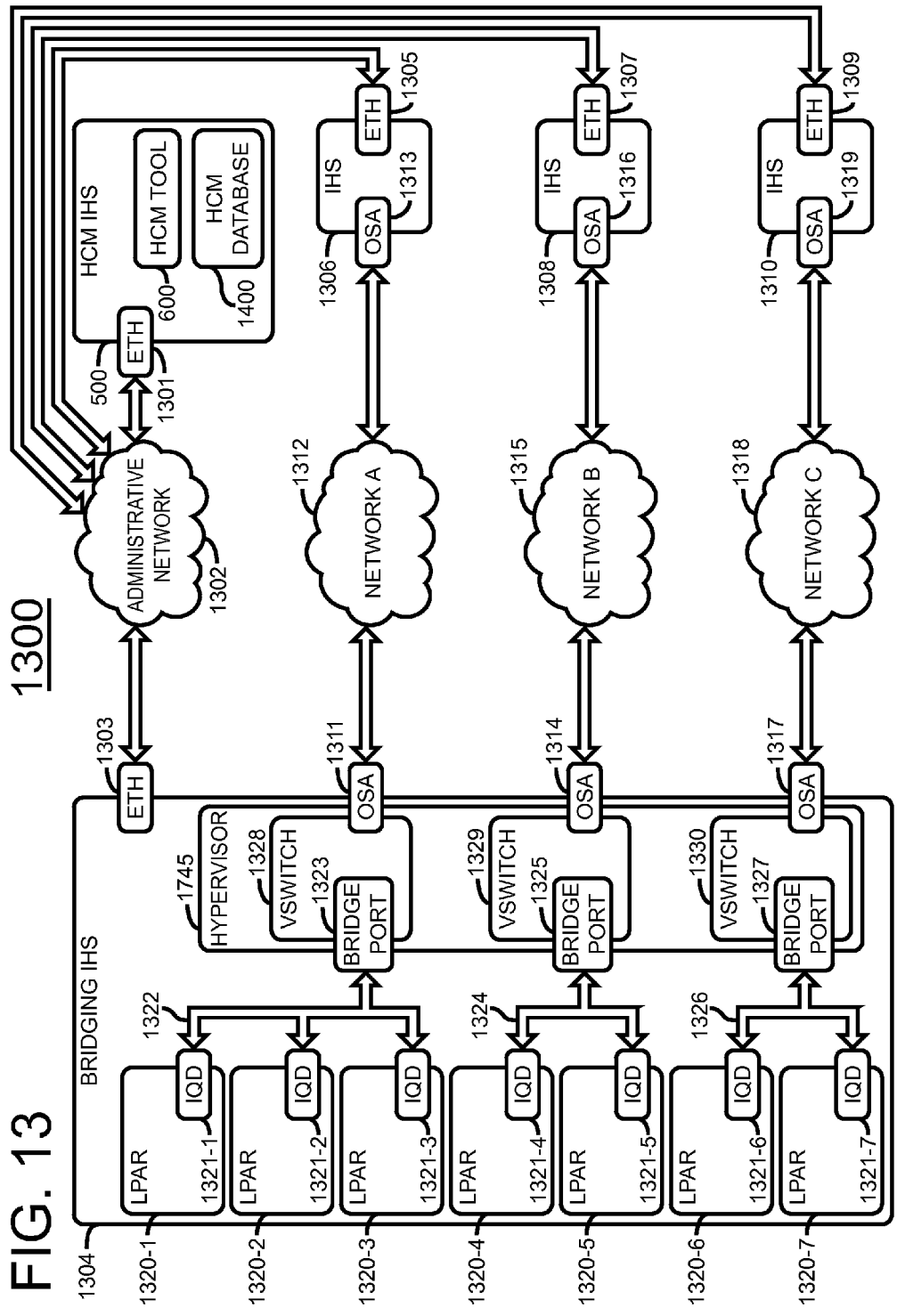
FIG. 13 is a block diagram showing one embodiment of the disclosed bridging system utilizing PNet IDs.

FIG. 13 is a block diagram showing one embodiment of the disclosed bridging system 1300 utilizing PNet IDs. Bridging system 1300 may utilize network adapter 1301, administrative network 1302 and network adapter 1303 to couple HCM IHS 500 to administered IHS 1304. Administered IHS 1304 may be referred to as bridging IHS 1304. Bridging system 1300 may utilize network adapter 1301, administrative network 1302 and network adapter 1305 to couple HCM IHS 500 to administered IHS 1306. Bridging system 1300 may utilize network adapter 1301, administrative network 1302 and network adapter 1307 to couple HCM IHS 500 to administered IHS 1308. Bridging system 1300 may utilize network adapter 1301, administrative network 1302 and network adapter 1309 to couple HCM IHS 500 to administered IHS 1310. Administered IHSs 1304, 1306, 1308 and 1310 couple via administrative network 1302 to HCM IHS 500 to enable HCM IHS 500 to administer HCM database 1400 with HCM tool 600 to the administered IHSs.

Bridging system 1300 may utilize network adapter 1311 via NETWORK A 1312 via network adapter 1313 to couple bridging IHS 1304 to administered IHS 1306. Bridging system 1300 may utilize network adapter 1314 via NETWORK B 1315 via network adapter 1316 to couple bridging IHS 1304 to administered IHS 1308. Bridging system 1300 may utilize network adapter 1317 via NETWORK C 1318 via network adapter 1319 to couple bridging IHS 1304 to administered IHS 1310.

In one embodiment, network adapters 1301, 1303, 1305, 1307 and 1309 may be Ethernet (ETH) adapters. Network adapters 1311, 1313, 1314, 1316, 1317 and 1319 may be open system adapters (OSAs). In one embodiment, administrative network 1302, NETWORK A 1312, NETWORK B 1315 and NETWORK C 1318 may provide local area network (LAN) communications and/or wide area network (WAN) communications and/or virtual LAN communications and/or intranet communications and/or Internet communications to structures that couple thereto.

Bridging IHS 1304 may include a hypervisor 1745 that may create logical partition (LPAR) 1320-1, LPAR 1320-2, LPAR 1320-3, LPAR 1320-4, LPAR 1320-5, LPAR 1320-6 and LPAR 1320-7 in bridging IHS 1304. LPAR 1320-1, LPAR 1320-2 and LPAR 1320-3 may include virtual internal network adapter 1321-1, virtual internal network adapter 1321-2 and virtual internal network adapter 1321-3, respectively. Virtual internal network adapter 1321-1 and/or virtual internal network adapter 1321-2 and/or virtual internal network adapter 1321-3 may couple via channel 1322 to virtual internal network adapter 1323. Virtual internal network adapter 1323 may be referred to as bridge port 1323.

LPAR 1320-4 and LPAR 1320-5 may include virtual internal network adapter 1321-4 and virtual internal network adapter 1321-5, respectively. Virtual internal network adapter 1321-4 and/or virtual internal network adapter 1321-5 may couple via channel 1324 to virtual internal network adapter 1325. Virtual internal network adapter 1325 may be referred to as bridge port 1325.

LPAR 1320-6 and LPAR 1320-7 may include virtual internal network adapter 1321-6 and virtual internal network adapter 1321-7, respectively. Virtual internal network adapter 1321-6 and/or virtual internal network adapter 1321-7 may couple via channel 1326 to virtual internal network adapter 1327. Virtual internal network adapter 1327 may be referred to as bridge port 1327.

In one embodiment, virtual internal network adapters 1321-1, 1321-2, 1321-3, 1321-4, 1321-5, 1321-6, 1321-7, 1323, 1325 and 1327 may be internal queued direct (IQD) communication adapters. Channel 1322, channel 1324 and channel 1326 may be respective IQD communication networks internal to bridging IHS 1304.

Hypervisor 1745 may create virtual switch (VSWITCH) 1328, VSWITCH 1329 and VSWITCH 1330 in bridging IHS 1304. In one embodiment, VSWITCH 1328, 1329 and 1330 are each specialized LPARs. VSWITCH 1328 may include virtual internal network adapter 1323 and network adapter 1311. VSWITCH 1329 may include virtual internal network adapter 1325 and network adapter 1314. VSWITCH 1330 may include virtual internal network adapter 1327 and network adapter 1317.

FIG. 14 depicts one embodiment of HCM database 1400 in the disclosed bridging system 1300. HCM tool 600 may store the hardware configuration information in HCM database 1400 on a per adapter basis. In one embodiment, for each network adapter in bridging system 1300, HCM tool 600 may store, from the leftmost column to the rightmost column, the machine serial number (MSN), physical identification (PID), logical identification (LID), adapter type, logical partition (LPAR) access list, physical network identification (PNet ID) network adapter.

As shown in HCM database 1400, the hardware configuration information of adapter 1311 includes MSN of 0A0A0B11, PID of 0006, LID of 00F1, type of 0087, LPAR access list of 01, 02 and 03, and PNet ID 1 and PNet ID 2 of NETA. In other words, adapter 1311 is located in physical channel 0006 in bridging IHS 1304 and may be identified logically by bridging IHS 1304 as 00F1. Adapter 1311 is a physical OSA network adapter and couples to NETWORK A 1312 on both ports 1 and 2. LPAR 1320-1, 1320-2 and 1320-3 of bridging IHS 1304 may access adapter 1311 to communicate via NETWORK A 1312.

The hardware configuration information of adapter 1314 includes MSN of 0A0A0B11, PID of 0007, LID of 00F5, type of 0087, LPAR access list of 04 and 05, and PNet ID 1 and PNet ID 2 of NETB. In other words, adapter 1314 is located in physical channel 0007 in bridging IHS 1304 and may be identified logically by bridging IHS 1304 as 00F5. Adapter 1314 is a physical OSA network adapter and couples to NETWORK B 1315 on both ports 1 and 2. LPAR 1320-4 and 1320-5 of bridging IHS 1304 may access adapter 1314 to communicate via NETWORK B 1315.

The hardware configuration information of adapter 1317 includes MSN of 0A0A0B11, PID of 0008, LID of 00F8, type of 0087, LPAR access list of 06 and 07, and PNet ID 1 and PNet ID 2 of NETC. In other words, adapter 1317 is located in physical channel 0008 in bridging IHS 1304 and may be identified logically by bridging IHS 1304 as 00F8. Adapter 1317 is a physical OSA network adapter and couples to NETWORK C 1318 on both ports 1 and 2. LPAR 1320-6 and 1320-7 of bridging IHS 1304 may access adapter 1317 to communicate via NETWORK C 1318.

The hardware configuration information of adapter 1321-1 includes MSN of 0A0A0B11, PID of 0112, LID of 04C1, type of 008D, LPAR access list of 01, 02 and 03, and PNet ID 1 of NETA and PNet ID 2 with no entry because adapter 1321-1 is virtual and does not have a second port. In other words, adapter 1321-1 is a virtual adapter with a virtual channel 0112 in bridging IHS 1304 and may be identified logically by bridging IHS 1304 as 04C1. Adapter 1321-1 is an IQD virtual network adapter and couples to IQD network 1322 on virtual channel 0112. LPAR 1320-1, 1320-2 and 1320-3 of bridging IHS 1304 may access adapter 1321-1 to communicate via IQD network 1322. PNet ID 1 of NETA indicates that a bridging tool 1800 may bridge adapter 1321-1 with adapter 1311 to allow LPAR 1320-1, 1320-2 and 1320-3 to access adapter 1311 to communicate via NETWORK A 1312.

The hardware configuration information of adapter 1321-2 includes MSN of 0A0A0B11, PID of 0112, LID of 04C2, type of 008D, LPAR access list of 01, 02 and 03, and PNet ID 1 of NETA and PNet ID 2 with no entry because adapter 1321-2 is virtual and does not have a second port. In other words, adapter 1321-2 is a virtual adapter with a virtual channel 0112 in bridging IHS 1304 and may be identified logically by bridging IHS 1304 as 04C2. Adapter 1321-2 is an IQD virtual network adapter and couples to IQD network 1322 on virtual channel 0112. LPAR 1320-1, 1320-2 and 1320-3 of bridging IHS 1304 may access adapter 1321-2 to communicate via IQD network 1322. PNet ID 1 of NETA indicates that a bridging tool 1800 may bridge adapter 1321-2 with adapter 1311 to allow LPAR 1320-1, 1320-2 and 1320-3 to access adapter 1311 to communicate via NETWORK A 1312.

The hardware configuration information of adapter 1321-3 includes MSN of 0A0A0B11, PID of 0112, LID of 04C3, type of 008D, LPAR access list of 01, 02 and 03, and PNet ID 1 of NETA and PNet ID 2 with no entry because adapter 1321-3 is virtual and does not have a second port. In other words, adapter 1321-3 is a virtual adapter with a virtual channel 0112 in bridging IHS 1304 and may be identified logically by bridging IHS 1304 as 04C3. Adapter 1321-3 is an IQD virtual network adapter and couples to IQD network 1322 on virtual channel 0112. LPAR 1320-1, 1320-2 and 1320-3 of bridging IHS 1304 may access adapter 1321-3 to communicate via IQD network 1322. PNet ID 1 of NETA indicates that a bridging tool 1800 may bridge adapter 1321-3 with adapter 1311 to allow LPAR 1320-1, 1320-2 and 1320-3 to access adapter 1311 to communicate via NETWORK A 1312.

The hardware configuration information of adapter 1321-4 includes MSN of 0A0A0B11, PID of 0113, LID of 04C5, type of 008D, LPAR access list of 04 and 05, and PNet ID 1 of NETB and PNet ID 2 with no entry because adapter 1321-4 is virtual and does not have a second port. In other words, adapter 1321-4 is a virtual adapter with a virtual channel 0113 in bridging IHS 1304 and may be identified logically by bridging IHS 1304 as 04C5. Adapter 1321-4 is an IQD virtual network adapter and couples to IQD network 1324 on virtual channel 0113. LPAR 1320-4 and 1320-5 of bridging IHS 1304 may access adapter 1321-4 to communicate via IQD network 1324. PNet ID 1 of NETB indicates that a bridging tool 1800 may bridge adapter 1321-4 with adapter 1311 to allow LPAR 1320-4 and 1320-5 to access adapter 1314 to communicate via NETWORK B 1315.

The hardware configuration information of adapter 1321-5 includes MSN of 0A0A0B11, PID of 0113, LID of 04C6, type of 008D, LPAR access list of 04 and 05, and PNet ID 1 of NETB and PNet ID 2 with no entry because adapter 1321-5 is virtual and does not have a second port. In other words, adapter 1321-5 is a virtual adapter with a virtual channel 0113 in bridging IHS 1304 and may be identified logically by bridging IHS 1304 as 04C6. Adapter 1321-5 is an IQD virtual network adapter and couples to IQD network 1324 on virtual channel 0113. LPAR 1320-4 and 1320-5 of bridging IHS 1304 may access adapter 1321-5 to communicate via IQD network 1324. PNet ID 1 of NETB indicates that a bridging tool 1800 may bridge adapter 1321-5 with adapter 1311 to allow LPAR 1320-4 and 1320-5 to access adapter 1314 to communicate via NETWORK B 1315.

The hardware configuration information of adapter 1321-6 includes MSN of 0A0A0B11, PID of 0114, LID of 04C8, type of 008D, LPAR access list of 06 and 07, and PNet ID 1 of NETC and PNet ID 2 with no entry because adapter 1321-6 is virtual and does not have a second port. In other words, adapter 1321-6 is a virtual adapter with a virtual channel 0114 in bridging IHS 1304 and may be identified logically by bridging IHS 1304 as 04C8. Adapter 1321-6 is an IQD virtual network adapter and couples to IQD network 1326 on virtual channel 0114. LPAR 1320-6 and 1320-7 of bridging IHS 1304 may access adapter 1321-6 to communicate via IQD network 1326. PNet ID 1 of NETC indicates that a bridging tool 1800 may bridge adapter 1321-6 with adapter 1311 to allow LPAR 1320-6 and 1320-7 to access adapter 1317 to communicate via NETWORK C 1318.

The hardware configuration information of adapter 1321-7 includes MSN of 0A0A0B11, PID of 0114, LID of 04C9, type of 008D, LPAR access list of 06 and 07, and PNet ID 1 of NETC and PNet ID 2 with no entry because adapter 1321-7 is virtual and does not have a second port. In other words, adapter 1321-7 is a virtual adapter with a virtual channel 0114 in bridging IHS 1304 and may be identified logically by bridging IHS 1304 as 04C9. Adapter 1321-7 is an IQD virtual network adapter and couples to IQD network 1326 on virtual channel 0114. LPAR 1320-6 and 1320-7 of bridging IHS 1304 may access adapter 1321-7 to communicate via IQD network 1326. PNet ID 1 of NETC indicates that a bridging tool 1800 may bridge adapter 1321-7 with adapter 1311 to allow LPAR 1320-6 and 1320-7 to access adapter 1317 to communicate via NETWORK C 1318.

The hardware configuration information of adapter 1313 includes MSN of 0000F12A, PID of 0022, LID of 0DA1, type of 0087, LPAR access list with no entries, and PNet ID 1 and PNet ID 2 of NETA. In other words, adapter 1313 is located in physical channel 0022 in administered IHS 1306 and may be identified logically by administered IHS 1306 as 0DA1. Adapter 1313 is a physical OSA network adapter and couples to NETWORK A 1312 on both ports 1 and 2. Administered IHS 1306 may access adapter 1313 to communicate via NETWORK A 1312.

The hardware configuration information of adapter 1316 includes MSN of DDD32AA, PID of 0054, LID of 00C1, type of 0087, LPAR access list with no entries, and PNet ID 1 and PNet ID 2 of NETB. In other words, adapter 1316 is located in physical channel 0054 in administered IHS 1308 and may be identified logically by administered IHS 1308 as 00C1. Adapter 1316 is a physical OSA network adapter and couples to NETWORK B 1315 on both ports 1 and 2. Administered IHS 1308 may access adapter 1316 to communicate via NETWORK B 1315.

The hardware configuration information of adapter 1319 includes MSN of 000000B2, PID of 0001, LID of 0DD4, type of 0087, LPAR access list with no entries, and PNet ID 1 and PNet ID 2 of NETC. In other words, adapter 1319 is located in physical channel 0001 in administered IHS 1310 and may be identified logically by administered IHS 1310 as 0DD4. Adapter 1319 is a physical OSA network adapter and couples to NETWORK C 1318 on both ports 1 and 2. Administered IHS 1310 may access adapter 1319 to communicate via NETWORK C 1318.

As illustrated in FIG. 13, in the HCM database 1400 of FIG. 14 IQD adapters 1321-6 and 1321-7 exhibit a PNet ID of NETC. This indicates to bridging tool 1800 (not shown in FIG. 13, but shown in FIG. 18) that the internal network IQD 1326 should be bridged to an external network (NETWORK C) that exhibits the same PNet ID as internal network IQD 1326. More particularly, bridging tool 1800 may bridge internal networks, i.e. networks internal to bridging IHS 1304, to external networks with a matching PNet ID. In one embodiment, an internal network (e.g. IQD 1426) is not assigned a PNet ID in the HCM database 1400 unless the internal network should be bridged to an external network, such as OSA 1317 that exhibits a matching PNet ID. In this particular example, OSA 1317 exhibits a PNet ID of NETC and IQD internal network IQD 1326 also exhibits the same PNet ID of NETC. In response to this match of PNet IDs, bridging tool 1800 may bridge the connection between IQD 1326 and OSA 1317, thus providing IQD 1326 with access to external NETWORK C. Without this bridge, provided by bridge port 1327 and (VSWITCH) 1330, IQD channels are only internal and not externally connected, in one embodiment. In one embodiment, an internal network such as IQD 1326 is not provided with a PNet ID unless that internal network is to be bridged with an external network.

Figure 15:
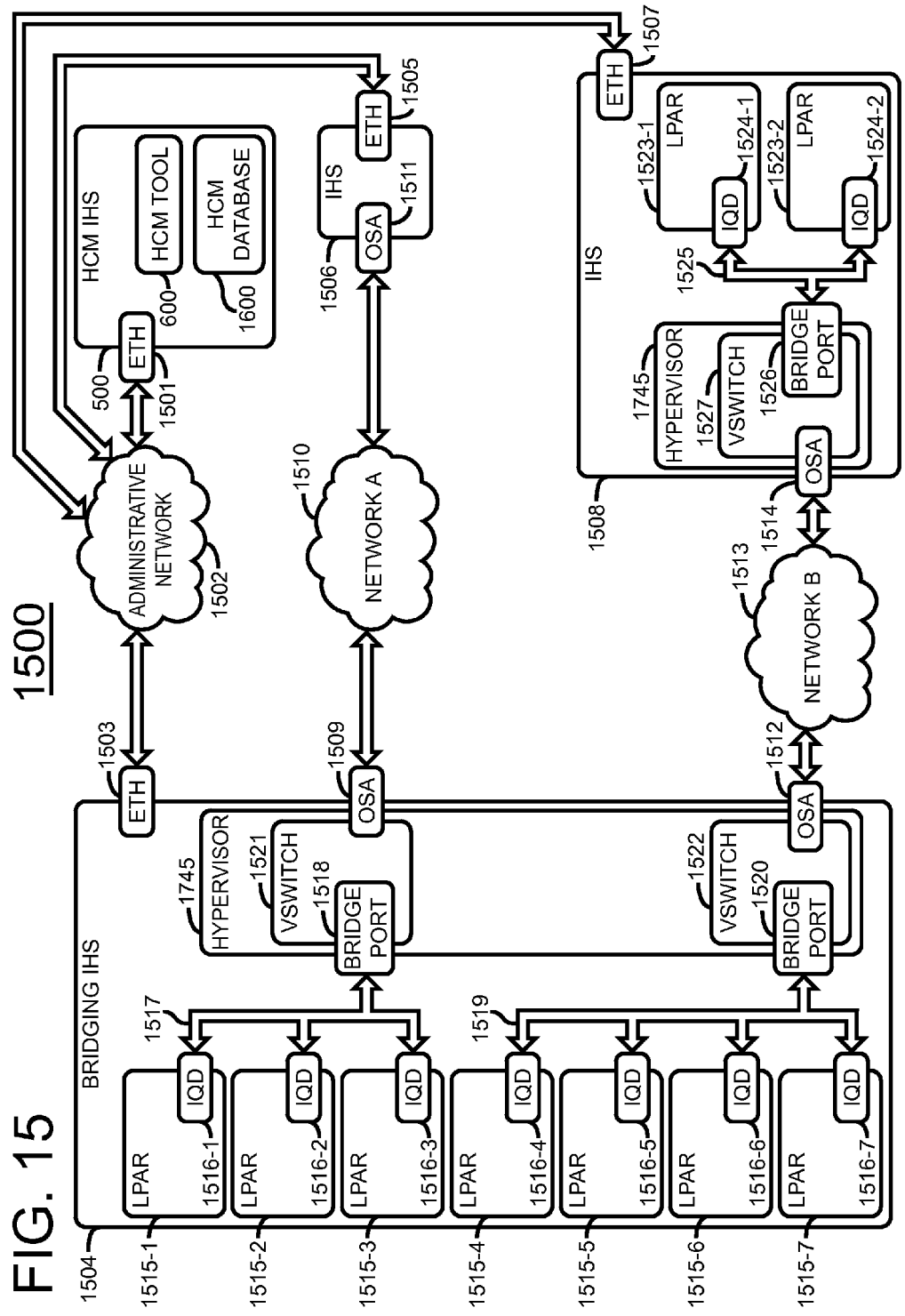
FIG. 15 is a block diagram showing another embodiment of the disclosed bridging system utilizing PNet IDs.

FIG. 15 is a block diagram showing one embodiment of the disclosed bridging system 1500 utilizing PNet IDs. Bridging system 1500 may utilize network adapter 1501, administrative network 1502 and network adapter 1503 to couple HCM IHS 500 to administered IHS 1504. Administered IHS 1504 may be referred to as bridging IHS 1504. Bridging system 1500 may utilize network adapter 1501, administrative network 1502 and network adapter 1505 to couple HCM IHS 500 to administered IHS 1506. Bridging system 1500 may utilize network adapter 1501, administrative network 1502 and network adapter 1507 to couple HCM IHS 500 to administered IHS 1508. Administered IHSs 1504, 1506 and 1508 couple via administrative network 1502 to HCM IHS 500 to enable HCM IHS 500 to administer HCM database 1600 with HCM tool 600 to the administered IHSs.

Bridging system 1500 may utilize network adapter 1509 via NETWORK A 1510 via network adapter 1511 to couple bridging IHS 1504 to administered IHS 1506. Bridging system 1500 may utilize network adapter 1512 via NETWORK B 1513 via network adapter 1514 to couple bridging IHS 1504 to administered IHS 1508.

In one embodiment, network adapters 1501, 1503, 1505 and 1507 may be Ethernet (ETH) adapters. Network adapters 1509, 1511, 1512 and 1514 may be open system adapters (OSAs). In one embodiment, administrative network 1502, NETWORK A 1510 and NETWORK B 1513 may provide local area network (LAN) communications and/or wide area network (WAN) communications and/or virtual LAN communications and/or intranet communications and/or Internet communications to structures that couple thereto.

Bridging IHS 1504 may include a hypervisor 1745 that may create logical partition (LPAR) 1515-1, LPAR 1515-2, LPAR 1515-3, LPAR 1515-4, LPAR 1515-5, LPAR 1515-6 and LPAR 1515-7 in bridging IHS 1504. LPAR 1515-1, LPAR 1515-2 and LPAR 1515-3 may include virtual internal network adapter 1516-1, virtual internal network adapter 1516-2 and virtual internal network adapter 1516-3, respectively. Virtual internal network adapter 1516-1 and/or virtual internal network adapter 1516-2 and/or virtual internal network adapter 1516-3 may couple via channel 1517 to virtual internal network adapter 1518. Virtual internal network adapter 1518 may be referred to as bridge port 1518.

LPAR 1515-4, LPAR 1515-5, LPAR 1515-6 and LPAR 1515-7 may include virtual internal network adapter 1516-4, virtual internal network adapter 1516-5, virtual internal network adapter 1516-6 and virtual internal network adapter 1516-7, respectively. Virtual internal network adapter 1516-4 and/or virtual internal network adapter 1516-5 and/or virtual internal network adapter 1516-6 and/or virtual internal network adapter 1516-7 may couple via channel 1519 to virtual internal network adapter 1520. Virtual internal network adapter 1520 may be referred to as bridge port 1520.

In one embodiment, virtual internal network adapters 1516-1, 1516-2, 1516-3, 1516-4, 1516-5, 1516-6, 1516-7, 1518 and 1519 may be internal queued direct (IQD) communication adapters. Channel 1517 and channel 1519 may be respective IQD communication networks internal to bridging IHS 1504.

Hypervisor 1745 in bridging IHS 1504 may create virtual switch (VSWITCH) 1521 and VSWITCH 1522 in bridging IHS 1504. In one embodiment, VSWITCH 1521 and 1522 are each specialized LPARs. VSWITCH 1521 may include virtual internal network adapter 1518 and network adapter 1509. VSWITCH 1522 may include virtual internal network adapter 1520 and network adapter 1512.

In one embodiment, administered IHS 1508 may be a bridging IHS. Administered IHS 1508 may include a hypervisor 1745 that may create LPAR 1523-1 and LPAR 1523-2 in administered IHS 1508. LPAR 1523-1 and LPAR 1523-2 may include virtual internal network adapter 1524-1 and virtual internal network adapter 1524-2, respectively. Virtual internal network adapter 1524-1 and/or virtual internal network adapter 1524-2 may couple via channel 1525 to virtual internal network adapter 1526. Virtual internal network adapter 1526 may be referred to as bridge port 1526.

In one embodiment, virtual internal network adapters 1524-1 and 1524-2 may be internal queued direct (IQD) communication adapters. Channel 1525 may be an IQD communication network internal to administered IHS 1508. Hypervisor 1745 in administered IHS 1508 may create virtual switch (VSWITCH) 1527 in administered IHS 1508. In one embodiment, VSWITCH 1527 may be a specialized LPAR. VSWITCH 1527 may include virtual internal network adapter 1526 and network adapter 1514.

FIG. 16 depicts one embodiment of HCM database 1600 in the disclosed bridging system 1500. HCM tool 600 may store the hardware configuration information in HCM database 1600 on a per adapter basis. In one embodiment, for each network adapter in bridging system 1500, HCM tool 600 may store, from the leftmost column to the rightmost column, the machine serial number (MSN), physical identification (PID), logical identification (LID), adapter type, logical partition (LPAR) access list, physical network identification (PNet ID) network adapter.

As shown in HCM database 1600, the hardware configuration information of adapter 1509 includes MSN of 03F00A21, PID of 0006, LID of 00F1, type of 0087, LPAR access list of 01, 02 and 03, and PNet ID 1 and PNet ID 2 of NETA. In other words, adapter 1509 is located in physical channel 0006 in bridging IHS 1504 and may be identified logically by bridging IHS 1504 as 00F1. Adapter 1509 is a physical OSA network adapter and couples to NETWORK A 1510 on both ports 1 and 2. LPAR 1515-1, 1515-2 and 1515-3 of bridging IHS 1504 may access adapter 1509 to communicate via NETWORK A 1510.

The hardware configuration information of adapter 1512 includes MSN of 03F00A21, PID of 0007, LID of 00F5, type of 0087, LPAR access list of 04, 05, 06 and 07, and PNet ID 1 and PNet ID 2 of NETB. In other words, adapter 1512 is located in physical channel 0007 in bridging IHS 1504 and may be identified logically by bridging IHS 1504 as 00F5. Adapter 1512 is a physical OSA network adapter and couples to NETWORK B 1513 on both ports 1 and 2. LPAR 1515-4, 1515-5, 1515-6 and 1515-7 of bridging IHS 1504 may access adapter 1512 to communicate via NETWORK B 1513.

The hardware configuration information of adapter 1516-1 includes MSN of 03F00A21, PID of 0111, LID of 04C0, type of 008D, LPAR access list of 01, 02 and 03, and PNet ID 1 of NETA and PNet ID 2 with no entry because adapter 1516-1 is virtual and does not have a second port. In other words, adapter 1516-1 is a virtual adapter with a virtual channel 0111 in bridging IHS 1504 and may be identified logically by bridging IHS 1504 as 04C0. Adapter 1516-1 is an IQD virtual network adapter and couples to IQD network 1517 on virtual channel 0111. LPAR 1515-1, 1515-2 and 1515-3 of bridging IHS 1504 may access adapter 1516-1 to communicate via IQD network 1517. PNet ID 1 of NETA indicates that a bridging tool 1800 may bridge adapter 1516-1 with adapter 1509 to allow LPAR 1515-1, 1515-2 and 1515-3 to access adapter 1509 to communicate via NETWORK A 1510.

The hardware configuration information of adapter 1516-2 includes MSN of 03F00A21, PID of 0111, LID of 04C1, type of 008D, LPAR access list of 01, 02 and 03, and PNet ID 1 of NETA and PNet ID 2 with no entry because adapter 1516-2 is virtual and does not have a second port. In other words, adapter 1516-2 is a virtual adapter with a virtual channel 0111 in bridging IHS 1504 and may be identified logically by bridging IHS 1504 as 04C1. Adapter 1516-2 is an IQD virtual network adapter and couples to IQD network 1517 on virtual channel 0111. LPAR 1515-1, 1515-2 and 1515-3 of bridging IHS 1504 may access adapter 1516-2 to communicate via IQD network 1517. PNet ID 1 of NETA indicates that a bridging tool 1800 may bridge adapter 1516-2 with adapter 1509 to allow LPAR 1515-1, 1515-2 and 1515-3 to access adapter 1509 to communicate via NETWORK A 1510.

The hardware configuration information of adapter 1516-3 includes MSN of 03F00A21, PID of 0111, LID of 04C2, type of 008D, LPAR access list of 01, 02 and 03, and PNet ID 1 of NETA and PNet ID 2 with no entry because adapter 1516-3 is virtual and does not have a second port. In other words, adapter 1516-3 is a virtual adapter with a virtual channel 0111 in bridging IHS 1504 and may be identified logically by bridging IHS 1504 as 04C2. Adapter 1516-3 is an IQD virtual network adapter and couples to IQD network 1517 on virtual channel 0111. LPAR 1515-1, 1515-2 and 1515-3 of bridging IHS 1504 may access adapter 1516-3 to communicate via IQD network 1517. PNet ID 1 of NETA indicates that a bridging tool 1800 may bridge adapter 1516-3 with adapter 1509 to allow LPAR 1515-1, 1515-2 and 1515-3 to access adapter 1509 to communicate via NETWORK A 1510.

The hardware configuration information of adapter 1516-4 includes MSN of 03F00A21, PID of 0112, LID of 04C4, type of 008D, LPAR access list of 04, 05, 06 and 07, and PNet ID 1 of NETB and PNet ID 2 with no entry because adapter 1516-4 is virtual and does not have a second port. In other words, adapter 1516-4 is a virtual adapter with a virtual channel 0112 in bridging IHS 1504 and may be identified logically by bridging IHS 1504 as 04C4. Adapter 1516-4 is an IQD virtual network adapter and couples to IQD network 1519 on virtual channel 0112. LPAR 1515-4, 1515-5, 1515-6 and 1515-7 of bridging IHS 1504 may access adapter 1516-4 to communicate via IQD network 1519. PNet ID 1 of NETB indicates that a bridging tool 1800 may bridge adapter 1516-4 with adapter 1512 to allow LPAR 1515-4, 1515-5, 1515-6 and 1515-7 to access adapter 1512 to communicate via NETWORK B 1513.

The hardware configuration information of adapter 1516-5 includes MSN of 03F00A21, PID of 0112, LID of 04C5, type of 008D, LPAR access list of 04, 05, 06 and 07, and PNet ID 1 of NETB and PNet ID 2 with no entry because adapter 1516-5 is virtual and does not have a second port. In other words, adapter 1516-5 is a virtual adapter with a virtual channel 0112 in bridging IHS 1504 and may be identified logically by bridging IHS 1504 as 04C5. Adapter 1516-5 is an IQD virtual network adapter and couples to IQD network 1519 on virtual channel 0112. LPAR 1515-4, 1515-5, 1515-6 and 1515-7 of bridging IHS 1504 may access adapter 1516-5 to communicate via IQD network 1519. PNet ID 1 of NETB indicates that a bridging tool 1800 may bridge adapter 1516-5 with adapter 1512 to allow LPAR 1515-4, 1515-5, 1515-6 and 1515-7 to access adapter 1512 to communicate via NETWORK B 1513.

The hardware configuration information of adapter 1516-6 includes MSN of 03F00A21, PID of 0112, LID of 04C6, type of 008D, LPAR access list of 04, 05, 06 and 07, and PNet ID 1 of NETB and PNet ID 2 with no entry because adapter 1516-6 is virtual and does not have a second port. In other words, adapter 1516-6 is a virtual adapter with a virtual channel 0112 in bridging IHS 1504 and may be identified logically by bridging IHS 1504 as 04C6. Adapter 1516-6 is an IQD virtual network adapter and couples to IQD network 1519 on virtual channel 0112. LPAR 1515-4, 1515-5, 1515-6 and 1515-7 of bridging IHS 1504 may access adapter 1516-6 to communicate via IQD network 1519. PNet ID 1 of NETB indicates that a bridging tool 1800 may bridge adapter 1516-6 with adapter 1512 to allow LPAR 1515-4, 1515-5, 1515-6 and 1515-7 to access adapter 1512 to communicate via NETWORK B 1513.

The hardware configuration information of adapter 1516-7 includes MSN of 03F00A21, PID of 0112, LID of 04C7, type of 008D, LPAR access list of 04, 05, 06 and 07, and PNet ID 1 of NETB and PNet ID 2 with no entry because adapter 1516-7 is virtual and does not have a second port. In other words, adapter 1516-7 is a virtual adapter with a virtual channel 0112 in bridging IHS 1504 and may be identified logically by bridging IHS 1504 as 04C7. Adapter 1516-7 is an IQD virtual network adapter and couples to IQD network 1519 on virtual channel 0112. LPAR 1515-4, 1515-5, 1515-6 and 1515-7 of bridging IHS 1504 may access adapter 1516-7 to communicate via IQD network 1519. PNet ID 1 of NETB indicates that a bridging tool 1800 may bridge adapter 1516-7 with adapter 1512 to allow LPAR 1515-4, 1515-5, 1515-6 and 1515-7 to access adapter 1512 to communicate via NETWORK B 1513.

The hardware configuration information of adapter 1511 includes MSN of 2338282D, PID of 0031, LID of 00F3, type of 0087, LPAR access list with no entries, and PNet ID 1 and PNet ID 2 of NETA. In other words, adapter 1511 is located in physical channel 0031 in administered IHS 1506 and may be identified logically by administered IHS 1506 as 00F3. Adapter 1511 is a physical OSA network adapter and couples to NETWORK A 1510 on both ports 1 and 2. Administered IHS 1506 may access adapter 1511 to communicate via NETWORK A 1510.

The hardware configuration information of adapter 1514 includes MSN of 2338282D, PID of 0022, LID of 0DA1, type of 0087, LPAR access list of 01 and 02, and PNet ID 1 and PNet ID 2 of NETB. In other words, adapter 1514 is located in physical channel 0022 in bridging IHS 1508 and may be identified logically by bridging IHS 1508 as 0DA1. Adapter 1514 is a physical OSA network adapter and couples to NETWORK B 1513 on both ports 1 and 2. LPAR 1515-1 and 1515-2 of bridging IHS 1508 may access adapter 1514 to communicate via NETWORK B 1513.

The hardware configuration information of adapter 1524-1 includes MSN of 2338282D, PID of 0200, LID of 06D1, type of 008D, LPAR access list of 01 and 02, and PNet ID 1 of NETB and PNet ID 2 with no entry because adapter 1524-1 is virtual and does not have a second port. In other words, adapter 1524-1 is a virtual adapter with a virtual channel 0200 in bridging IHS 1508 and may be identified logically by bridging IHS 1508 as 06D1. Adapter 1524-1 is an IQD virtual network adapter and couples to IQD network 1525 on virtual channel 0200. LPAR 1523-1 and 1523-2 of bridging IHS 1508 may access adapter 1524-1 to communicate via IQD network 1525. PNet ID 1 of NETB indicates that a bridging tool 1800 may bridge adapter 1524-1 with adapter 1514 to allow LPAR 1523-1 and 1523-2 to access adapter 1514 to communicate via NETWORK B 1513.

The hardware configuration information of adapter 1524-2 includes MSN of 2338282D, PID of 0200, LID of 06D2, type of 008D, LPAR access list of 01 and 02, and PNet ID 1 of NETB and PNet ID 2 with no entry because adapter 1524-2 is virtual and does not have a second port. In other words, adapter 1524-2 is a virtual adapter with a virtual channel 0200 in bridging IHS 1508 and may be identified logically by bridging IHS 1508 as 06D2. Adapter 1524-2 is an IQD virtual network adapter and couples to IQD network 1525 on virtual channel 0200. LPAR 1523-1 and 1523-2 of bridging IHS 1508 may access adapter 1524-2 to communicate via IQD network 1525. PNet ID 1 of NETB indicates that a bridging tool 1800 may bridge adapter 1524-2 with adapter 1514 to allow LPAR 1523-1 and 1523-2 to access adapter 1514 to communicate via NETWORK B 1513.

Figure 17:
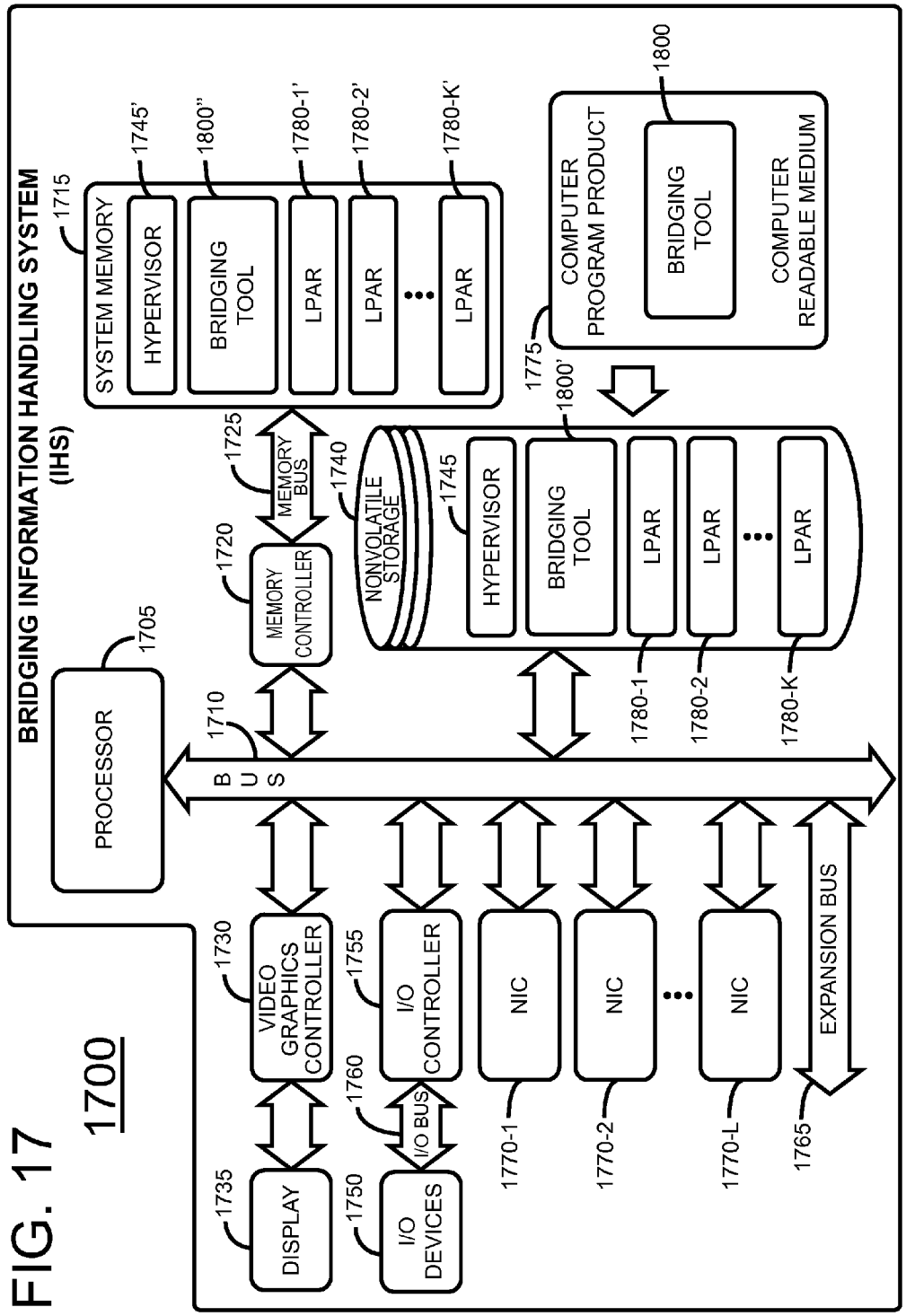
FIG. 17 is a block diagram of a bridging IHS that may be used in the disclosed bridging system.

FIG. 17 is a block diagram of a bridging information handling system (IHS) 1700 that may be used in the disclosed bridging system. With respect to FIG. 11, like numbers indicate like elements. Bridging IHS 1700 includes a processor 1705 that may include multiple cores. RNIC converging IHS 1700 processes, transfers, communicates, modifies, stores or otherwise handles information in digital form, analog form or other form. In one embodiment, bridging IHS 1700 includes a bus 1710, i.e. channel 1710. In another embodiment, bus 1710 may be multiple busses, i.e., multiple channels. Bus 1710 may couple processor 1705 to memory 1715 via a memory controller 1720 and memory bus 1725. System memory 1715 may also be referred to as main memory. System memory 1715 may be a static random access memory (SRAM) array or a dynamic random access memory (DRAM) array. Processor 1705 may also include local memory such as L1, L2 and L3 caches.

In one embodiment, a video graphics controller 1730 couples display 1735 to bus 1710. In another embodiment, bridging IHS 1700 may operate without display 1735 and/or video graphics controller 1730. Nonvolatile storage 1740, such as a hard disk drive, solid-state drive (SSD), CD drive, DVD drive, or other nonvolatile storage couples to bus 1710 to provide bridging IHS 1700 with permanent storage of information. System memory 1715 and nonvolatile storage 1740 are both forms of memory stores. In one embodiment, nonvolatile storage 1740 stores a hypervisor 1745 (HYPERVISOR) that governs operation of bridging IHS 1700. In another embodiment, nonvolatile storage 1740 may store an operating system (not shown) that governs operation of bridging IHS 1700. In another embodiment, nonvolatile storage 1740 may store an operating system (not shown) that governs operation of bridging IHS 1700, where the operating system includes a hypervisor (not shown).

I/O devices 1750, such as speakers, a keyboard and a pointing device, may couple to bus 1710 via I/O controller 1755 and I/O bus 1760. One or more expansion busses 1765, i.e. channels 1765, such as USB, IEEE 1394 bus, ATA, SATA, PCI, PCIE, DVI, HDMI and other busses, i.e. channels, couple to bus 1710 to facilitate the connection of peripherals and devices to bridging IHS 1700. Network interface controllers (NICs), for example, NIC 1770-1, NIC 1770-2, ... , NIC 1770-L, wherein L is the number of NICs, may couple to bus 1710 to enable bridging IHS 1700 to connect by wire or wirelessly to a network and other information handling systems. NIC 1770-1, NIC 1770-2, ... , NIC 1770-L may also be called a network communication adapter, network interface adapter, network adapter, network interface or an adapter. NIC 1770-1, NIC 1770-2, ... , NIC 1770-L may take many forms. For example, NIC 1770-1, NIC 1770-2, ... , NIC 1770-L may take the form of an Ethernet (ETH) adapter, open systems adapter (OSA), RDMA enabled network interface controller (RNIC) or other network communication adapter.

While FIG. 17 shows one IHS that employs processor 1705, the IHS may take many forms. For example, bridging IHS 1700 may take the form of a mainframe, server, central processor complex (CPC), desktop, portable, laptop, notebook, tablet or other form factor computer or data processing system. Bridging IHS 1700 may take other form factors such as a gaming device, a personal digital assistant (PDA), a portable telephone device, a communication device or other devices that include a processor and memory.

Bridging IHS 1700 includes a bridging tool computer program product 1800 on digital media 1775 such as a CD, DVD or other media. For simplicity, the term bridging tool will be used below. Bridging IHS 1700 may store bridging tool 1800 in nonvolatile storage 1740 as bridging tool 1800'. Bridging IHS 1700 may also store hypervisor 1745 (HYPERVISOR) and logical partition (LPAR) 1780-1, LPAR 1780-2, ... , LPAR 1780-K, wherein K is the number of LPARs, in nonvolatile storage 1740.

In another embodiment, bridging tool 1800' may be part of the hypervisor 1745 (not shown). In another embodiment, bridging tool 1800' may be in LPAR 1780-1, LPAR 1780-2, ... , LPAR 1780-K. In another embodiment, bridging IHS 1700 may store an operating system (not shown) that governs operation of bridging IHS 1700, where the operating system includes a hypervisor (not shown) and where the operating system includes LPAR 1780-1, LPAR 1780-2, ... , LPAR 1780-K as virtual machines (not shown). When bridging IHS 1700 initializes, the IHS loads hypervisor 1745 into system memory 1715 for execution as hypervisor 1745'. Bridging IHS 1700 also loads bridging tool 1800' into system memory 1715 for execution as bridging tool 1800". Bridging IHS 1700 may also load LPAR 1780-1, LPAR 1780-2, ... , LPAR 1780-K into system memory 1715 for execution as LPAR 1780-1', LPAR 1780-2', ... , LPAR 1780-K', respectively.

In another embodiment, when bridging IHS 1700 initializes, the IHS may load an operating system (not shown) into system memory 1715 for execution. In another embodiment, when bridging IHS 1700 initializes, the IHS may load an operating system (not shown) that includes a hypervisor (not shown) and includes LPAR 1780-1, LPAR 1780-2, ... , LPAR 1780-K as virtual machines (not shown) into system memory 1715 for execution.

Figure 18:
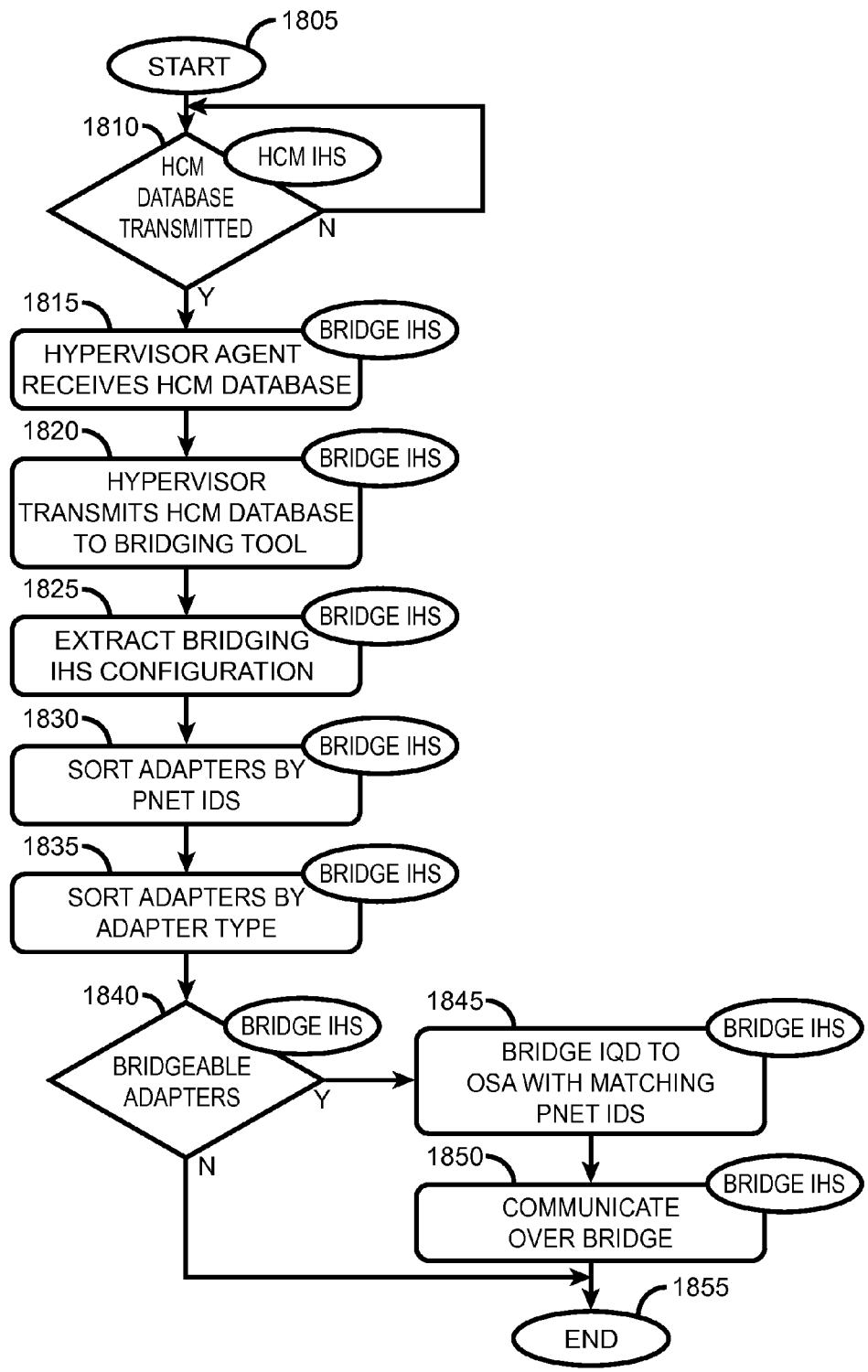
FIG. 18 is a flowchart that shows a representative process flow of a bridging tool that may be used in the disclosed bridging system.

FIG. 18 is a flowchart that shows a representative process flow of a bridging tool 1800 that may be used in the disclosed bridging system. Process flow commences when bridging tool 1800 in bridging IHS 1700 initializes, as per block 1805. If HCM tool 600 in HCM IHS 500 does not transmit HCM database 580, as per decision block 1810, process flow continues at decision block 1810. If HCM tool 600 in HCM IHS 500 does transmit HCM database 580, as per decision block 1810, a hypervisor agent in bridging IHS 1700 may receive HCM database 580, as per block 1815. In one embodiment, the hypervisor agent in the bridging IHS 1700 is included in hypervisor 1745.

The hypervisor agent may allow hypervisor 1745 to access HCM database 580. Hypervisor 1745 may transmit HCM database 580 to bridging tool 1800, as per block 1820. Bridging tool 1800 may extract the hardware configuration information of bridging IHS 1700 from the HCM database 580, as per block 1825. In one embodiment, the hardware configuration information of bridging IHS 1700 from HCM database 580 may include, but is not limited to, on a per adapter basis, machine serial numbers (MSNs), physical identifications (PIDs), logical identifications (LIDs), adapter types, a logical partition (LPAR) access list, a physical network identification (PNet ID) of the first port of the adapter and a PNet ID of the second port of the adapter. In one embodiment, the adapter type "0087" may be an OSA adapter and the adapter type "008D" may be an internal queued direct (IQD) communication adapter.

In one embodiment, the bridging tool 1800 may share the extracted hardware configuration information of bridging IHS 1700 with hypervisor 1745. Hypervisor 1745 may update the hardware configuration of bridging IHS 1700 with the extracted hardware configuration information of bridging IHS 1700. In another embodiment, the bridging tool 1800 may share the extracted hardware configuration information of bridging IHS 1700 with LPARs 1780-1, 1780-2, ... , 1780-K, where K is the number of LPARs in bridging IHS 1700. LPARs 1780-1, 1780-2, ... , 1780-K may update their respective hardware configuration with the extracted hardware configuration information of bridging IHS 1700.

Bridging tool 1800 may sort the extracted hardware configuration information by PNet IDs, as per block 1830. For example, the bridging tool 1800 may list all adapters with the PNet ID of "NETA" first, followed by all adapters with the PNet ID of "NETB". Bridging tool 1800 may further sort the extracted configuration information by adapter type, as per block 1835. For example, the bridging tool 1800 may list all adapters with the type "0087" and the PNet ID "NETA" first, followed by the adapters with the type "008D" and the PNet ID of "NETA", further followed by the adapters with the type "0087" and the PNet ID of "NETB".

Bridging tool 1800 may determine if any adapters may be bridged, as per decision block 1840. In one embodiment, bridging tool 1800 may bridge adapters with the type "008D", i.e. IQD, with adapters of the type "0087", i.e. OSA, if the IQD adapter's PNet ID matches the OSA's PNet ID. If bridging tool 1800 determines that bridging IHS 1700 contains bridgeable adapters, as per block 1840, bridging tool 1800 may bridge communications between IQD adapters and OSAs that have matching PNet IDs, as per block 1845. For example, as shown in FIGS. 13 and 14, virtual internal network adapter 1321-7 is of type "008D", i.e. IQD, and has a PNet ID of "NETC". Network adapter 1317 is of type "007", i.e. OSA, and has a PNet ID of "NETC".

Bridging tool 1800 may bridge communications between virtual internal network adapter 1321-7 and network adapter 1317. In one embodiment, virtual internal network adapter 1321-7 and bridge port 1327 are coupled. To bridge communications between virtual internal network adapter 1321-7 and network adapter 1317, bridging tool 1800 may bridge communications from bridge port 1327, through VSWITCH 1330, to network adapter 1327. In one embodiment, LPAR 1320-7 may then communicate over the bridge between virtual internal network adapter 1321-7 and network adapter 1317 to any IHS on NETWORK C 1318, as per block 1850.

Process flow terminates at end block 1855. If bridging tool 1800 determines that no adapters on bridging IHS 1700 may be bridged, as per decision block 1840, process flow terminates at end block 1855. Alternatively, process flow may continue at start block 1805.

IV. Load Balancing System

Figure 19:
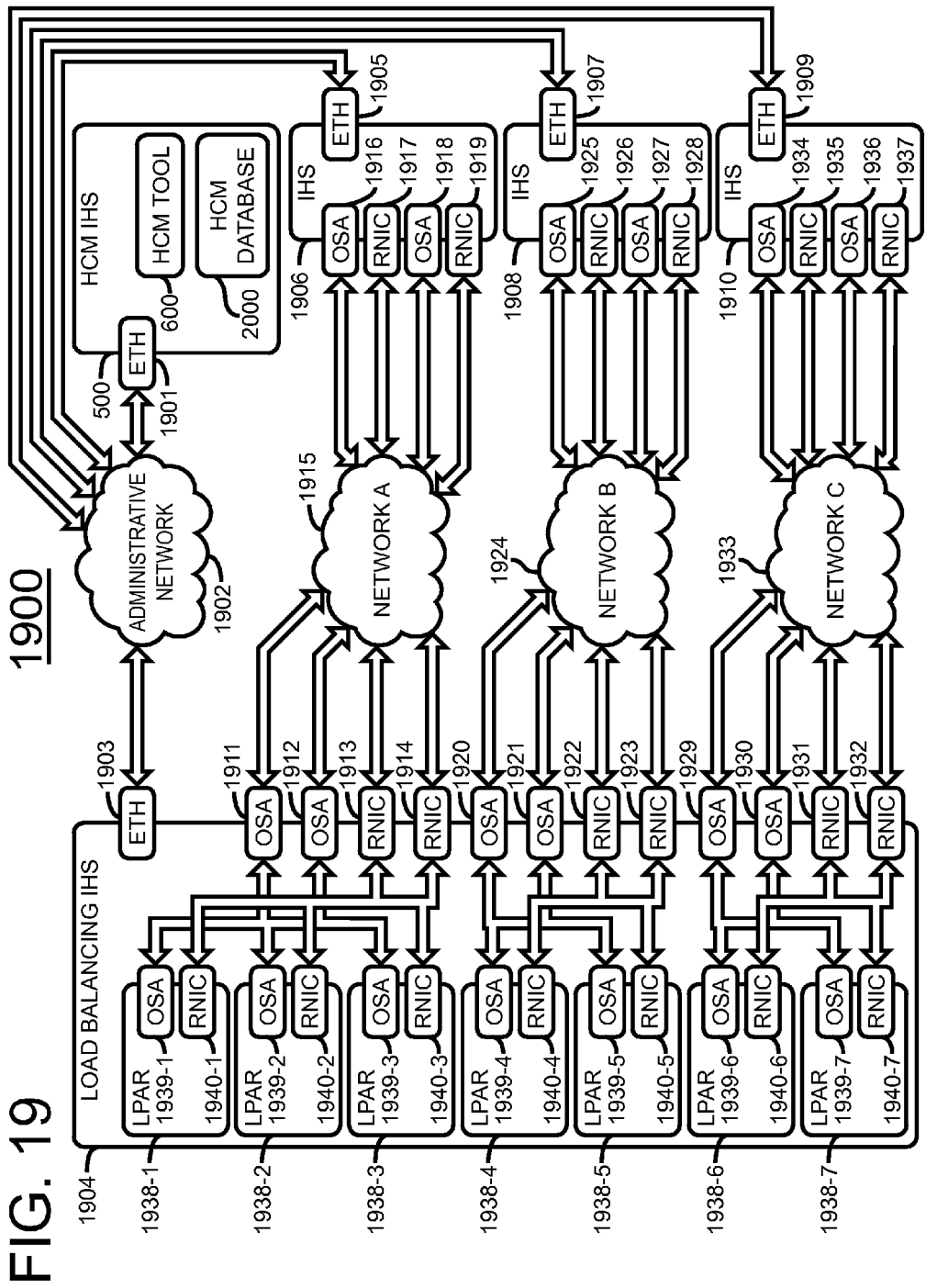
FIG. 19 is a block diagram showing one embodiment of the disclosed load balancing system utilizing PNet IDs.

FIG. 19 is a block diagram showing one embodiment of the disclosed load balancing system 1900 utilizing PNet IDs. Load balancing system 1900 may utilize network adapter 1901, administrative network 1902 and network adapter 1903 to couple HCM IHS 500 to administered IHS 1904. Administered IHS 1904 may also be referred to as load balancing IHS 1904. Load balancing system 1900 may utilize network adapter 1901, administrative network 1902 and network adapter 1905 to couple HCM IHS 500 to administered IHS 1906. Load balancing system 1900 may utilize network adapter 1901, administrative network 1902 and network adapter 1907 to couple HCM IHS 500 to administered IHS 1908. Load balancing system 1900 may utilize network adapter 1901, administrative network 1902 and network adapter 1909 to couple HCM IHS 500 to administered IHS 1910. Administered IHSs 1904, 1906, 1908 and 1910 couple via administrative network 1902 to HCM IHS 500 to enable HCM IHS 500 to administer HCM database 2000 with HCM tool 600 to the administered IHSs.

Load balancing system 1900 may utilize network adapter 1911 and/or network adapter 1912 and/or network adapter 1913 and/or network adapter 1914 via NETWORK A 1915 via network adapter 1916 and/or network adapter 1917 and/or network adapter 1918 and/or network adapter 1919 to couple load balancing IHS 1904 to administered IHS 1906. Load balancing system 1900 may utilize network adapter 1920 and/or network adapter 1921 and/or network adapter 1922 and/or network adapter 1923 via NETWORK B 1924 via network adapter 1925 and/or network adapter 1926 and/or network adapter 1927 and/or network adapter 1928 to couple load balancing IHS 1904 to administered IHS 1906. Load balancing system 1900 may utilize network adapter 1929 and/or network adapter 1930 and/or network adapter 1931 and/or network adapter 1932 via NETWORK C 1933 via network adapter 1934 and/or network adapter 1935 and/or network adapter 1936 and/or network adapter 1937 to couple load balancing IHS 1904 to administered IHS 1910.

In one embodiment, network adapter 1901, 1903, 1905, 1907 and 1909 may be Ethernet (ETH) adapters. Network adapters 1911, 1912, 1916, 1918, 1920, 1921, 1925, 1927, 1929, 1930, 1934 and 1936 may be open system adapters (OSAs). Network adapters 1913, 1914, 1917, 1919, 1922, 1923, 1926, 1928, 1931, 1933, 1935 and 1937 may be remote direct memory access (RDMA) enabled network adapter controllers (RNICs). In one embodiment, administrative network 1902, NETWORK A 1915, NETWORK B 1924 and NETWORK C 1933 may provide local area network (LAN) communications and/or wide area network (WAN) communications and/or virtual LAN communications and/or intranet communications and/or Internet communications to structures that couple thereto.

Load balancing IHS 1904 may include a hypervisor (not shown) that may create logical partition (LPAR) 1938-1, LPAR 1938-2, LPAR 1938-3, LPAR 1938-4, LPAR 1938-5, LPAR 1938-6 and LPAR 1938-7 in load balancing IHS 1904. LPAR 1938-1, LPAR 1938-2 and LPAR 1938-3 may include virtual network adapter 1939-1, virtual network adapter 1939-2 and virtual network adapter 1939-3, respectively. Virtual network adapter 1939-1, virtual network adapter 1939-2 and virtual network adapter 1939-3 may couple to network adapter 1911 and network adapter 1912 via a channel, i.e., a bus. LPAR 1938-4 and LPAR 1938-5 may include virtual network adapter 1939-4 and virtual network adapter 1939-5, respectively. Virtual network adapter 1939-4 and virtual network adapter 1939-5 may couple to network adapter 1920 and network adapter 1921 via a channel. LPAR 1938-6 and LPAR 1938-7 may include virtual network adapter 1939-6 and virtual network adapter 1939-7, respectively. Virtual network adapter 1939-6 and virtual network adapter 1939-7 may couple to network adapter 1929 and network adapter 1930 via a channel.

LPAR 1938-1, LPAR 1938-2 and LPAR 1938-3 may include virtual network adapter 1940-1, virtual network adapter 1940-2 and virtual network adapter 1940-3, respectively. Virtual network adapter 1940-1, virtual network adapter 1940-2 and virtual network adapter 1940-3 may couple to network adapter 1913 and network adapter 1914 via a channel. LPAR 1938-4 and LPAR 1938-5 may include virtual network adapter 1940-4 and virtual network adapter 1940-5, respectively. Virtual network adapter 1940-4 and virtual network adapter 1940-5 may couple to network adapter 1922 and network adapter 1923 via a channel. LPAR 1938-6 and LPAR 1938-7 may include virtual network adapter 1940-6 and virtual network adapter 1940-7, respectively. Virtual network adapter 1940-6 and virtual network adapter 1940-7 may couple to network adapter 1931 and network adapter 1932 via a channel.

FIG. 20 depicts one embodiment of HCM database 2000 in the disclosed load balancing system 1900. HCM tool 600 may store the hardware configuration information in HCM database 2000 on a per adapter basis. In one embodiment, for each network adapter in load balancing system 1900, HCM tool 600 may store, from the leftmost column to the rightmost column, the machine serial number (MSN), physical identification (PID), logical identification (LID), adapter type, logical partition (LPAR) access list, physical network identification (PNet ID) network adapter.

As shown in HCM database 2000, the hardware configuration information of adapter 1911 includes MSN of 0000FFA1, PID of 0006, LID of 00F1, type of 0087, LPAR access list of 01, 02 and 03, and PNet ID 1 and PNet ID 2 of NETA. In other words, adapter 1911 is located in physical channel 0006 in load balancing IHS 1904 and may be identified logically by load balancing IHS 1904 as 00F1. Adapter 1911 is a physical OSA network adapter and couples to NETWORK A 1915 on both ports 1 and 2. LPAR 1938-1, 1938-2 and 1938-3 of load balancing IHS 1904 may access adapter 1911 to communicate via NETWORK A 1915.

The hardware configuration information of adapter 1912 includes MSN of 0000FFA1, PID of 0007, LID of 00F5, type of 0087, LPAR access list of 01, 02 and 03, and PNet ID 1 and PNet ID 2 of NETA. In other words, adapter 1912 is located in physical channel 0007 in load balancing IHS 1904 and may be identified logically by load balancing IHS 1904 as 00F5. Adapter 1912 is a physical OSA network adapter and couples to NETWORK A 1915 on both ports 1 and 2. LPAR 1938-1, 1938-2 and 1938-3 of load balancing IHS 1904 may access adapter 1912 to communicate via NETWORK A 1915.

The hardware configuration information of adapter 1913 includes MSN of 0000FFA1, PID of 0111, LID of 04C0, type of 0008, LPAR access list of 01, 02 and 03, and PNet ID 1 and PNet ID 2 of NETA. In other words, adapter 1913 is located in physical channel 0111 in load balancing IHS 1904 and may be identified logically by load balancing IHS 1904 as 04C0. Adapter 1913 is a physical RNIC network adapter and couples to NETWORK A 1915 on both ports 1 and 2. LPAR 1938-1, 1938-2 and 1938-3 of load balancing IHS 1904 may access adapter 1913 to communicate via NETWORK A 1915.

The hardware configuration information of adapter 1914 includes MSN of 0000FFA1, PID of 0112, LID of 04C4, type of 0008, LPAR access list of 01, 02 and 03, and PNet ID 1 and PNet ID 2 of NETA. In other words, adapter 1914 is located in physical channel 0112 in load balancing IHS 1904 and may be identified logically by load balancing IHS 1904 as 04C4. Adapter 1914 is a physical RNIC network adapter and couples to NETWORK A 1915 on both ports 1 and 2. LPAR 1938-1, 1938-2 and 1938-3 of load balancing IHS 1904 may access adapter 1914 to communicate via NETWORK A 1915.

The hardware configuration information of adapter 1920 includes MSN of 0000FFA1, PID of 0008, LID of 00F9, type of 0087, LPAR access list of 04 and 05, and PNet ID 1 and PNet ID 2 of NETB. In other words, adapter 1920 is located in physical channel 0008 in load balancing IHS 1904 and may be identified logically by load balancing IHS 1904 as 00F9. Adapter 1920 is a physical OSA network adapter and couples to NETWORK B 1924 on both ports 1 and 2. LPAR 1938-4 and 1938-5 of load balancing IHS 1904 may access adapter 1920 to communicate via NETWORK B 1924.

The hardware configuration information of adapter 1921 includes MSN of 0000FFA1, PID of 0009, LID of 00FC, type of 0087, LPAR access list of 04 and 05, and PNet ID 1 and PNet ID 2 of NETB. In other words, adapter 1921 is located in physical channel 0009 in load balancing IHS 1904 and may be identified logically by load balancing IHS 1904 as 00FC. Adapter 1921 is a physical OSA network adapter and couples to NETWORK B 1924 on both ports 1 and 2. LPAR 1938-4 and 1938-5 of load balancing IHS 1904 may access adapter 1921 to communicate via NETWORK B 1924.

The hardware configuration information of adapter 1922 includes MSN of 0000FFA1, PID of 0113, LID of 04C8, type of 0008, LPAR access list of 04 and 05, and PNet ID 1 and PNet ID 2 of NETB. In other words, adapter 1922 is located in physical channel 0113 in load balancing IHS 1904 and may be identified logically by load balancing IHS 1904 as 04C8. Adapter 1922 is a physical RNIC network adapter and couples to NETWORK B 1924 on both ports 1 and 2. LPAR 1938-4 and 1938-5 of load balancing IHS 1904 may access adapter 1922 to communicate via NETWORK B 1924.

The hardware configuration information of adapter 1923 includes MSN of 0000FFA1, PID of 0114, LID of 04CB, type of 0008, LPAR access list of 04 and 05, and PNet ID 1 and PNet ID 2 of NETB. In other words, adapter 1923 is located in physical channel 0114 in load balancing IHS 1904 and may be identified logically by load balancing IHS 1904 as 04CB. Adapter 1923 is a physical RNIC network adapter and couples to NETWORK B 1924 on both ports 1 and 2. LPAR 1938-4 and 1938-5 of load balancing IHS 1904 may access adapter 1923 to communicate via NETWORK B 1924.

The hardware configuration information of adapter 1929 includes MSN of 0000FFA1, PID of 000A, LID of 00FF, type of 0087, LPAR access list of 06 and 07, and PNet ID 1 and PNet ID 2 of NETC. In other words, adapter 1929 is located in physical channel 000A in load balancing IHS 1904 and may be identified logically by load balancing IHS 1904 as 00FF. Adapter 1929 is a physical OSA network adapter and couples to NETWORK C 1933 on both ports 1 and 2. LPAR 1938-6 and 1938-7 of load balancing IHS 1904 may access adapter 1929 to communicate via NETWORK C 1933.

The hardware configuration information of adapter 1930 includes MSN of 0000FFA1, PID of 000B, LID of 0102, type of 0087, LPAR access list of 06 and 07, and PNet ID 1 and PNet ID 2 of NETC. In other words, adapter 1930 is located in physical channel 000B in load balancing IHS 1904 and may be identified logically by load balancing IHS 1904 as 0102. Adapter 1930 is a physical OSA network adapter and couples to NETWORK C 1933 on both ports 1 and 2. LPAR 1938-6 and 1938-7 of load balancing IHS 1904 may access adapter 1930 to communicate via NETWORK C 1933.

The hardware configuration information of adapter 1931 includes MSN of 0000FFA1, PID of 0115, LID of 04CE, type of 0008, LPAR access list of 06 and 07, and PNet ID 1 and PNet ID 2 of NETC. In other words, adapter 1931 is located in physical channel 0115 in load balancing IHS 1904 and may be identified logically by load balancing IHS 1904 as 04CE. Adapter 1931 is a physical RNIC network adapter and couples to NETWORK C 1933 on both ports 1 and 2. LPAR 1938-6 and 1938-7 of load balancing IHS 1904 may access adapter 1931 to communicate via NETWORK C 1933.

The hardware configuration information of adapter 1932 includes MSN of 0000FFA1, PID of 0116, LID of 04D1, type of 0008, LPAR access list of 06 and 07, and PNet ID 1 and PNet ID 2 of NETC. In other words, adapter 1932 is located in physical channel 0116 in load balancing IHS 1904 and may be identified logically by load balancing IHS 1904 as 04D1. Adapter 1932 is a physical RNIC network adapter and couples to NETWORK C 1933 on both ports 1 and 2. LPAR 1938-6 and 1938-7 of load balancing IHS 1904 may access adapter 1932 to communicate via NETWORK C 1933.

The hardware configuration information of adapter 1916 includes MSN of 00DDA254, PID of 0001, LID of 00A3, type of 0087, LPAR access list with no entries, and PNet ID 1 and PNet ID 2 of NETA. In other words, adapter 1916 is located in physical channel 0001 in administered IHS 1906 and may be identified logically by administered IHS 1906 as 00A3. Adapter 1916 is a physical OSA network adapter and couples to NETWORK A 1915 on both ports 1 and 2. Administered IHS 1906 may access adapter 1916 to communicate via NETWORK A 1915.

The hardware configuration information of adapter 1917 includes MSN of 00DDA254, PID of 0003, LID of 00B1, type of 0008, LPAR access list with no entries, and PNet ID 1 and PNet ID 2 of NETA. In other words, adapter 1917 is located in physical channel 0003 in administered IHS 1906 and may be identified logically by administered IHS 1906 as 00B1. Adapter 1917 is a physical RNIC network adapter and couples to NETWORK A 1915 on both ports 1 and 2. Administered IHS 1906 may access adapter 1917 to communicate via NETWORK A 1915.

The hardware configuration information of adapter 1918 includes MSN of 00DDA254, PID of 0002, LID of 00A4, type of 0087, LPAR access list with no entries, and PNet ID 1 and PNet ID 2 of NETA. In other words, adapter 1918 is located in physical channel 0002 in administered IHS 1906 and may be identified logically by administered IHS 1906 as 00A4. Adapter 1918 is a physical OSA network adapter and couples to NETWORK A 1915 on both ports 1 and 2. Administered IHS 1906 may access adapter 1918 to communicate via NETWORK A 1915.

The hardware configuration information of adapter 1919 includes MSN of 00DDA254, PID of 0004, LID of 00B2, type of 0008, LPAR access list with no entries, and PNet ID 1 and PNet ID 2 of NETA. In other words, adapter 1919 is located in physical channel 0004 in administered IHS 1906 and may be identified logically by administered IHS 1906 as 00B2. Adapter 1919 is a physical RNIC network adapter and couples to NETWORK A 1915 on both ports 1 and 2. Administered IHS 1906 may access adapter 1919 to communicate via NETWORK A 1915.

The hardware configuration information of adapter 1925 includes MSN of FAF33922, PID of 0023, LID of 00F6, type of 0087, LPAR access list with no entries, and PNet ID 1 and PNet ID 2 of NETB. In other words, adapter 1925 is located in physical channel 0023 in administered IHS 1908 and may be identified logically by administered IHS 1908 as 00F6. Adapter 1925 is a physical OSA network adapter and couples to NETWORK B 1924 on both ports 1 and 2. Administered IHS 1908 may access adapter 1925 to communicate via NETWORK B 1924.

The hardware configuration information of adapter 1926 includes MSN of FAF33922, PID of 0032, LID of 00FF, type of 0008, LPAR access list with no entries, and PNet ID 1 and PNet ID 2 of NETB. In other words, adapter 1926 is located in physical channel 0032 in administered IHS 1908 and may be identified logically by administered IHS 1908 as 00FF. Adapter 1926 is a physical RNIC network adapter and couples to NETWORK B 1924 on both ports 1 and 2. Administered IHS 1908 may access adapter 1926 to communicate via NETWORK B 1924.

The hardware configuration information of adapter 1927 includes MSN of FAF33922, PID of 0024, LID of 00F7, type of 0087, LPAR access list with no entries, and PNet ID 1 and PNet ID 2 of NETB. In other words, adapter 1927 is located in physical channel 0024 in administered IHS 1908 and may be identified logically by administered IHS 1908 as 00F7. Adapter 1927 is a physical OSA network adapter and couples to NETWORK B 1924 on both ports 1 and 2. Administered IHS 1908 may access adapter 1927 to communicate via NETWORK B 1924.

The hardware configuration information of adapter 1928 includes MSN of FAF33922, PID of 0033, LID of 0100, type of 0008, LPAR access list with no entries, and PNet ID 1 and PNet ID 2 of NETB. In other words, adapter 1928 is located in physical channel 0033 in administered IHS 1908 and may be identified logically by administered IHS 1908 as 0100. Adapter 1928 is a physical RNIC network adapter and couples to NETWORK B 1924 on both ports 1 and 2. Administered IHS 1908 may access adapter 1928 to communicate via NETWORK B 1924.

The hardware configuration information of adapter 1934 includes MSN of 363B77A2, PID of 0011, LID of 00C2, type of 0087, LPAR access list with no entries, and PNet ID 1 and PNet ID 2 of NETC. In other words, adapter 1934 is located in physical channel 0011 in administered IHS 1910 and may be identified logically by administered IHS 1910 as 00C2. Adapter 1934 is a physical OSA network adapter and couples to NETWORK C 1933 on both ports 1 and 2. Administered IHS 1910 may access adapter 1934 to communicate via NETWORK C 1933.

The hardware configuration information of adapter 1935 includes MSN of 363B77A2, PID of 0002, LID of 0D01, type of 0008, LPAR access list with no entries, and PNet ID 1 and PNet ID 2 of NETC. In other words, adapter 1935 is located in physical channel 0002 in administered IHS 1910 and may be identified logically by administered IHS 1910 as 0D01. Adapter 1935 is a physical RNIC network adapter and couples to NETWORK C 1933 on both ports 1 and 2. Administered IHS 1910 may access adapter 1935 to communicate via NETWORK C 1933.

The hardware configuration information of adapter 1936 includes MSN of 363B77A2, PID of 0012, LID of 00C3, type of 0087, LPAR access list with no entries, and PNet ID 1 and PNet ID 2 of NETC. In other words, adapter 1936 is located in physical channel 0012 in administered IHS 1910 and may be identified logically by administered IHS 1910 as 00C3. Adapter 1936 is a physical OSA network adapter and couples to NETWORK C 1933 on both ports 1 and 2. Administered IHS 1910 may access adapter 1936 to communicate via NETWORK C 1933.

The hardware configuration information of adapter 1937 includes MSN of 363B77A2, PID of 0003, LID of 0D02, type of 0008, LPAR access list with no entries, and PNet ID 1 and PNet ID 2 of NETC. In other words, adapter 1937 is located in physical channel 0003 in administered IHS 1910 and may be identified logically by administered IHS 1910 as 0D02. Adapter 1937 is a physical RNIC network adapter and couples to NETWORK C 1933 on both ports 1 and 2. Administered IHS 1910 may access adapter 1937 to communicate via NETWORK C 1933.

Figure 21:
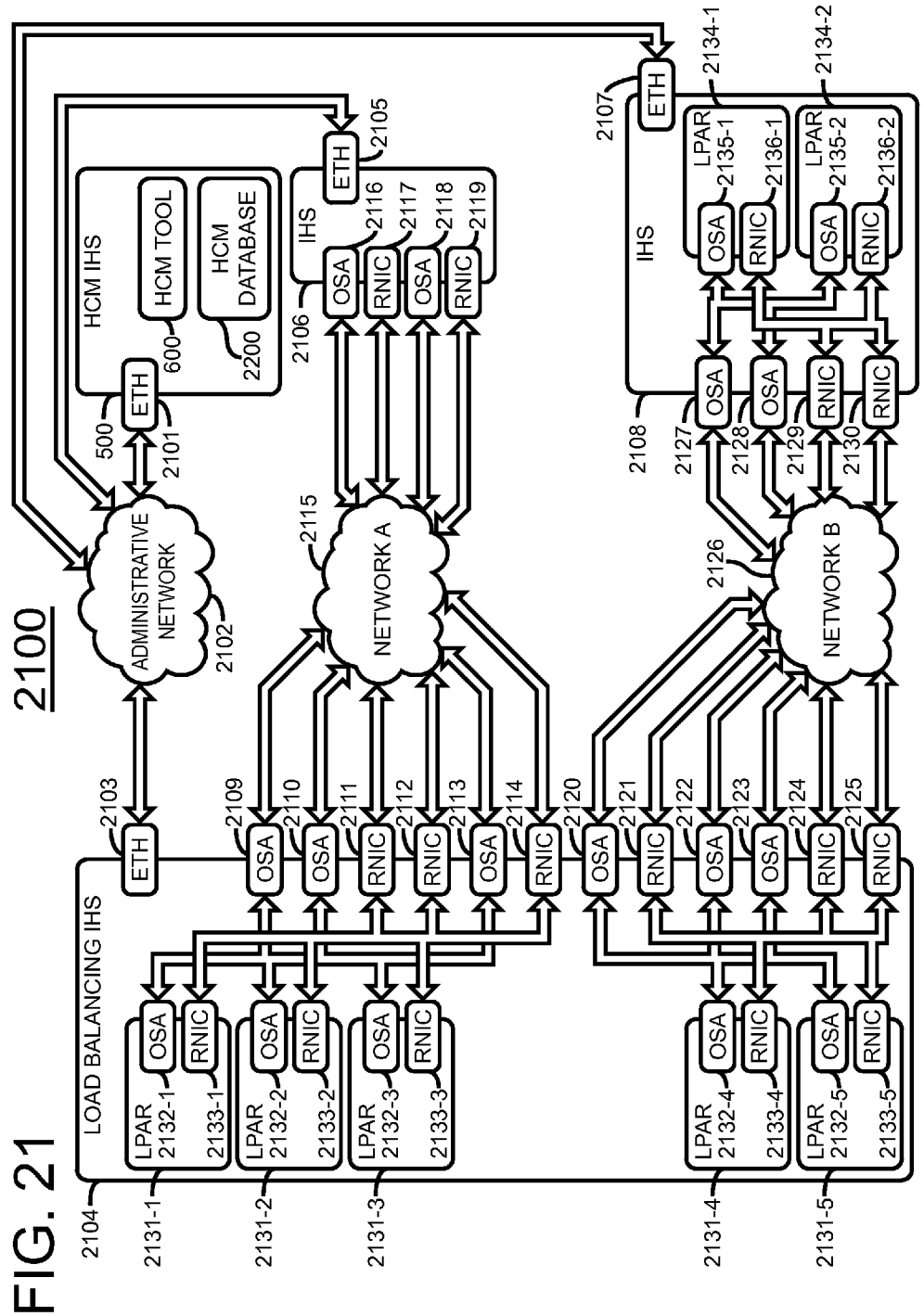
FIG. 21 is a block diagram showing another embodiment of the disclosed load balancing system utilizing PNet IDs.

FIG. 21 is a block diagram showing one embodiment of the disclosed load balancing system 2100 utilizing PNet IDs. Load balancing system 2100 may utilize network adapter 2101, administrative network 2102 and network adapter 2103 to couple HCM IHS 500 to administered IHS 2104. Administered IHS 2104 may also be referred to as load balancing IHS 2104. Load balancing system 2100 may utilize network adapter 2101, administrative network 2102 and network adapter 2105 to couple HCM IHS 500 to administered IHS 2106. Load balancing system 2100 may utilize network adapter 2101, administrative network 2102 and network adapter 2107 to couple HCM IHS 500 to administered IHS 2108. Administered IHSs 2104, 2106 and 2108 couple via administrative network 2102 to HCM IHS 500 to enable HCM IHS 500 to administer HCM database 2200 with HCM tool 600 to the administered IHSs.

Load balancing system 2100 may utilize network adapter 2109 and/or network adapter 2110 and/or network adapter 2111 and/or network adapter 2112 and/or network adapter 2113 and/or network adapter 2114 via NETWORK A 2115 via network adapter 2116 and/or network adapter 2117 and/or network adapter 2118 and/or network adapter 2119 to couple load balancing IHS 2104 to administered IHS 2106. Load balancing system 2100 may utilize network adapter 2120 and/or network adapter 2121 and/or network adapter 2122 and/or network adapter 2123 and/or network adapter 2124 and/or network adapter 2125 via NETWORK B 2126 via network adapter 2127 and/or network adapter 2128 and/or network adapter 2129 and/or network adapter 2130 to couple load balancing IHS 2104 to administered IHS 2106.

In one embodiment, network adapter 2101, 2103, 2105 and 2107 may be Ethernet (ETH) adapters. Network adapters 2109, 2110, 2113, 2116, 2118, 2120, 2122, 2123, 2127 and 2128 may be open system adapters (OSAs). Network adapters 2111, 2112, 2114, 2117, 2119, 2121, 2124, 2125, 2129 and 2130 may be remote direct memory access (RDMA) enabled network adapter controllers (RNICs). In one embodiment, administrative network 2102, NETWORK A 2115 and NETWORK B 2126 may provide local area network (LAN) communications and/or wide area network (WAN) communications and/or virtual LAN communications and/or intranet communications and/or Internet communications to structures that couple thereto.

Load balancing IHS 2104 may include a hypervisor (not shown) that may create logical partition (LPAR) 2131-1, LPAR 2131-2, LPAR 2131-3, LPAR 2131-4 and LPAR 2131-5 in load balancing IHS 2104. LPAR 2131-1, LPAR 2131-2 and LPAR 2131-3 may include virtual network adapter 2132-1, virtual network adapter 2132-2 and virtual network adapter 2132-3, respectively. Virtual network adapter 2132-1, virtual network adapter 2132-2 and virtual network adapter 2132-3 may couple to network adapter 2109, network adapter 2110 and network adapter 2113 via a channel, i.e., a bus. LPAR 2131-4 and LPAR 2131-5 may include virtual network adapter 2132-4 and virtual network adapter 2132-5, respectively. Virtual network adapter 2132-4 and virtual network adapter 2132-5 may couple to network adapter 2120, network adapter 2121 and network adapter 2123 via a channel.

LPAR 2131-1, LPAR 2131-2 and LPAR 2131-3 may include virtual network adapter 2133-1, virtual network adapter 2133-2 and virtual network adapter 2133-3, respectively. Virtual network adapter 2133-1, virtual network adapter 2133-2 and virtual network adapter 2133-3 may couple to network adapter 2111, network adapter 2112 and network adapter 2114 via a channel. LPAR 2131-4 and LPAR 2131-5 may include virtual network adapter 2133-4 and virtual network adapter 2133-5, respectively. Virtual network adapter 2133-4 and virtual network adapter 2133-5 may couple to network adapter 2121, network adapter 2124 and network adapter 2125 via a channel.

In one embodiment, administered IHS 2108 may be a load balancing IHS. Administered IHS 2108 may include a hypervisor (not shown) that may create LPAR 2134-1 and LPAR 2134-2. LPAR 2134-1 and LPAR 2134-2 may include virtual network adapter 2135-1 and virtual network adapter 2135-2, respectively. Virtual network adapter 2135-1 and virtual network adapter 2135-2 may couple to network adapter 2127 and network adapter 2128 via a channel. LPAR 2134-1 and LPAR 2134-2 may include virtual network adapter 2136-1 and virtual network adapter 2136-2, respectively. Virtual network adapter 2136-1 and virtual network adapter 2136-2 may couple to network adapter 2129 and network adapter 2130 via a channel.

FIG. 22 depicts one embodiment of HCM database 2200 in the disclosed load balancing system 2100. HCM tool 600 may store the hardware configuration information in HCM database 2200 on a per adapter basis. In one embodiment, for each network adapter in load balancing system 2100, HCM tool 600 may store, from the leftmost column to the rightmost column, the machine serial number (MSN), physical identification (PID), logical identification (LID), adapter type, logical partition (LPAR) access list, physical network identification (PNet ID) network adapter.

As shown in HCM database 2200, the hardware configuration information of adapter 2109 includes MSN of 0DC0FFB2, PID of 0001, LID of 0OF1, type of 0087, LPAR access list of 01, 02 and 03, and PNet ID 1 and PNet ID 2 of NETA. In other words, adapter 2109 is located in physical channel 0001 in load balancing IHS 2104 and may be identified logically by load balancing IHS 2104 as 00F1. Adapter 2109 is a physical OSA network adapter and couples to NETWORK A 2115 on both ports 1 and 2. LPAR 2131-1, 2131-2 and 2131-3 of load balancing IHS 2104 may access adapter 2109 to communicate via NETWORK A 2115.

The hardware configuration information of adapter 2110 includes MSN of 0DC0FFB2, PID of 0002, LID of 00F5, type of 0087, LPAR access list of 01, 02 and 03, and PNet ID 1 and PNet ID 2 of NETA. In other words, adapter 2110 is located in physical channel 0002 in load balancing IHS 2104 and may be identified logically by load balancing IHS 2104 as 00F5. Adapter 2110 is a physical OSA network adapter and couples to NETWORK A 2115 on both ports 1 and 2. LPAR 2131-1, 2131-2 and 2131-3 of load balancing IHS 2104 may access adapter 2110 to communicate via NETWORK A 2115.

The hardware configuration information of adapter 2111 includes MSN of 0DC0FFB2, PID of 0111, LID of 0FF1, type of 0008, LPAR access list of 01, 02 and 03, and PNet ID 1 and PNet ID 2 of NETA. In other words, adapter 2111 is located in physical channel 0111 in load balancing IHS 2104 and may be identified logically by load balancing IHS 2104 as 0FF1. Adapter 2111 is a physical RNIC network adapter and couples to NETWORK A 2115 on both ports 1 and 2. LPAR 2131-1, 2131-2 and 2131-3 of load balancing IHS 2104 may access adapter 2111 to communicate via NETWORK A 2115.

The hardware configuration information of adapter 2112 includes MSN of 0DC0FFB2, PID of 0112, LID of 0FF5, type of 0008, LPAR access list of 01, 02 and 03, and PNet ID 1 and PNet ID 2 of NETA. In other words, adapter 2112 is located in physical channel 0112 in load balancing IHS 2104 and may be identified logically by load balancing IHS 2104 as 0FF5. Adapter 2112 is a physical RNIC network adapter and couples to NETWORK A 2115 on both ports 1 and 2. LPAR 2131-1, 2131-2 and 2131-3 of load balancing IHS 2104 may access adapter 2112 to communicate via NETWORK A 2115.

The hardware configuration information of adapter 2113 includes MSN of 0DC0FFB2, PID of 0003, LID of 00F9, type of 0087, LPAR access list of 01, 02 and 03, and PNet ID 1 and PNet ID 2 of NETA. In other words, adapter 2113 is located in physical channel 0003 in load balancing IHS 2104 and may be identified logically by load balancing IHS 2104 as 00F9. Adapter 2113 is a physical OSA network adapter and couples to NETWORK A 2115 on both ports 1 and 2. LPAR 2131-1, 2131-2 and 2131-3 of load balancing IHS 2104 may access adapter 2113 to communicate via NETWORK A 2115.

The hardware configuration information of adapter 2114 includes MSN of 0DC0FFB2, PID of 0113, LID of 0FF9, type of 0008, LPAR access list of 01, 02 and 03, and PNet ID 1 and PNet ID 2 of NETA. In other words, adapter 2114 is located in physical channel 0113 in load balancing IHS 2104 and may be identified logically by load balancing IHS 2104 as 0FF9. Adapter 2114 is a physical RNIC network adapter and couples to NETWORK A 2115 on both ports 1 and 2. LPAR 2131-1, 2131-2 and 2131-3 of load balancing IHS 2104 may access adapter 2114 to communicate via NETWORK A 2115.

The hardware configuration information of adapter 2120 includes MSN of 0DC0FFB2, PID of 0004, LID of 00FD, type of 0087, LPAR access list of 04 and 05, and PNet ID 1 and PNet ID 2 of NETB. In other words, adapter 2120 is located in physical channel 0004 in load balancing IHS 2104 and may be identified logically by load balancing IHS 2104 as 00FD. Adapter 2120 is a physical OSA network adapter and couples to NETWORK B 2126 on both ports 1 and 2. LPAR 2131-4 and 2131-5 of load balancing IHS 2104 may access adapter 2120 to communicate via NETWORK B 2126.

The hardware configuration information of adapter 2121 includes MSN of 0DC0FFB2, PID of 0114, LID of 0FFD, type of 0008, LPAR access list of 04 and 05, and PNet ID 1 and PNet ID 2 of NETB. In other words, adapter 2121 is located in physical channel 0114 in load balancing IHS 2104 and may be identified logically by load balancing IHS 2104 as 0FFD. Adapter 2121 is a physical RNIC network adapter and couples to NETWORK B 2126 on both ports 1 and 2. LPAR 2131-4 and 2131-5 of load balancing IHS 2104 may access adapter 2121 to communicate via NETWORK B 2126.

The hardware configuration information of adapter 2122 includes MSN of 0DC0FFB2, PID of 0005, LID of 0100, type of 0087, LPAR access list of 04 and 05, and PNet ID 1 and PNet ID 2 of NETB. In other words, adapter 2122 is located in physical channel 0005 in load balancing IHS 2104 and may be identified logically by load balancing IHS 2104 as 0100. Adapter 2122 is a physical OSA network adapter and couples to NETWORK B 2126 on both ports 1 and 2. LPAR 2131-4 and 2131-5 of load balancing IHS 2104 may access adapter 2122 to communicate via NETWORK B 2126.

The hardware configuration information of adapter 2123 includes MSN of 0DC0FFB2, PID of 0006, LID of 0103, type of 0087, LPAR access list of 04 and 05, and PNet ID 1 and PNet ID 2 of NETB. In other words, adapter 2123 is located in physical channel 0006 in load balancing IHS 2104 and may be identified logically by load balancing IHS 2104 as 0103. Adapter 2123 is a physical OSA network adapter and couples to NETWORK B 2126 on both ports 1 and 2. LPAR 2131-4 and 2131-5 of load balancing IHS 2104 may access adapter 2123 to communicate via NETWORK B 2126.

The hardware configuration information of adapter 2124 includes MSN of 0DC0FFB2, PID of 0115, LID of 1000, type of 0008, LPAR access list of 04 and 05, and PNet ID 1 and PNet ID 2 of NETB. In other words, adapter 2124 is located in physical channel 0115 in load balancing IHS 2104 and may be identified logically by load balancing IHS 2104 as 1000. Adapter 2124 is a physical RNIC network adapter and couples to NETWORK B 2126 on both ports 1 and 2. LPAR 2131-4 and 2131-5 of load balancing IHS 2104 may access adapter 2124 to communicate via NETWORK B 2126.

The hardware configuration information of adapter 2125 includes MSN of 0DC0FFB2, PID of 0116, LID of 1003, type of 0008, LPAR access list of 04 and 05, and PNet ID 1 and PNet ID 2 of NETB. In other words, adapter 2125 is located in physical channel 0116 in load balancing IHS 2104 and may be identified logically by load balancing IHS 2104 as 1003. Adapter 2125 is a physical RNIC network adapter and couples to NETWORK B 2126 on both ports 1 and 2. LPAR 2131-4 and 2131-5 of load balancing IHS 2104 may access adapter 2125 to communicate via NETWORK B 2126.

The hardware configuration information of adapter 2116 includes MSN of 0000D100, PID of 0033, LID of 0D01, type of 0087, LPAR access list with no entries, and PNet ID 1 and PNet ID 2 of NETA. In other words, adapter 2116 is located in physical channel 0033 in administered IHS 2106 and may be identified logically by administered IHS 2106 as 0D01. Adapter 2116 is a physical OSA network adapter and couples to NETWORK A 2115 on both ports 1 and 2. Administered IHS 2106 may access adapter 2116 to communicate via NETWORK A 2115.

The hardware configuration information of adapter 2117 includes MSN of 0000D100, PID of 0025, LID of 0D03, type of 0008, LPAR access list with no entries, and PNet ID 1 and PNet ID 2 of NETA. In other words, adapter 2117 is located in physical channel 0025 in administered IHS 2106 and may be identified logically by administered IHS 2106 as 0D03. Adapter 2117 is a physical RNIC network adapter and couples to NETWORK A 2115 on both ports 1 and 2. Administered IHS 2106 may access adapter 2117 to communicate via NETWORK A 2115.

The hardware configuration information of adapter 2118 includes MSN of 0000D100, PID of 0034, LID of 0D02, type of 0087, LPAR access list with no entries, and PNet ID 1 and PNet ID 2 of NETA. In other words, adapter 2118 is located in physical channel 0034 in administered IHS 2106 and may be identified logically by administered IHS 2106 as 0D02. Adapter 2118 is a physical OSA network adapter and couples to NETWORK A 2115 on both ports 1 and 2. Administered IHS 2106 may access adapter 2118 to communicate via NETWORK A 2115.

The hardware configuration information of adapter 2119 includes MSN of 0000D100, PID of 0026, LID of 0D04, type of 0008, LPAR access list with no entries, and PNet ID 1 and PNet ID 2 of NETA. In other words, adapter 2119 is located in physical channel 0026 in administered IHS 2106 and may be identified logically by administered IHS 2106 as 0D04. Adapter 2119 is a physical RNIC network adapter and couples to NETWORK A 2115 on both ports 1 and 2. Administered IHS 2106 may access adapter 2119 to communicate via NETWORK A 2115.

The hardware configuration information of adapter 2127 includes MSN of FFFFA200, PID of 0011, LID of 000A, type of 0087, LPAR access list of 01 and 02, and PNet ID 1 and PNet ID 2 of NETB. In other words, adapter 2127 is located in physical channel 0011 in load balancing IHS 2108 and may be identified logically by load balancing IHS 2108 as 000A. Adapter 2127 is a physical OSA network adapter and couples to NETWORK B 2126 on both ports 1 and 2. LPAR 2134-1 and 2134-2 of load balancing IHS 2108 may access adapter 2127 to communicate via NETWORK B 2126.

The hardware configuration information of adapter 2128 includes MSN of FFFFA200, PID of 0012, LID of 000B, type of 0087, LPAR access list of 01 and 02, and PNet ID 1 and PNet ID 2 of NETB. In other words, adapter 2128 is located in physical channel 0012 in load balancing IHS 2108 and may be identified logically by load balancing IHS 2108 as 000B. Adapter 2128 is a physical OSA network adapter and couples to NETWORK B 2126 on both ports 1 and 2. LPAR 2134-1 and 2134-2 of load balancing IHS 2108 may access adapter 2128 to communicate via NETWORK B 2126.

The hardware configuration information of adapter 2129 includes MSN of FFFFA200, PID of 0021, LID of 0F01, type of 0008, LPAR access list of 01 and 02, and PNet ID 1 and PNet ID 2 of NETB. In other words, adapter 2129 is located in physical channel 0021 in load balancing IHS 2108 and may be identified logically by load balancing IHS 2108 as 0F01. Adapter 2129 is a physical RNIC network adapter and couples to NETWORK B 2126 on both ports 1 and 2. LPAR 2134-1 and 2134-2 of load balancing IHS 2108 may access adapter 2129 to communicate via NETWORK B 2126.

The hardware configuration information of adapter 2130 includes MSN of FFFFA200, PID of 0022, LID of 0F02, type of 0008, LPAR access list of 01 and 02, and PNet ID 1 and PNet ID 2 of NETB. In other words, adapter 2130 is located in physical channel 0022 in load balancing IHS 2108 and may be identified logically by load balancing IHS 2108 as 0F02. Adapter 2130 is a physical RNIC network adapter and couples to NETWORK B 2126 on both ports 1 and 2. LPAR 2134-1 and 2134-2 of load balancing IHS 2108 may access adapter 2130 to communicate via NETWORK B 2126.

Figure 23:
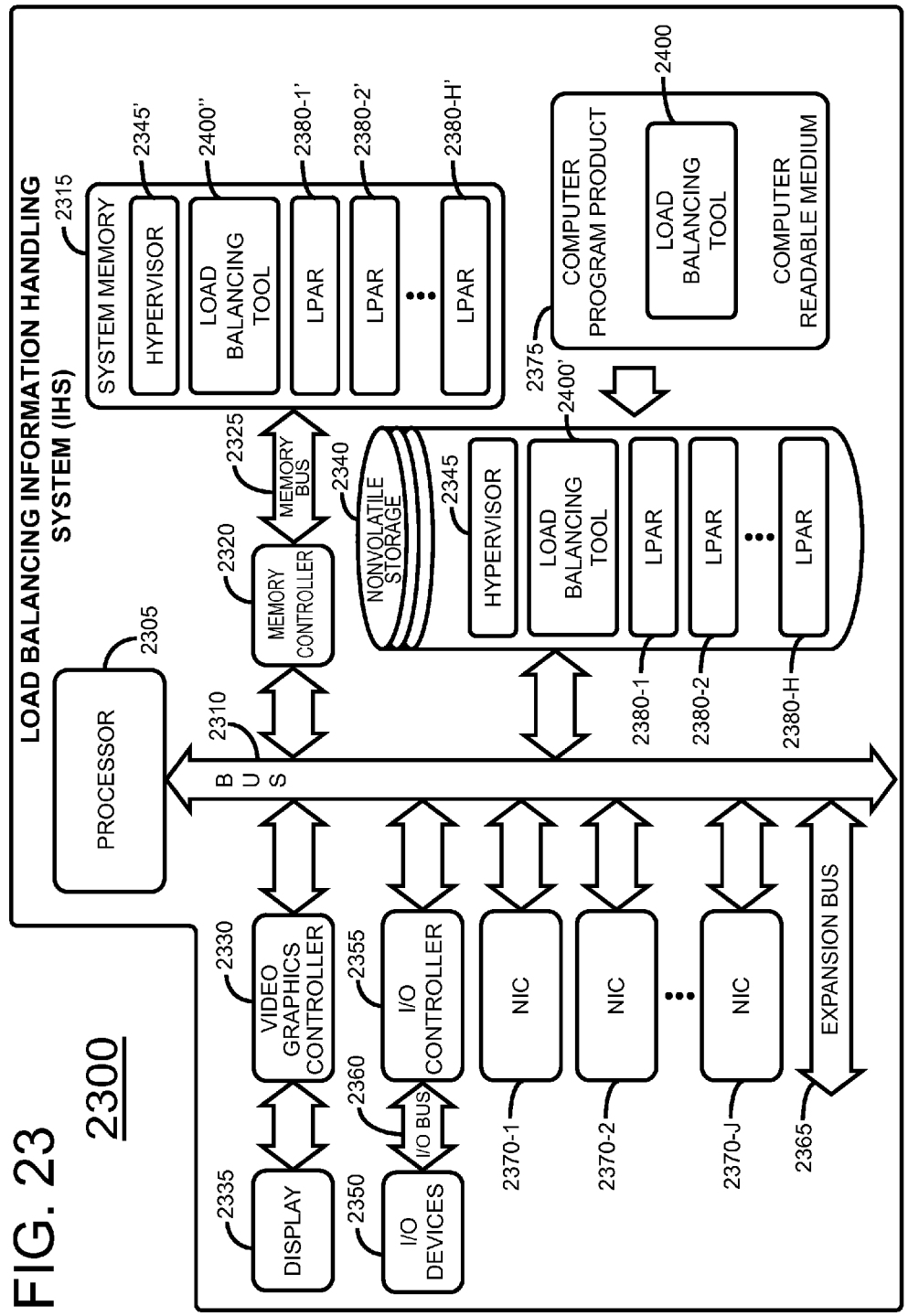
FIG. 23 is a block diagram of a load balancing IHS that may be used in the disclosed load balancing system.

FIG. 23 is a block diagram of a load balancing information handling system (IHS) 2300 that may be used in the disclosed load balancing system. With respect to FIG. 11, like numbers indicate like elements. Load balancing IHS 2300 includes a processor 2305 that may include multiple cores. RNIC converging IHS 2300 processes, transfers, communicates, modifies, stores or otherwise handles information in digital form, analog form or other form. In one embodiment, load balancing IHS 2300 includes a bus 2310, i.e. channel 2310. In another embodiment, bus 2310 may be multiple busses, i.e., multiple channels. Bus 2310 may couple processor 2305 to memory 2315 via a memory controller 2320 and memory bus 2325. System memory 2315 may also be referred to as main memory. System memory 2315 may be a static random access memory (SRAM) array or a dynamic random access memory (DRAM) array. Processor 2305 may also include local memory such as L1, L2 and L3 caches.

In one embodiment, a video graphics controller 2330 couples display 2335 to bus 2310. In another embodiment, load balancing IHS 2300 may operate without display 2335 and/or video graphics controller 2330. Nonvolatile storage 2340, such as a hard disk drive, solid-state drive (SSD), CD drive, DVD drive, or other nonvolatile storage couples to bus 2310 to provide load balancing IHS 2300 with permanent storage of information. System memory 2315 and nonvolatile storage 2340 are both forms of memory stores. In one embodiment, nonvolatile storage 2340 stores a hypervisor 2345 (HYPERVISOR) that governs operation of load balancing IHS 2300. In another embodiment, nonvolatile storage 2340 may store an operating system (not shown) that governs operation of load balancing IHS 2300. In another embodiment, nonvolatile storage 2340 may store an operating system (not shown) that governs operation of load balancing IHS 2300, where the operating system includes a hypervisor (not shown).

I/O devices 2350, such as speakers, a keyboard and a pointing device, may couple to bus 2310 via I/O controller 2355 and I/O bus 2360. One or more expansion busses 2365, i.e. channels 2365, such as USB, IEEE 1394 bus, ATA, SATA, PCI, PCIE, DVI, HDMI and other busses, i.e. channels, couple to bus 2310 to facilitate the connection of peripherals and devices to load balancing IHS 2300. Network interface controllers (NICs), for example, NIC 2370-1, NIC 2370-2, ..., NIC 2370-J, wherein J is the number of NICs, may couple to bus 2310 to enable load balancing IHS 2300 to connect by wire or wirelessly to a network and other information handling systems. NIC 2370-1, NIC 2370-2, ..., NIC 2370-J may also be called a network communication adapter, network interface adapter, network adapter, network interface or an adapter. NIC 2370-1, NIC 2370-2, ..., NIC 2370-J may take many forms. For example, NIC 2370-1, NIC 2370-2, ..., NIC 2370-J may take the form of an Ethernet (ETH) adapter, open systems adapter (OSA), RDMA enabled network interface controller (RNIC) or other network communication adapter.

While FIG. 23 shows one IHS that employs processor 2305, the IHS may take many forms. For example, load balancing IHS 2300 may take the form of a mainframe, server, central processor complex (CPC), desktop, portable, laptop, notebook, tablet or other form factor computer or data processing system. Load balancing IHS 2300 may take other form factors such as a gaming device, a personal digital assistant (PDA), a portable telephone device, a communication device or other devices that include a processor and memory.

Load balancing IHS 2300 includes a load balancing tool computer program product 2400 on digital media 2375 such as a CD, DVD or other media. For simplicity, the term load balancing tool will be used below. Load balancing IHS 2300 may store load balancing tool 2400 in nonvolatile storage 2340 as load balancing tool 2400'. Load balancing IHS 2300 may also store hypervisor 2345 (HYPERVISOR) and logical partition (LPAR) 2380-1, LPAR 2380-2, ..., LPAR 2380-H, wherein H is the number of LPARs, in nonvolatile storage 2340.

In another embodiment, load balancing tool 2400' may be part of the hypervisor 2345 (not shown). In another embodiment, load balancing tool 2400' may be in LPAR 2380-1, LPAR 2380-2, ..., LPAR 2380-H. In another embodiment, load balancing IHS 2300 may store an operating system (not shown) that governs operation of load balancing IHS 2300, where the operating system includes a hypervisor (not shown) and where the operating system includes LPAR 2380-1, LPAR 2380-2, ..., LPAR 2380-H as virtual machines (not shown). When load balancing IHS 2300 initializes, the IHS loads hypervisor 2345 into system memory 2315 for execution as hypervisor 2345'. Load balancing IHS 2300 also loads load balancing tool 2400' into system memory 2315 for execution as load balancing tool 2400". Load balancing IHS 2300 may also load LPAR 2380-1, LPAR 2380-2, ..., LPAR 2380-H into system memory 2315 for execution as LPAR 2380-1', LPAR 2380-2', ..., LPAR 2380-H', respectively.

In another embodiment, when load balancing IHS 2300 initializes, the IHS may load an operating system (not shown) into system memory 2315 for execution. In another embodiment, when load balancing IHS 2300 initializes, the IHS may load an operating system (not shown) that includes a hypervisor (not shown) and includes LPAR 2380-1, LPAR 2380-2, ..., LPAR 2380-H as virtual machines (not shown) into system memory 2315 for execution.

Figure 24:
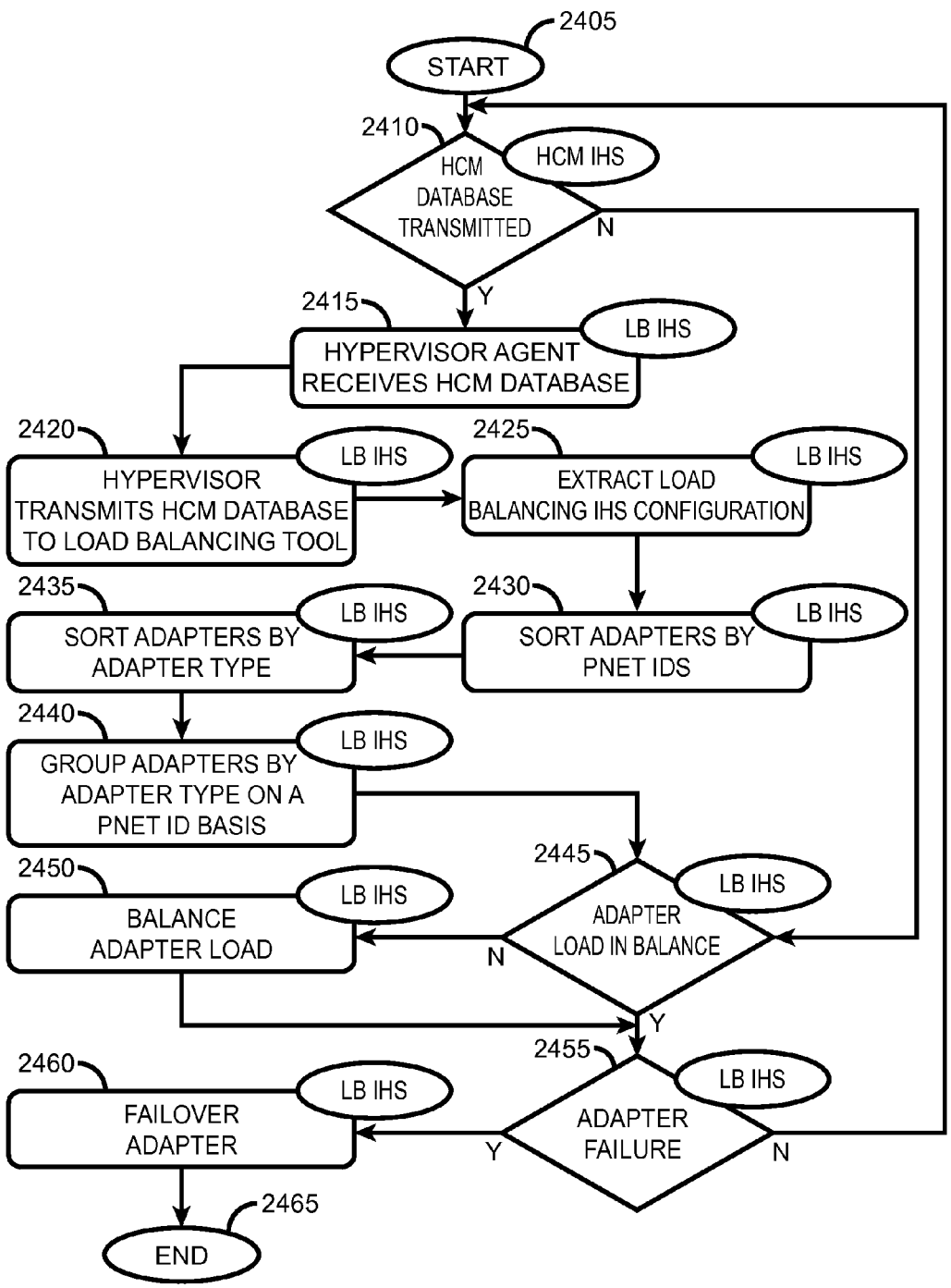
FIG. 24 is a flowchart that shows a representative process flow of a load balancing tool that may be used in the disclosed load balancing system.

FIG. 24 is a flowchart that shows a representative process flow of a load balancing tool 2400 that may be used in the disclosed load balancing system. Process flow commences when load balancing tool 2400 in load balancing IHS 2300 initializes, as per block 2405. If HCM tool 600 in HCM IHS 500 does transmit HCM database 580, as per decision block 2410, a hypervisor agent in load balancing IHS 2300 may receive HCM database 580, as per block 2415. In one embodiment, the hypervisor agent in the load balancing IHS 2300 is included in hypervisor 2345.

The hypervisor agent may allow hypervisor 2345 to access HCM database 580. Hypervisor 2345 may transmit HCM database 580 to load balancing tool 2400, as per block 2420. Load balancing tool 2400 may extract the hardware configuration information of load balancing IHS 2300 from the HCM database 580, as per block 2425. In one embodiment, the hardware configuration information of load balancing IHS 2300 from HCM database 580 may include, but is not limited to, on a per adapter basis, machine serial numbers (MSNs), physical identifications (PIDs), logical identifications (LIDs), adapter types, a logical partition (LPAR) access list, a physical network identification (PNet ID) of the first port of the adapter and a PNet ID of the second port of the adapter. In one embodiment, the adapter type "0087" may be an OSA network adapter and the adapter type "0008" may be an RNIC network adapter.

In one embodiment, the load balancing tool 2400 may share the extracted hardware configuration information of load balancing IHS 2300 with hypervisor 2345. Hypervisor 2345 may update the hardware configuration of load balancing IHS 2300 with the extracted hardware configuration information of load balancing IHS 2300. In another embodiment, the load balancing tool 2400 may share the extracted hardware configuration information of load balancing IHS 2300 with LPARs 2380-1, 2380-2, ..., 2380-H, where H is the number of LPARs in load balancing IHS 2300. LPARs 2380-1, 2380-2, ..., 2380-H may update their respective hardware configuration with the extracted hardware configuration information of load balancing IHS 2300.

Load balancing tool 2400 may sort the extracted hardware configuration information by PNet IDs, as per block 2430. For example, the load balancing tool 2400 may list all adapters with the PNet ID of "NETA" first, followed by all adapters with the PNet ID of "NETB". Load balancing tool 2400 may further sort the extracted configuration information by adapter type, as per block 2435.

Load balancing tool 2400 may group adapters by adapter type on a PNet ID basis, as per block 2440. For example, the load balancing tool 2400 may group all adapters with the type "0087" and the PNet ID "NETA" first, followed by the adapters with the type "0008" and the PNet ID of "NETA", further followed by the adapters with the type "0087" and the PNet ID of "NETB". Referring back to decision block 2410, if HCM tool 600 in HCM IHS 500 does not transmit HCM database 580, as per block 2410, process flow continues at decision block 2445.

Load balancing tool 2400 may decide if the adapter loads on load balancing IHS 2300 are balanced, as per decision block 2445. If the adapter loads are not balanced, load balancing tool 2400 may balance the loads between like adapters with matching PNet IDs, as per block 2450. For example, OSA network adapter 1911 and OSA network adapter 1912 may both have a PNet ID of "NETA". LPAR 1938-1, 1938-2, 1938-3 may access OSA network adapter 1911 and 1912. In one embodiment, LPAR 1938-1, 1938-2 and 1938-3 may be utilizing OSA network adapter 1911 for communication to NETWORK A 1915. Load balancing tool 2400 may balance the load of LPAR 1938-1, 1938-2 and 1938-3 through OSA network adapter 1911 by denying LPAR 1938-2 and LPAR 1938-3 access to OSA adapter 1911. In response, LPAR 1938-2 and LPAR 1938-3 may utilize OSA adapter 1912 for communication to NETWORK A 1915, thereby balancing the load between OSA network adapter 1911 and 1912. Process flow continues at block 2455.

If load balancing tool 2400 determines that the adapter load is in balancer, as per decision block 2445, process flow continues at block 2455. Load balancing tool 2400 may decide if an adapter on load balancing IHS 2300 has failed, as per decision block 2455. If load balancing tool 2400 determines that an adapter has not failed, as per decision block 2455, process flow continues at decision block 2410. If load balancing tool 2400 determines that an adapter on load balancing IHS 2300 has failed, as per decision block 2455, load balancing tool 2400 may failover the adapter to a like adapter with matching PNet IDs, as per block 2460.

For example, OSA network adapter 1911 and OSA network adapter 1912 may both have a PNet ID of "NETA". LPAR 1938-1, 1938-2, 1938-3 may access OSA network adapter 1911 and 1912. In one embodiment, LPAR 1938-1, 1938-2 and 1938-3 may be utilizing OSA network adapter 1911 for communication to NETWORK A 1915. Load balancing tool 2400 may determine that OSA adapter 1911 is experiencing failure. Load balancing tool 2400 may failover OSA adapter 1911 to OSA adapter 1912 by denying LPAR 1938-1, 1938-2 and 1938-3 access to network adapter 1911. In response, LPAR 1938-1, LPAR 1938-2 and LPAR 1938-3 may utilize OSA adapter 1912 for communication to NETWORK A 1915, thereby the communications utilizing OSA network adapter 1911 failover to OSA network adapter 1912. Process flow terminates at end block 2465. Alternatively, process flow may continue at start block 2405.

V. Privileged Network Access System

Figure 25A:
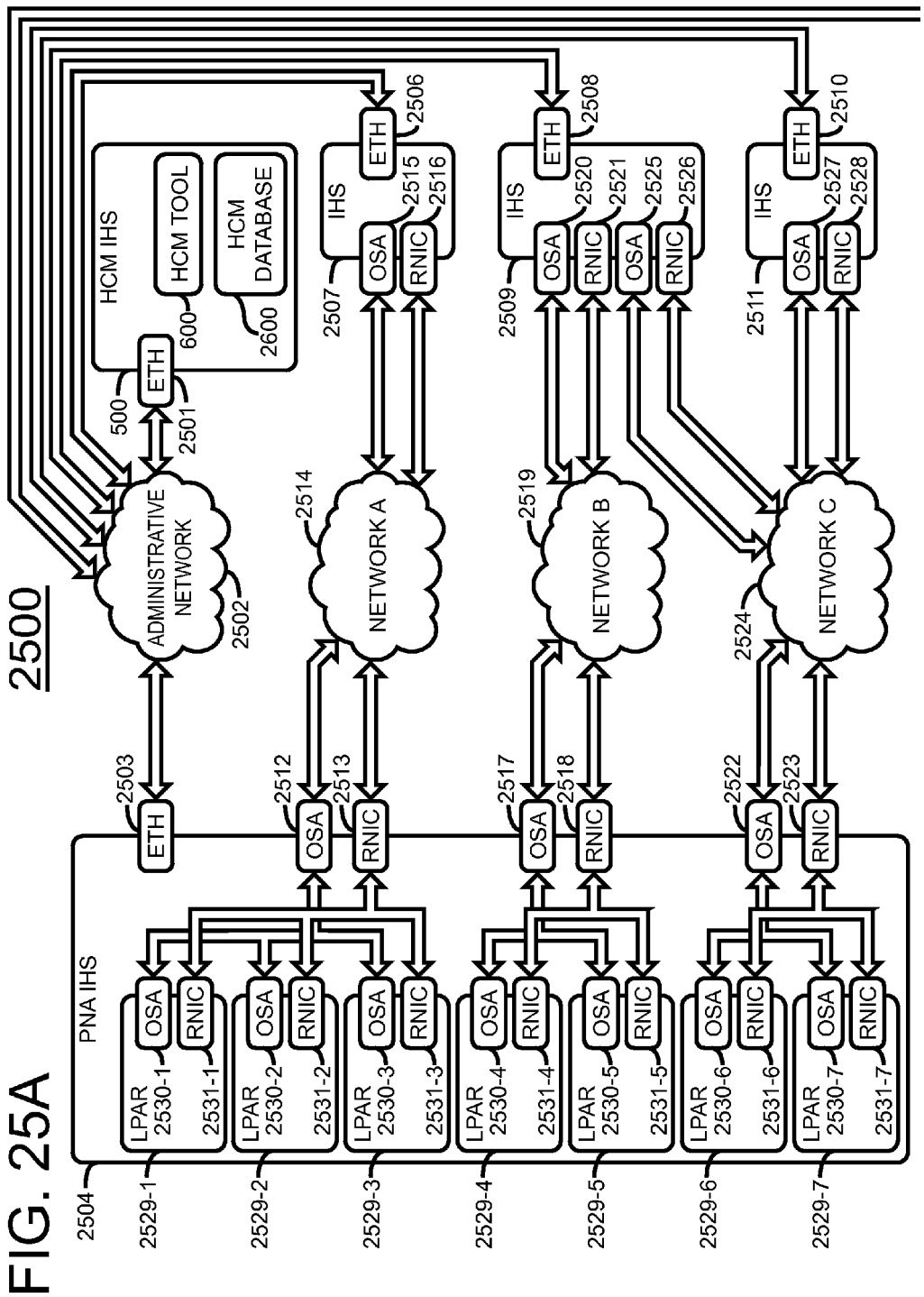
FIGS. 25A and 25B are block diagrams showing one embodiment of the disclosed privileged network access (PNA) system utilizing PNet IDs.
Figure 25B:
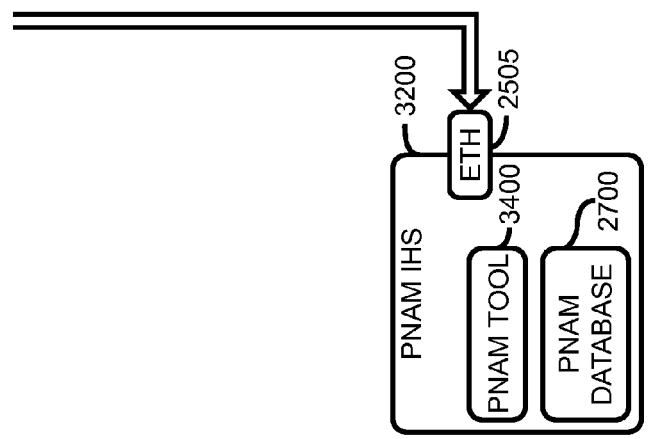

FIGS. 25A and 25B are block diagrams showing one embodiment of the disclosed privileged network access (PNA) system 2500 utilizing PNet IDs. PNA system 2500 may utilize network adapter 2501, administrative network 2502 and network adapter 2503 to couple HCM IHS 500 to administered IHS 2504. Administered IHS 2504 may also be referred to as PNA IHS 2504. PNA system 2500 may utilize network adapter 2501, administrative network 2502 and network adapter 2505 to couple HCM IHS 500 to privileged network access management (PNAM) IHS 3200. PNA system 2500 may utilize network adapter 2501, administrative network 2502 and network adapter 2506 to couple HCM IHS 500 to administered IHS 2507. PNA system 2500 may utilize network adapter 2501, administrative network 2502 and network adapter 2508 to couple HCM IHS 500 to administered IHS 2509. PNA system 2500 may utilize network adapter 2501, administrative network 2502 and network adapter 2510 to couple HCM IHS 500 to administered IHS 2511. Administered IHSs 2504, 2507, 2509 and 2511 couple via administrative network 2502 to HCM IHS 500 to enable HCM IHS 500 to administer HCM database 2600 with HCM tool 600 to the administered IHSs. Administered IHSs 2504, 2507, 2509 and 2511 couple via administrative network 2502 to PNAM IHS 3200 to enable PNAM IHS 3200 to administer PNAM database 2700 with PNAM tool 3400 to the administered IHSs.

PNA system 2500 may utilize network adapter 2512 and/or network adapter 2513 via NETWORK A 2514 via network adapter 2515 and/or network adapter 2516 to couple PNA IHS 2504 to administered IHS 2507. PNA system 2500 may utilize network adapter 2517 and/or network adapter 2518 via NETWORK B 2519 via network adapter 2520 and/or network adapter 2521 to couple PNA IHS 2504 to administered IHS 2509. PNA system 2500 may utilize network adapter 2522 and/or network adapter 2523 via NETWORK C 2524 via network adapter 2525 and/or network adapter 2526 to couple PNA IHS 2504 to administered IHS 2509. PNA system 2500 may utilize network adapter 2522 and/or network adapter 2523 via NETWORK C 2524 via network adapter 2527 and/or network adapter 2528 to couple PNA IHS 2504 to administered IHS 2511.

In one embodiment, network adapters 2501, 2503, 2505, 2506, 2508 and 2510 may be Ethernet (ETH) adapters. Network adapters 2512, 2515, 2517, 2520, 2522, 2525 and 2527 may be open system adapters (OSAs). Network adapters 2513, 2516, 2518, 2521, 2523, 2526 and 2528 may be remote direct memory access (RDMA) enabled network adapter controllers (RNICs). In one embodiment, administrative network 2502, NETWORK A 2514, NETWORK B 2519 and NETWORK C 2524 may provide local area network (LAN) communications and/or wide area network (WAN) communications and/or virtual LAN communications and/or intranet communications and/or Internet communications to structures that couple thereto.

PNA IHS 2504 may include a hypervisor (not shown) that may create logical partition (LPAR) 2529-1, LPAR 2529-2, LPAR 2529-3, LPAR 2529-4, LPAR 2529-5, LPAR 2529-6 and LPAR 2529-7 in PNA IHS 2504. LPAR 2529-1, LPAR 2529-2 and LPAR 2529-3 may include virtual network adapter 2530-1, virtual network adapter 2530-2 and virtual network adapter 2530-3, respectively. Virtual network adapter 2530-1, virtual network adapter 2530-2 and virtual network adapter 2530-3 may couple to network adapter 2512 via a channel, i.e., a bus. LPAR 2529-4 and LPAR 2529-5 may include virtual network adapter 2530-4 and virtual network adapter 2530-5, respectively. Virtual network adapter 2530-4 and virtual network adapter 2530-5 may couple to network adapter 2517 via a channel. LPAR 2529-6 and LPAR 2529-7 may include virtual network adapter 2530-6 and virtual network adapter 2530-7, respectively. Virtual network adapter 2530-6 and virtual network adapter 2530-7 may couple to network adapter 2522 via a channel.

LPAR 2529-1, LPAR 2529-2 and LPAR 2529-3 may include virtual network adapter 2531-1, virtual network adapter 2531-2 and virtual network adapter 2531-3, respectively. Virtual network adapter 2531-1, virtual network adapter 2531-2 and virtual network adapter 2531-3 may couple to network adapter 2513 via a channel. LPAR 2529-4 and LPAR 2529-5 may include virtual network adapter 2531-4 and virtual network adapter 2531-5, respectively. Virtual network adapter 2531-4 and virtual network adapter 2531-5 may couple to network adapter 2518 via a channel. LPAR 2529-6 and LPAR 2529-7 may include virtual network adapter 2531-6 and virtual network adapter 2531-7, respectively. Virtual network adapter 2531-6 and virtual network adapter 2531-7 may couple to network adapter 2523 via a channel.

FIG. 26 depicts one embodiment of HCM database 2600 in the disclosed privileged network access (PNA) system 2500. HCM tool 600 may store the hardware configuration information in HCM database 2600 on a per adapter basis. In one embodiment, for each network adapter in PNA system 2500, HCM tool 600 may store, from the leftmost column to the rightmost column, the machine serial number (MSN), physical identification (PID), logical identification (LID), adapter type, logical partition (LPAR) access list, physical network identification (PNet ID) network adapter.

As shown in HCM database 2600, the hardware configuration information of adapter 2512 includes MSN of 00CCC0AB2, PID of 0001, LID of 00F1, type of 0087, LPAR access list of 01, 02 and 03, and PNet ID 1 and PNet ID 2 of NETA. In other words, adapter 2512 is located in physical channel 0001 in PNA IHS 2504 and may be identified logically by PNA IHS 2504 as 00F1. Adapter 2512 is a physical OSA network adapter and couples to NETWORK A 2514 on both ports 1 and 2. LPAR 2529-1, 2529-2 and 2529-3 of PNA IHS 2504 may access adapter 2512 to communicate via NETWORK A 2514.

The hardware configuration information of adapter 2513 includes MSN of 00CCC0AB2, PID of 0111, LID of 00A1, type of 0008, LPAR access list of 01, 02 and 03, and PNet ID 1 and PNet ID 2 of NETA. In other words, adapter 2513 is located in physical channel 0111 in PNA IHS 2504 and may be identified logically by PNA IHS 2504 as 00A1. Adapter 2513 is a physical RNIC network adapter and couples to NETWORK A 2514 on both ports 1 and 2. LPAR 2529-1, 2529-2 and 2529-3 of PNA IHS 2504 may access adapter 2513 to communicate via NETWORK A 2514.

The hardware configuration information of adapter 2517 includes MSN of 00CCC0AB2, PID of 0002, LID of 00F5, type of 0087, LPAR access list of 04 and 05, and PNet ID 1 and PNet ID 2 of NETB. In other words, adapter 2517 is located in physical channel 0002 in PNA IHS 2504 and may be identified logically by PNA IHS 2504 as 00F5. Adapter 2517 is a physical OSA network adapter and couples to NETWORK B 2519 on both ports 1 and 2. LPAR 2529-4 and 2529-5 of PNA IHS 2504 may access adapter 2517 to communicate via NETWORK B 2519.

The hardware configuration information of adapter 2518 includes MSN of 00CCC0AB2, PID of 0112, LID of 00A5, type of 0008, LPAR access list of 04 and 05, and PNet ID 1 and PNet ID 2 of NETB. In other words, adapter 2518 is located in physical channel 0112 in PNA IHS 2504 and may be identified logically by PNA IHS 2504 as 00A5. Adapter 2518 is a physical RNIC network adapter and couples to NETWORK B 2519 on both ports 1 and 2. LPAR 2529-4 and 2529-5 of PNA IHS 2504 may access adapter 2518 to communicate via NETWORK B 2519.

The hardware configuration information of adapter 2522 includes MSN of 00CCC0AB2, PID of 0003, LID of 00F8, type of 0087, LPAR access list of 06 and 07, and PNet ID 1 and PNet ID 2 of NETC. In other words, adapter 2522 is located in physical channel 0003 in PNA IHS 2504 and may be identified logically by PNA IHS 2504 as 00F8. Adapter 2522 is a physical OSA network adapter and couples to NETWORK C 2524 on both ports 1 and 2. LPAR 2529-6 and 2529-7 of PNA IHS 2504 may access adapter 2522 to communicate via NETWORK C 2524.

The hardware configuration information of adapter 2523 includes MSN of 00CCC0AB2, PID of 0113, LID of 00A8, type of 0008, LPAR access list of 06 and 07, and PNet ID 1 and PNet ID 2 of NETC. In other words, adapter 2523 is located in physical channel 0113 in PNA IHS 2504 and may be identified logically by PNA IHS 2504 as 00A8. Adapter 2523 is a physical RNIC network adapter and couples to NETWORK C 2524 on both ports 1 and 2. LPAR 2529-6 and 2529-7 of PNA IHS 2504 may access adapter 2523 to communicate via NETWORK C 2524.

The hardware configuration information of adapter 2515 includes MSN of DFA22601, PID of 0001, LID of 00F4, type of 0087, LPAR access list with no entries, and PNet ID 1 and PNet ID 2 of NETA. In other words, adapter 2515 is located in physical channel 0001 in administered IHS 2507 and may be identified logically by administered IHS 2507 as 00F4. Adapter 2515 is a physical OSA network adapter and couples to NETWORK A 2514 on both ports 1 and 2. Administered IHS 2507 may access adapter 2515 to communicate via NETWORK A 2514.

The hardware configuration information of adapter 2516 includes MSN of DFA22601, PID of 0002, LID of 00A4, type of 0008, LPAR access list with no entries, and PNet ID 1 and PNet ID 2 of NETA. In other words, adapter 2516 is located in physical channel 0002 in administered IHS 2507 and may be identified logically by administered IHS 2507 as 00A4. Adapter 2516 is a physical RNIC network adapter and couples to NETWORK A 2514 on both ports 1 and 2. Administered IHS 2507 may access adapter 2516 to communicate via NETWORK A 2514.

The hardware configuration information of adapter 2520 includes MSN of 33300FB8, PID of 0001, LID of 00F5, type of 0087, LPAR access list with no entries, and PNet ID 1 and PNet ID 2 of NETB. In other words, adapter 2520 is located in physical channel 0001 in administered IHS 2509 and may be identified logically by administered IHS 2509 as 00F5. Adapter 2520 is a physical OSA network adapter and couples to NETWORK B 2519 on both ports 1 and 2. Administered IHS 2509 may access adapter 2520 to communicate via NETWORK B 2519.

The hardware configuration information of adapter 2521 includes MSN of 33300FB8, PID of 0011, LID of 00F6, type of 0008, LPAR access list with no entries, and PNet ID 1 and PNet ID 2 of NETB. In other words, adapter 2521 is located in physical channel 0011 in administered IHS 2509 and may be identified logically by administered IHS 2509 as 00F6. Adapter 2521 is a physical RNIC network adapter and couples to NETWORK B 2519 on both ports 1 and 2. Administered IHS 2509 may access adapter 2521 to communicate via NETWORK B 2519.

The hardware configuration information of adapter 2525 includes MSN of 33300FB8, PID of 0002, LID of 00A5, type of 0087, LPAR access list with no entries, and PNet ID 1 and PNet ID 2 of NETC. In other words, adapter 2525 is located in physical channel 0002 in administered IHS 2509 and may be identified logically by administered IHS 2509 as 00A5. Adapter 2525 is a physical OSA network adapter and couples to NETWORK C 2524 on both ports 1 and 2. Administered IHS 2509 may access adapter 2525 to communicate via NETWORK C 2524.

The hardware configuration information of adapter 2526 includes MSN of 33300FB8, PID of 0012, LID of 00A6, type of 0008, LPAR access list with no entries, and PNet ID 1 and PNet ID 2 of NETC. In other words, adapter 2526 is located in physical channel 0012 in administered IHS 2509 and may be identified logically by administered IHS 2509 as 00A6. Adapter 2526 is a physical RNIC network adapter and couples to NETWORK C 2524 on both ports 1 and 2. Administered IHS 2509 may access adapter 2526 to communicate via NETWORK C 2524.

The hardware configuration information of adapter 2527 includes MSN of 0000FC32, PID of 0031, LID of 0D01, type of 0087, LPAR access list with no entries, and PNet ID 1 and PNet ID 2 of NETC. In other words, adapter 2527 is located in physical channel 0031 in administered IHS 2511 and may be identified logically by administered IHS 2511 as 0D01. Adapter 2527 is a physical OSA network adapter and couples to NETWORK C 2524 on both ports 1 and 2. Administered IHS 2511 may access adapter 2527 to communicate via NETWORK C 2524.

The hardware configuration information of adapter 2528 includes MSN of 0000FC32, PID of 0033, LID of 0D03, type of 0008, LPAR access list with no entries, and PNet ID 1 and PNet ID 2 of NETC. In other words, adapter 2528 is located in physical channel 0033 in administered IHS 2511 and may be identified logically by administered IHS 2511 as 0D03. Adapter 2528 is a physical RNIC network adapter and couples to NETWORK C 2524 on both ports 1 and 2. Administered IHS 2511 may access adapter 2528 to communicate via NETWORK C 2524.

FIG. 27 depicts one embodiment of privileged network access management (PNAM) database 2700 in the disclosed PNA system 2500. PNAM tool 3400 may store the privileged network access information in PNAM database 2700 on a per PNet ID, per IHS basis. In one embodiment, for each network adapter in PNA system 2500, PNAM tool 3400 may store, from the leftmost column to the rightmost column, the physical network identification (PNet ID), the machine serial number (MSN) and the logical partition (LPAR) access list.

As shown in PNAM database 2700, the privileged network access information in the first row of PNAM database 2700 may include a PNet ID of NETB, MSN of 00CCC0AB2 and LPAR access list of 04 and 05. In other words, NETWORK B 2519 is a privileged network. A PNA tool 3300 may grant LPARs 2529-4 and 2529-5 in PNA IHS 2504 access to privileged NETWORK B 2519.

The privileged network access information in the second row of PNAM database 2700 may include a PNet ID of NETB, MSN of 33300FB8 and LPAR access list with no entries. In other words, NETWORK B 2519 is a privileged network. In one embodiment, a PNA tool 3300 may grant administered IHS 2509 access to privileged NETWORK B 2519.

The privileged network access information in the third row of PNAM database 2700 may include a PNet ID of NETC, MSN of 00CCC0AB2 and LPAR access list of 07. In other words, NETWORK C 2524 is a privileged network. A PNA tool 3300 may grant LPAR 2529-7 in PNA IHS 2504 access to privileged NETWORK C 2524. A PNA tool 330 may deny LPAR 2529-6 in PNA IHS 2504 access to privileged NETWORK C 2524, even though LPAR 2529-6 is coupled to NETWORK C 2524 via network adapters 2522 and 2523.

The privileged network access information in the fourth row of PNAM database 2700 may include a PNet ID of NETC, MSN of 33300FB8 and LPAR access list with no entries. In other words, NETWORK C 2524 is a privileged network. In one embodiment, a PNA tool 3300 may grant administered IHS 2509 access to privileged NETWORK C 2524.

The privileged network access information in the fifth row of PNAM database 2700 may include a PNet ID of NETC, MSN of 0000FC32 and LPAR access list with no entries. In other words, NETWORK C 2524 is a privileged network. In one embodiment, a PNA tool 3300 may grant administered IHS 2511 access to privileged NETWORK C 2524.

Figure 28A:
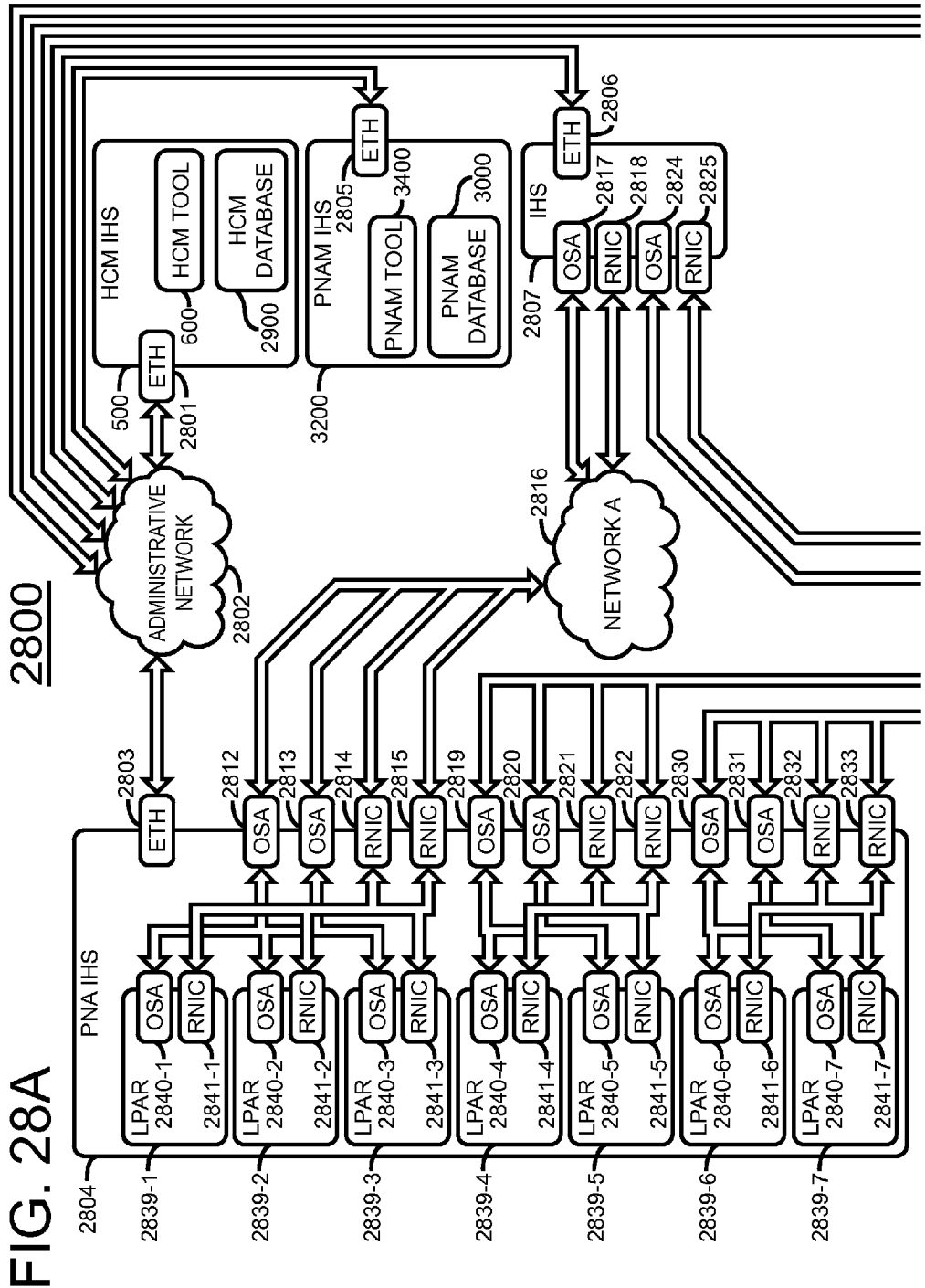
FIGS. 28A and 28B are block diagrams showing another embodiment of the disclosed privileged network access (PNA) system utilizing PNet IDs.
Figure 28B:
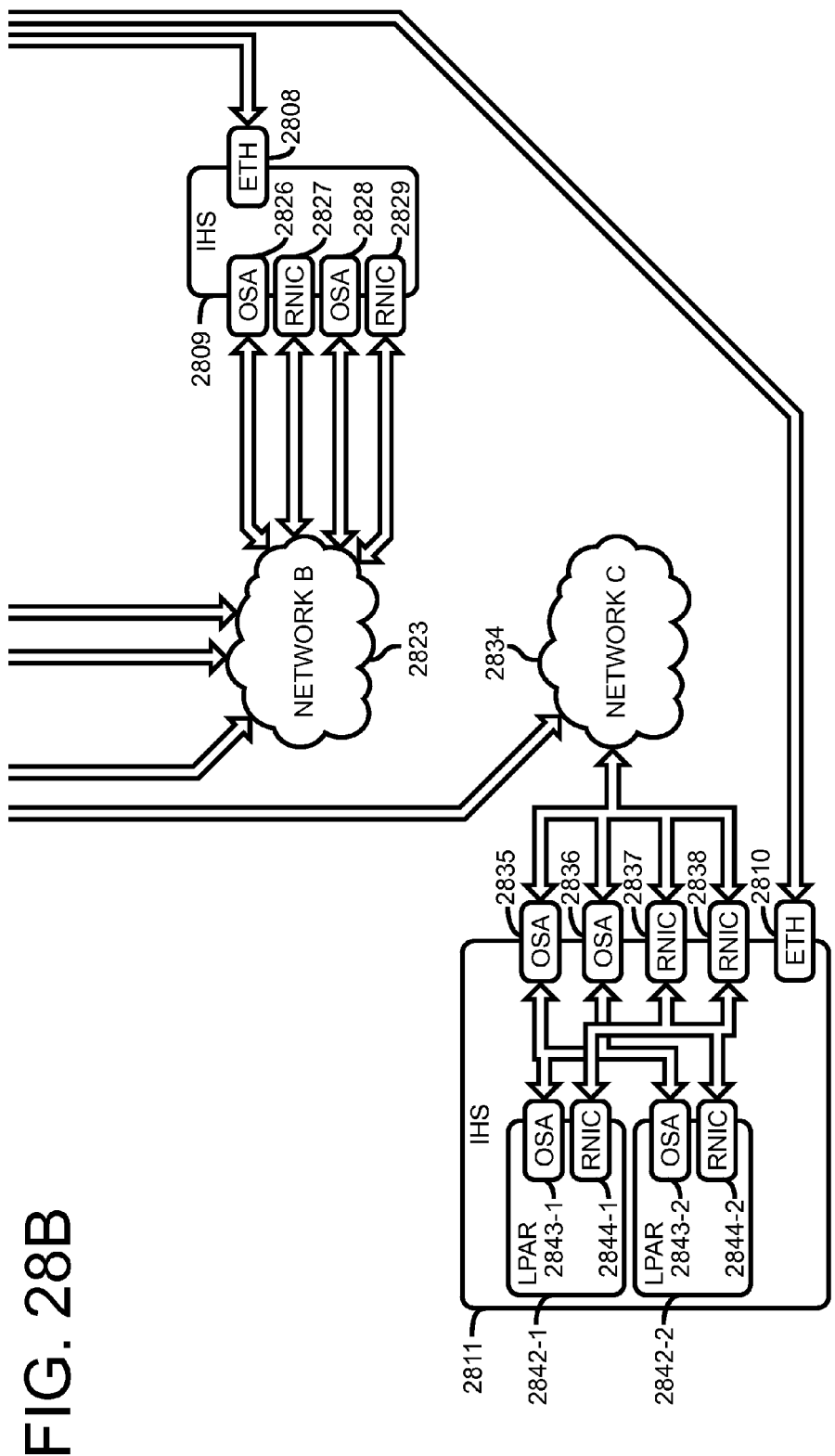

FIGS. 28A and 28B are block diagrams showing one embodiment of the disclosed PNA system 2800 utilizing PNet IDs. PNA system 2800 may utilize network adapter 2801, administrative network 2802 and network adapter 2803 to couple HCM IHS 500 to administered IHS 2804. Administered IHS 2804 may also be referred to as PNA IHS 2804. PNA system 2800 may utilize network adapter 2801, administrative network 2802 and network adapter 2805 to couple HCM IHS 500 to privileged network access management (PNAM) IHS 3200. PNA system 2800 may utilize network adapter 2801, administrative network 2802 and network adapter 2806 to couple HCM IHS 500 to administered IHS 2807. PNA system 2800 may utilize network adapter 2801, administrative network 2802 and network adapter 2808 to couple HCM IHS 500 to administered IHS 2809. PNA system 2800 may utilize network adapter 2801, administrative network 2802 and network adapter 2810 to couple HCM IHS 500 to administered IHS 2811. Administered IHSs 2804, 2807, 2809 and 2811 couple via administrative network 2802 to HCM IHS 500 to enable HCM IHS 500 to administer HCM database 2900 with HCM tool 600 to the administered IHSs. Administered IHSs 2804, 2807, 2809 and 2811 couple via administrative network 2802 to PNAM IHS 3200 to enable PNAM IHS 3200 to administer PNAM database 3000 with PNAM tool 3400 to the administered IHSs.

PNA system 2800 may utilize network adapter 2812 and/or network adapter 2813 and/or network adapter 2814 and/or network adapter 2815 via NETWORK A 2816 via network adapter 2817 and/or network adapter 2818 to couple PNA IHS 2804 to administered IHS 2807. PNA system 2800 may utilize network adapter 2819 and/or network adapter 2820 and/or network adapter 2821 and/or network adapter 2822 via NETWORK B 2823 via network adapter 2824 and/or network adapter 2825 to couple PNA IHS 2804 to administered IHS 2807. PNA system 2800 may utilize network adapter 2819 and/or network adapter 2820 and/or network adapter 2821 and/or network adapter 2822 via NETWORK B 2823 via network adapter 2826 and/or network adapter 2827 and/or network adapter 2828 and/or network adapter 2829 to couple PNA IHS 2804 to administered IHS 2809. PNA system 2800 may utilize network adapter 2830 and/or network adapter 2831 and/or network adapter 2832 and/or network adapter 2833 via NETWORK C 2834 via network adapter 2835 and/or network adapter 2836 and/or network adapter 2837 and/or network adapter 2838 to couple PNA IHS 2804 to administered IHS 2811.

In one embodiment, network adapters 2801, 2803, 2805, 2806, 2808 and 2810 may be Ethernet (ETH) adapters. Network adapters 2812, 2813, 2817, 2819, 2820, 2824, 2826, 2828, 2830, 2831, 2835 and 2836 may be open system adapters (OSAs). Network adapters 2814, 2815, 2818, 2821, 2822, 2824, 2827, 2829, 2832, 2833, 2837 and 2838 may be remote direct memory access (RDMA) enabled network adapter controllers (RNICs). In one embodiment, administrative network 2802, NETWORK A 2816, NETWORK B 2823 and NETWORK C 2834 may provide local area network (LAN) communications and/or wide area network (WAN) communications and/or virtual LAN communications and/or intranet communications and/or Internet communications to structures that couple thereto.

PNA IHS 2804 may include a hypervisor (not shown) that may create logical partition (LPAR) 2839-1, LPAR 2839-2, LPAR 2839-3, LPAR 2839-4, LPAR 2839-5, LPAR 2839-6 and LPAR 2839-7 in PNA IHS 2804. LPAR 2839-1, LPAR 2839-2 and LPAR 2839-3 may include virtual network adapter 2840-1, virtual network adapter 2840-2 and virtual network adapter 2840-3, respectively. Virtual network adapter 2840-1, virtual network adapter 2840-2 and virtual network adapter 2840-3 may couple to network adapter 2812 and network adapter 2813 via a channel, i.e., a bus. LPAR 2839-4 and LPAR 2839-5 may include virtual network adapter 2840-4 and virtual network adapter 2840-5, respectively. Virtual network adapter 2840-4 and virtual network adapter 2840-5 may couple to network adapter 2819 and network adapter 2820 via a channel. LPAR 2839-6 and LPAR 2839-7 may include virtual network adapter 2840-6 and virtual network adapter 2840-7, respectively. Virtual network adapter 2840-6 and virtual network adapter 2840-7 may couple to network adapter 2830 and network adapter 2831 via a channel.

LPAR 2839-1, LPAR 2839-2 and LPAR 2839-3 may include virtual network adapter 2841-1, virtual network adapter 2841-2 and virtual network adapter 2841-3, respectively. Virtual network adapter 2841-1, virtual network adapter 2841-2 and virtual network adapter 2841-3 may couple to network adapter 2814 and network adapter 2815 via a channel. LPAR 2839-4 and LPAR 2839-5 may include virtual network adapter 2841-4 and virtual network adapter 2841-5, respectively. Virtual network adapter 2841-4 and virtual network adapter 2841-5 may couple to network adapter 2821 and network adapter 2822 via a channel. LPAR 2839-6 and LPAR 2839-7 may include virtual network adapter 2841-6 and virtual network adapter 2841-7, respectively. Virtual network adapter 2841-6 and virtual network adapter 2841-7 may couple to network adapter 2832 and network adapter 2833 via a channel.

In one embodiment, administered IHS 2811 may be a PNA IHS. Administered IHS 2811 may include a hypervisor (not shown) that may create LPAR 2842-1 and LPAR 2842-2. LPAR 2842-1 and LPAR 2842-2 may include virtual network adapter 2843-1 and virtual network adapter 2843-2, respectively. Virtual network adapter 2843-1 and virtual network adapter 2843-2 may couple to network adapter 2835 and network adapter 2836 via a channel. LPAR 2842-1 and LPAR 2842-2 may include virtual network adapter 2844-1 and virtual network adapter 2844-2, respectively. Virtual network adapter 2844-1 and virtual network adapter 2844-2 may couple to network adapter 2837 and network adapter 2838 via a channel.

FIG. 29 depicts one embodiment of HCM database 2900 in the disclosed privileged network access (PNA) system 2800. HCM tool 600 may store the hardware configuration information in HCM database 2900 on a per adapter basis. In one embodiment, for each network adapter in PNA system 2800, HCM tool 600 may store, from the leftmost column to the rightmost column, the machine serial number (MSN), physical identification (PID), logical identification (LID), adapter type, logical partition (LPAR) access list, physical network identification (PNet ID) network adapter.

As shown in HCM database 2900, the hardware configuration information of adapter 2812 includes MSN of 000AFA11, PID of 0001, LID of 00F1, type of 0087, LPAR access list of 01, 02 and 03, and PNet ID 1 and PNet ID 2 of NETA. In other words, adapter 2812 is located in physical channel 0001 in PNA IHS 2804 and may be identified logically by PNA IHS 2804 as 00F1. Adapter 2812 is a physical OSA network adapter and couples to NETWORK A 2816 on both ports 1 and 2. LPAR 2839-1, 2839-2 and 2839-3 of PNA IHS 2804 may access adapter 2812 to communicate via NETWORK A 2816.

The hardware configuration information of adapter 2813 includes MSN of 000AFA11, PID of 0002, LID of 00F5, type of 0087, LPAR access list of 01, 02 and 03, and PNet ID 1 and PNet ID 2 of NETA. In other words, adapter 2813 is located in physical channel 0002 in PNA IHS 2804 and may be identified logically by PNA IHS 2804 as 00F5. Adapter 2813 is a physical OSA network adapter and couples to NETWORK A 2816 on both ports 1 and 2. LPAR 2839-1, 2839-2 and 2839-3 of PNA IHS 2804 may access adapter 2813 to communicate via NETWORK A 2816.

The hardware configuration information of adapter 2814 includes MSN of 000AFA11, PID of 0011, LID of 00A1, type of 0008, LPAR access list of 01, 02 and 03, and PNet ID 1 and PNet ID 2 of NETA. In other words, adapter 2814 is located in physical channel 0011 in PNA IHS 2804 and may be identified logically by PNA IHS 2804 as 00A1. Adapter 2814 is a physical RNIC network adapter and couples to NETWORK A 2816 on both ports 1 and 2. LPAR 2839-1, 2839-2 and 2839-3 of PNA IHS 2804 may access adapter 2814 to communicate via NETWORK A 2816.

The hardware configuration information of adapter 2815 includes MSN of 000AFA11, PID of 0012, LID of 00A5, type of 0008, LPAR access list of 01, 02 and 03, and PNet ID 1 and PNet ID 2 of NETA. In other words, adapter 2815 is located in physical channel 0012 in PNA IHS 2804 and may be identified logically by PNA IHS 2804 as 00A5. Adapter 2815 is a physical RNIC network adapter and couples to NETWORK A 2816 on both ports 1 and 2. LPAR 2839-1, 2839-2 and 2839-3 of PNA IHS 2804 may access adapter 2815 to communicate via NETWORK A 2816.

The hardware configuration information of adapter 2819 includes MSN of 000AFA11, PID of 0003, LID of 00F9, type of 0087, LPAR access list of 04 and 05, and PNet ID 1 and PNet ID 2 of NETB. In other words, adapter 2819 is located in physical channel 0003 in PNA IHS 2804 and may be identified logically by PNA IHS 2804 as 00F9. Adapter 2819 is a physical OSA network adapter and couples to NETWORK B 2823 on both ports 1 and 2. LPAR 2839-4 and 2839-5 of PNA IHS 2804 may access adapter 2819 to communicate via NETWORK B 2823.

The hardware configuration information of adapter 2820 includes MSN of 000AFA11, PID of 0004, LID of 00FC, type of 0087, LPAR access list of 04 and 05, and PNet ID 1 and PNet ID 2 of NETB. In other words, adapter 2820 is located in physical channel 0004 in PNA IHS 2804 and may be identified logically by PNA IHS 2804 as 00FC. Adapter 2820 is a physical OSA network adapter and couples to NETWORK B 2823 on both ports 1 and 2. LPAR 2839-4 and 2839-5 of PNA IHS 2804 may access adapter 2820 to communicate via NETWORK B 2823.

The hardware configuration information of adapter 2821 includes MSN of 000AFA11, PID of 0013, LID of 00A9, type of 0008, LPAR access list of 04 and 05, and PNet ID 1 and PNet ID 2 of NETB. In other words, adapter 2821 is located in physical channel 0013 in PNA IHS 2804 and may be identified logically by PNA IHS 2804 as 00A9. Adapter 2821 is a physical RNIC network adapter and couples to NETWORK B 2823 on both ports 1 and 2. LPAR 2839-4 and 2839-5 of PNA IHS 2804 may access adapter 2821 to communicate via NETWORK B 2823.

The hardware configuration information of adapter 2822 includes MSN of 000AFA11, PID of 0014, LID of 00AC, type of 0008, LPAR access list of 04 and 05, and PNet ID 1 and PNet ID 2 of NETB. In other words, adapter 2822 is located in physical channel 0014 in PNA IHS 2804 and may be identified logically by PNA IHS 2804 as 00AC. Adapter 2822 is a physical RNIC network adapter and couples to NETWORK B 2823 on both ports 1 and 2. LPAR 2839-4 and 2839-5 of PNA IHS 2804 may access adapter 2822 to communicate via NETWORK B 2823.

The hardware configuration information of adapter 2830 includes MSN of 000AFA11, PID of 0005, LID of 00FF, type of 0087, LPAR access list of 06 and 07, and PNet ID 1 and PNet ID 2 of NETC. In other words, adapter 2830 is located in physical channel 0005 in PNA IHS 2804 and may be identified logically by PNA IHS 2804 as 00FF. Adapter 2830 is a physical OSA network adapter and couples to NETWORK C 2834 on both ports 1 and 2. LPAR 2839-6 and 2839-7 of PNA IHS 2804 may access adapter 2830 to communicate via NETWORK C 2834.

The hardware configuration information of adapter 2831 includes MSN of 000AFA11, PID of 0006, LID of 0102, type of 0087, LPAR access list of 06 and 07, and PNet ID 1 and PNet ID 2 of NETC. In other words, adapter 2831 is located in physical channel 0006 in PNA IHS 2804 and may be identified logically by PNA IHS 2804 as 0102. Adapter 2831 is a physical OSA network adapter and couples to NETWORK C 2834 on both ports 1 and 2. LPAR 2839-6 and 2839-7 of PNA IHS 2804 may access adapter 2831 to communicate via NETWORK C 2834.

The hardware configuration information of adapter 2832 includes MSN of 000AFA11, PID of 0015, LID of 00AF, type of 0008, LPAR access list of 06 and 07, and PNet ID 1 and PNet ID 2 of NETC. In other words, adapter 2832 is located in physical channel 0015 in PNA IHS 2804 and may be identified logically by PNA IHS 2804 as 00AF. Adapter 2832 is a physical RNIC network adapter and couples to NETWORK C 2834 on both ports 1 and 2. LPAR 2839-6 and 2839-7 of PNA IHS 2804 may access adapter 2832 to communicate via NETWORK C 2834.

The hardware configuration information of adapter 2833 includes MSN of 000B2A11, PID of 0016, LID of 00B2, type of 0008, LPAR access list of 06 and 07, and PNet ID 1 and PNet ID 2 of NETC. In other words, adapter 2833 is located in physical channel 0016 in PNA IHS 2804 and may be identified logically by PNA IHS 2804 as 00B2. Adapter 2833 is a physical RNIC network adapter and couples to NETWORK C 2834 on both ports 1 and 2. LPAR 2839-6 and 2839-7 of PNA IHS 2804 may access adapter 2833 to communicate via NETWORK C 2834.

The hardware configuration information of adapter 2817 includes MSN of 0000FC32, PID of 0001, LID of 0D01, type of 0087, LPAR access list with no entries, and PNet ID 1 and PNet ID 2 of NETA. In other words, adapter 2817 is located in physical channel 0001 in administered IHS 2807 and may be identified logically by administered IHS 2807 as 0D01. Adapter 2817 is a physical OSA network adapter and couples to NETWORK A 2816 on both ports 1 and 2. Administered IHS 2807 may access adapter 2817 to communicate via NETWORK A 2816.

The hardware configuration information of adapter 2818 includes MSN of 0000FC32, PID of 0021, LID of 0D03, type of 0008, LPAR access list with no entries, and PNet ID 1 and PNet ID 2 of NETA. In other words, adapter 2818 is located in physical channel 0021 in administered IHS 2807 and may be identified logically by administered IHS 2807 as 0D03. Adapter 2818 is a physical RNIC network adapter and couples to NETWORK A 2816 on both ports 1 and 2. Administered IHS 2807 may access adapter 2818 to communicate via NETWORK A 2816.

The hardware configuration information of adapter 2824 includes MSN of 0000FC32, PID of 0002, LID of 0D02, type of 0087, LPAR access list with no entries, and PNet ID 1 and PNet ID 2 of NETB. In other words, adapter 2824 is located in physical channel 0002 in administered IHS 2807 and may be identified logically by administered IHS 2807 as 0D02. Adapter 2824 is a physical OSA network adapter and couples to NETWORK B 2823 on both ports 1 and 2. Administered IHS 2807 may access adapter 2824 to communicate via NETWORK B 2823.

The hardware configuration information of adapter 2825 includes MSN of 0000FC32, PID of 0022, LID of 0D04, type of 0008, LPAR access list with no entries, and PNet ID 1 and PNet ID 2 of NETB. In other words, adapter 2825 is located in physical channel 0022 in administered IHS 2807 and may be identified logically by administered IHS 2807 as 0D04. Adapter 2825 is a physical RNIC network adapter and couples to NETWORK B 2823 on both ports 1 and 2. Administered IHS 2807 may access adapter 2825 to communicate via NETWORK B 2823.

The hardware configuration information of adapter 2826 includes MSN of DDDD00AB, PID of 0001, LID of 0001, type of 0087, LPAR access list with no entries, and PNet ID 1 and PNet ID 2 of NETB. In other words, adapter 2826 is located in physical channel 0001 in administered IHS 2809 and may be identified logically by administered IHS 2809 as 0001. Adapter 2826 is a physical OSA network adapter and couples to NETWORK B 2823 on both ports 1 and 2. Administered IHS 2809 may access adapter 2826 to communicate via NETWORK B 2823.

The hardware configuration information of adapter 2827 includes MSN of DDDD00AB, PID of 0011, LID of 0003, type of 0008, LPAR access list with no entries, and PNet ID 1 and PNet ID 2 of NETB. In other words, adapter 2827 is located in physical channel 0011 in administered IHS 2809 and may be identified logically by administered IHS 2809 as 0003. Adapter 2827 is a physical RNIC network adapter and couples to NETWORK B 2823 on both ports 1 and 2. Administered IHS 2809 may access adapter 2827 to communicate via NETWORK B 2823.

The hardware configuration information of adapter 2828 includes MSN of DDDD00AB, PID of 0002, LID of 0002, type of 0087, LPAR access list with no entries, and PNet ID 1 and PNet ID 2 of NETB. In other words, adapter 2828 is located in physical channel 0002 in administered IHS 2809 and may be identified logically by administered IHS 2809 as 0002. Adapter 2828 is a physical OSA network adapter and couples to NETWORK B 2823 on both ports 1 and 2. Administered IHS 2809 may access adapter 2828 to communicate via NETWORK B 2823.

The hardware configuration information of adapter 2829 includes MSN of DDDD00AB, PID of 0022, LID of 0004, type of 0008, LPAR access list with no entries, and PNet ID 1 and PNet ID 2 of NETB. In other words, adapter 2829 is located in physical channel 0022 in administered IHS 2809 and may be identified logically by administered IHS 2809 as 0004. Adapter 2829 is a physical RNIC network adapter and couples to NETWORK B 2823 on both ports 1 and 2. Administered IHS 2809 may access adapter 2829 to communicate via NETWORK B 2823.

The hardware configuration information of adapter 2835 includes MSN of ACA000F1, PID of 0001, LID of 0081, type of 0087, LPAR access list of 01 and 02, and PNet ID 1 and PNet ID 2 of NETC. In other words, adapter 2835 is located in physical channel 0001 in PNA IHS 2811 and may be identified logically by PNA IHS 2811 as 0061. Adapter 2835 is a physical OSA network adapter and couples to NETWORK C 2834 on both ports 1 and 2. LPAR 2842-1 and 2842-2 of PNA IHS 2811 may access adapter 2835 to communicate via NETWORK C 2834.

The hardware configuration information of adapter 2836 includes MSN of ACA000F1, PID of 0002, LID of 00B4, type of 0087, LPAR access list of 01 and 02, and PNet ID 1 and PNet ID 2 of NETC. In other words, adapter 2836 is located in physical channel 0002 in PNA IHS 2811 and may be identified logically by PNA IHS 2811 as 00B4. Adapter 2836 is a physical OSA network adapter and couples to NETWORK C 2834 on both ports 1 and 2. LPAR 2842-1 and 2842-2 of PNA IHS 2811 may access adapter 2836 to communicate via NETWORK C 2834.

The hardware configuration information of adapter 2837 includes MSN of ACA000F1, PID of 0021, LID of 00C1, type of 0008, LPAR access list of 01 and 02, and PNet ID 1 and PNet ID 2 of NETC. In other words, adapter 2837 is located in physical channel 0021 in PNA IHS 2811 and may be identified logically by PNA IHS 2811 as 00C1. Adapter 2837 is a physical RNIC network adapter and couples to NETWORK C 2834 on both ports 1 and 2. LPAR 2842-1 and 2842-2 of PNA IHS 2811 may access adapter 2837 to communicate via NETWORK C 2834.

The hardware configuration information of adapter 2838 includes MSN of ACA000F1, PID of 0022, LID of 00C4, type of 0008, LPAR access list of 01 and 02, and PNet ID 1 and PNet ID 2 of NETC. In other words, adapter 2838 is located in physical channel 0022 in PNA IHS 2811 and may be identified logically by PNA IHS 2811 as 00C4. Adapter 2838 is a physical RNIC network adapter and couples to NETWORK C 2834 on both ports 1 and 2. LPAR 2842-1 and 2842-2 of PNA IHS 2811 may access adapter 2838 to communicate via NETWORK C 2834.

FIG. 30 depicts one embodiment of privileged network access management (PNAM) database 3000 in the disclosed PNA system 2800. PNAM tool 3400 may store the privileged network access information in PNAM database 2900 on a per PNet ID, per IHS basis. In one embodiment, for each network adapter in PNA system 2800, PNAM tool 3400 may store, from the leftmost column to the rightmost column, the physical network identification (PNet ID), the machine serial number (MSN) and the logical partition (LPAR) access list.

As shown in PNAM database 3000, the privileged network access information in the first row of PNAM database 3000 may include a PNet ID of NETB, MSN of 000AFA11 and LPAR access list of 04 and 05. In other words, NETWORK B 2823 is a privileged network. PNA tool 3300 may grant LPARs 2839-4 and 2839-5 in PNA IHS 2804 access to privileged NETWORK B 2823.

The privileged network access information in the second row of PNAM database 3000 may include a PNet ID of NETB, MSN of 0000FC32 and LPAR access list with no entries. In other words, NETWORK B 2823 is a privileged network. In one embodiment, PNA tool 3300 may grant administered IHS 2807 access to privileged NETWORK B 2823.

The privileged network access information in the third row of PNAM database 3000 may include a PNet ID of NETB, MSN of DDDD00AB and LPAR access list with no entries. In other words, NETWORK B 2823 is a privileged network. In one embodiment, PNA tool 3300 may grant administered IHS 2809 access to privileged NETWORK B 2823.

The privileged network access information in the fourth row of PNAM database 3000 may include a PNet ID of NETC, MSN of 000AFA11 and LPAR access list of 07. In other words, NETWORK C 2823 is a privileged network. PNA tool 3300 may grant LPAR 2839-7 in PNA IHS 2804 access to privileged NETWORK C 2834. PNA tool 330 may deny LPAR 2839-6 in PNA IHS 2804 access to privileged NETWORK C 2834, even though LPAR 2839-6 is coupled to NETWORK C 2834 via network adapters 2830, 2831, 2832 and 2833.

The privileged network access information in the fifth row of PNAM database 3000 may include a PNet ID of NETC, MSN of ACA000F1 and LPAR access list of 02. In other words, NETWORK C 2823 is a privileged network. PNA tool 3300 may grant LPAR 2842-2 in PNA IHS 2811 access to privileged NETWORK C 2834. PNA tool 330 may deny LPAR 2842-1 in PNA IHS 2811 access to privileged NETWORK C 2834, even though LPAR 2842-1 is coupled to NETWORK C 2834 via network adapters 2835, 2836, 2837 and 2838.

FIG. 31 is a block diagram of a privileged network access (PNA) information handling system (IHS) 3100 that may be used in the disclosed PNA system. With respect to FIG. 11, like numbers indicate like elements. PNA IHS 3100 includes a processor 3105 that may include multiple cores. RNIC converging IHS 3100 processes, transfers, communicates, modifies, stores or otherwise handles information in digital form, analog form or other form. In one embodiment, PNA IHS 3100 includes a bus 3110, i.e. channel 3110. In another embodiment, bus 3110 may be multiple busses, i.e., multiple channels. Bus 3110 may couple processor 3105 to memory 3115 via a memory controller 3120 and memory bus 3125. System memory 3115 may also be referred to as main memory. System memory 3115 may be a static random access memory (SRAM) array or a dynamic random access memory (DRAM) array. Processor 3105 may also include local memory such as L1, L2 and L3 caches.

In one embodiment, a video graphics controller 3130 couples display 3135 to bus 3110. In another embodiment, PNA IHS 3100 may operate without display 3135 and/or video graphics controller 3130. Nonvolatile storage 3140, such as a hard disk drive, solid-state drive (SSD), CD drive, DVD drive, or other nonvolatile storage couples to bus 3110 to provide PNA IHS 3100 with permanent storage of information. System memory 3115 and nonvolatile storage 3140 are both forms of memory stores. In one embodiment, nonvolatile storage 3140 stores a hypervisor 3145 (HYPERVISOR) that governs operation of PNA IHS 3100. In another embodiment, nonvolatile storage 3140 may store an operating system (not shown) that governs operation of PNA IHS 3100. In another embodiment, nonvolatile storage 3140 may store an operating system (not shown) that governs operation of PNA IHS 3100, where the operating system includes a hypervisor (not shown).

I/O devices 3150, such as speakers, a keyboard and a pointing device, may couple to bus 3110 via I/O controller 3155 and I/O bus 3160. One or more expansion busses 3165, i.e. channels 3165, such as USB, IEEE 1394 bus, ATA, SATA, PCI, PCIE, DVI, HDMI and other busses, i.e. channels, couple to bus 3110 to facilitate the connection of peripherals and devices to PNA IHS 3100. Network interface controllers (NICs), for example, NIC 3170-1, NIC 3170-2, . . . , NIC 3170-G, wherein G is the number of NICs, may couple to bus 3110 to enable PNA IHS 3100 to connect by wire or wirelessly to a network and other information handling systems. NIC 3170-1, NIC 3170-2, . . . , NIC 3170-G may also be called a network communication adapter, network interface adapter, network adapter, network interface or an adapter. NIC 3170-1, NIC 3170-2, . . . , NIC 3170-G may take many forms. For example, NIC 3170-1, NIC 3170-2, . . . , NIC 3170-G may take the form of an Ethernet (ETH) adapter, open systems adapter (OSA), RDMA enabled network interface controller (RNIC) or other network communication adapter.

While FIG. 31 shows one IHS that employs processor 3105, the IHS may take many forms. For example, PNA IHS 3100 may take the form of a mainframe, server, central processor complex (CPC), desktop, portable, laptop, notebook, tablet or other form factor computer or data processing system. PNA IHS 3100 may take other form factors such as a gaming device, a personal digital assistant (PDA), a portable telephone device, a communication device or other devices that include a processor and memory.

PNA IHS 3100 includes a PNA tool computer program product 3300 on digital media 3175 such as a CD, DVD or other media. For simplicity, the term PNA tool will be used below. PNA IHS 3100 may store PNA tool 3300 in nonvolatile storage 3140 as PNA tool 3300'. PNA IHS 3100 may also store hypervisor 3145 (HYPERVISOR) and logical partition (LPAR) 3180-1, LPAR 3180-2, . . . , LPAR 3180-F, wherein F is the number of LPARs, in nonvolatile storage 3140.

In another embodiment, PNA tool 3300' may be part of the hypervisor 3145 (not shown). In another embodiment, PNA tool 3300' may be in LPAR 3180-1, LPAR 3180-2, . . . , LPAR 3180-F. In another embodiment, PNA IHS 3100 may store an operating system (not shown) that governs operation of PNA IHS 3100, where the operating system includes a hypervisor (not shown) and where the operating system includes LPAR 3180-1, LPAR 3180-2, . . . , LPAR 3180-F as virtual machines (not shown). When PNA IHS 3100 initializes, the IHS loads hypervisor 3145 into system memory 3115 for execution as hypervisor 3145'. PNA IHS 3100 also loads PNA tool 3300' into system memory 3115 for execution as PNA tool 3300". PNA IHS 3100 may also load LPAR 3180-1, LPAR 3180-2, . . . , LPAR 3180-F into system memory 3115 for execution as LPAR 3180-1', LPAR 3180-2', . . . , LPAR 3180-F', respectively.

In another embodiment, when PNA IHS 3100 initializes, the IHS may load an operating system (not shown) into system memory 3115 for execution. In another embodiment, when PNA IHS 3100 initializes, the IHS may load an operating system (not shown) that includes a hypervisor (not shown) and includes LPAR 3180-1, LPAR 3180-2, . . . , LPAR 3180-F as virtual machines (not shown) into system memory 3115 for execution.

Figure 32:
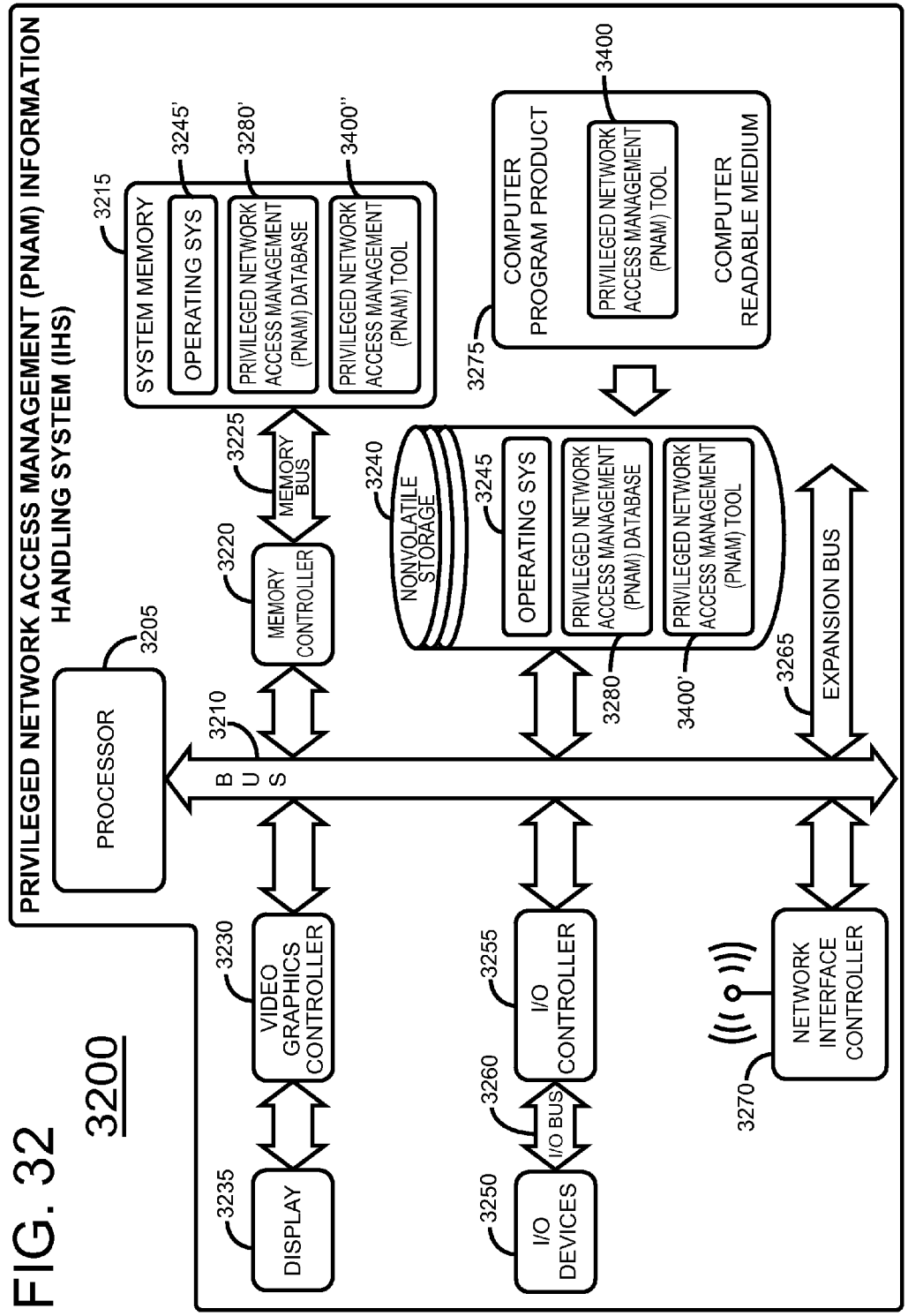
FIG. 32 is a block diagram of a privileged network access management (PNAM) IHS that may be used in the disclosed privileged network access system.

FIG. 32 is a block diagram of a privileged network access management (PNAM) IHS 3200 that may be used in the disclosed privileged network access system. Like numbers indicate like elements with respect to FIG. 5. PNAM IHS 3200 includes a processor 3205 that may include multiple cores. PNAM IHS 3200 processes, transfers, communicates, modifies, stores or otherwise handles information in digital form, analog form or other form. PNAM IHS 3200 includes a bus 3210 that couples processor 3205 to memory 3215 via a memory controller 3220 and memory bus 3225. System memory 3215 may also be referred to as main memory. System memory 3215 may be a static random access memory (SRAM) array or a dynamic random access memory (DRAM) array. Processor 3205 may also include local memory such as L1, L2 and L3 caches. A video graphics controller 3230 couples display 3235 to bus 3210. Nonvolatile storage 3240, such as a hard disk drive, solid-state drive (SSD), CD drive, DVD drive, or other nonvolatile storage couples to bus 3210 to provide PNAM IHS 3200 with permanent storage of information. System memory 3215 and nonvolatile storage 3240 are both forms of memory stores. Nonvolatile storage 3240 stores an operating system 3245 (OPERATING SYS) that governs operation of PNAM IHS 3200. I/O devices 3250, such as speakers, a keyboard and a pointing device, couple to bus 3210 via I/O controller 3255 and I/O bus 3260.

One or more expansion busses 3265, such as USB, IEEE 1394 bus, ATA, SATA, PCI, PCIE, DVI, HDMI and other busses, couple to bus 3210 to facilitate the connection of peripherals and devices to PNAM IHS 3200. A network interface controller (NIC) 3270 couples to bus 3210 to enable PNAM IHS 3200 to connect by wire or wirelessly to a network and other information handling systems. NIC 3270 may also be called a network communication adapter, network interface adapter, network adapter, network interface or an adapter. NIC 3270 may take many forms. For example, NIC 3270 may take the form of an Ethernet (ETH) adapter, open systems adapter (OSA), RDMA enabled network interface controller (RNIC) or other network communication adapter.

While FIG. 32 shows one IHS that employs processor 3205, the IHS may take many forms. For example, PNAM IHS 3200 may take the form of a desktop, portable, laptop, notebook, tablet or other form factor computer or data processing system. PNAM IHS 3200 may take other form factors such as a gaming device, a personal digital assistant (PDA), a portable telephone device, a communication device or other devices that include a processor and memory.

PNAM IHS 3200 includes a privileged network access management (PNAM) tool computer program product 3400 on digital media 3275 such as a CD, DVD or other media. For simplicity, the term PNAM tool will be used below. PNAM IHS 3200 may store PNAM tool 3400 in nonvolatile storage 3240 as PNAM tool 3400'. PNAM IHS 3200 may also store operating system 3245 (OPERATING SYS) and PNAM database 3280 in nonvolatile storage 3240. When PNAM IHS 3200 initializes, the IHS loads operating system 3245 into system memory 3215 for execution as operating system 3245'. PNAM IHS 3200 also loads PNAM database 3280 and PNAM tool 3400' into system memory 3215 for execution as PNAM database 3280' and PNAM tool 3400", respectively.

Figure 33:
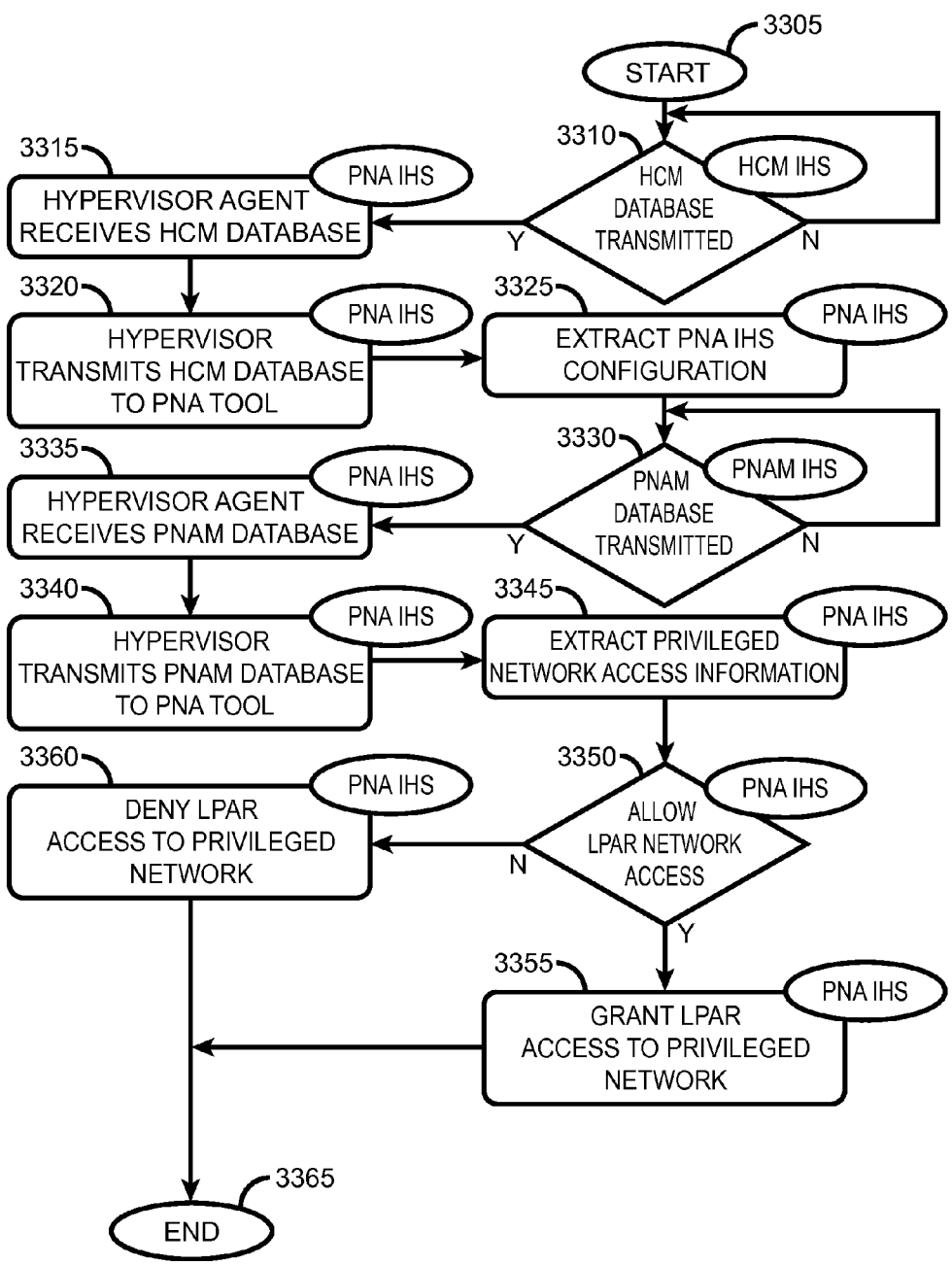
FIG. 33 is a flowchart that shows a representative process flow of a privileged network access tool (PNA) that may be used in the disclosed privileged network access system.

FIG. 33 is a flowchart that shows a representative process flow of a privileged network access (PNA) tool 3300 that may be used in the disclosed privileged network access system. Process flow commences when PNA tool 3300 in PNA IHS 3100 initializes, as per block 3305. If HCM tool 600 in HCM IHS 500 does not transmit HCM database 580, as per decision block 3310, process flow continues at decision block 3310. If HCM tool 600 in HCM IHS 500 does transmit HCM database 580, as per decision block 3310, a hypervisor agent in PNA IHS 3100 may receive HCM database 580, as per block 3315. In one embodiment, the hypervisor agent in the PNA IHS 3100 is included in hypervisor 3145.

The hypervisor agent may allow hypervisor 3145 to access HCM database 580. Hypervisor 3145 may transmit HCM database 580 to PNA tool 3300, as per block 3320. PNA tool 3300 may extract the hardware configuration information of PNA IHS 3100 from the HCM database 580, as per block 3325. In one embodiment, the hardware configuration information of PNA IHS 3100 from HCM database 580 may include, but is not limited to, on a per adapter basis, machine serial numbers (MSNs), physical identifications (PIDs), logical identifications (LIDs), adapter types, a logical partition (LPAR) access list, a physical network identification (PNet ID) of the first port of the adapter and a PNet ID of the second port of the adapter. In one embodiment, the adapter type "0087" may be an OSA network adapter and the adapter type "0008" may be an RNIC network adapter.

In one embodiment, the PNA tool 3300 may share the extracted hardware configuration information of PNA IHS 3100 with hypervisor 3145. Hypervisor 3145 may update the hardware configuration of PNA IHS 3100 with the extracted hardware configuration information of PNA IHS 3100. In another embodiment, the PNA tool 3300 may share the extracted hardware configuration information of PNA IHS 3100 with LPARs 3180-1, 3180-2, ..., 3180-F, where F is the number of LPARs in PNA IHS 3100. LPARs 3180-1, 3180-2, ..., 3180-F may update their respective hardware configuration with the extracted hardware configuration information of PNA IHS 3100.

If PNAM tool 3400 in privileged network access management (PNAM) IHS 3200 does not transmit PNAM database 3280, as per decision block 3330, process flow continues at decision block 3330. If PNAM tool 3400 in PNAM IHS 3200 does transmit PNAM database 3280, as per decision block 3330, a hypervisor agent in PNA IHS 3100 may receive PNAM database 3280, as per block 3335.

The hypervisor agent may allow hypervisor 3145 to access PNAM database 3280. Hypervisor 3145 may transmit PNAM database 3280 to PNA tool 3300, as per block 3340. PNA tool 3300 may extract the privileged network access information of PNA IHS 3100 from the PNAM database 3280, as per block 3345. In one embodiment, the privileged network access information of PNA IHS 3100 from PNAM database 3280 may include, but is not limited to, on a per PNet ID, per IHS basis, PNet IDs, MSNs and logical partition (LPAR) access lists.

In one embodiment, the PNA tool 3300 may share the extracted privileged network access information of PNA IHS 3100 with hypervisor 3145. Hypervisor 3145 may update the privileged network access information of PNA IHS 3100 with the extracted privileged network access information of PNA IHS 3100. In another embodiment, the PNA tool 3300 may share the extracted privileged network access information of PNA IHS 3100 with LPARs 3180-1, 3180-2, ..., 3180-F, where F is the number of LPARs in PNA IHS 3100. LPARs 3180-1, 3180-2, ..., 3180-F may update their respective privileged network access information with the extracted privileged network access information of PNA IHS 3100.

Utilizing the extracted hardware configuration information and the extracted privileged network access information, PNA tool 3300 may determine if a particular LPAR is allowed to access a particular privileged network, as per decision block 3350. PNA tool 3300 may determine that a particular LPAR is allowed to access a particular privileged network, as per decision block 3350. PNA tool 3300 may grant the particular LPAR access to the particular privileged network, as per block 3355.

For example, as shown in FIGS. 25A, 25B and 26, LPAR 2529-7 in PNA IHS 2504 may attempt to access privileged NETWORK C 2524. PNA tool 3300 may determine from the extracted hardware configuration information from HCM database 2600 that LPAR 2529-7 has access to network adapters 2522 and 2523 that both have a PNet ID of "NETC". PNA tool 330 may determine from the extracted privileged network access information from PNAM database 2700 that PNet IDs "NETB" and "NETC" are the PNet IDs of privileged NETWORK B 2519 and privileged NETWORK C 2524. PNA tool 300 may determine from the extracted privileged network access information from PNAM database 2700 that LPAR 2529-4 and LPAR 2529-5 of PNA IHS 2504, i.e. MSN 00CCC0AB2 are allowed to access privileged networks with a PNet ID of "NETB" and that LPAR 2529-7 of PNA IHS 2504 is allowed to access privileged networks with a PNet ID of "NETC". PNA tool 3300 may grant LPAR 2529-7 of PNA IHS 2504 access to privileged NETWORK C 2524. Process flow terminates at end block 3365.

PNA tool 3300 may determine that a particular LPAR is not allowed to access a particular privileged network, as per decision block 3350. PNA tool 3300 may deny the particular LPAR access to the particular privileged network, as per block 3360. For example, as shown in FIGS. 25A, 25B and 26, LPAR 2529-7 in PNA IHS 2504 may attempt to access privileged NETWORK C 2524. PNA tool 3300 may determine from the extracted hardware configuration information from HCM database 2600 that LPAR 2529-7 has access to network adapters 2522 and 2523 that both have a PNet ID of "NETC". PNA tool 330 may determine from the extracted privileged network access information from PNAM database 2700 that PNet IDs "NETB" and "NETC" are the PNet IDs of privileged NETWORK B 2519 and privileged NETWORK C 2524.

PNA tool 300 may determine from the extracted privileged network access information from PNAM database 2700 that LPAR 2529-4 and LPAR 2529-5 of PNA IHS 2504, i.e. MSN 00CCC0AB2 are allowed to access privileged networks with a PNet ID of "NETB" and that LPAR 2529-7 of PNA IHS 2504 is allowed to access privileged networks with a PNet ID of "NETC". PNA tool 3300 may grant LPAR 2529-7 of PNA IHS 2504 access to privileged NETWORK C 2524. Process flow terminates at end block 3365. Process flow terminates at end block 3365. Alternatively, process flow may continue at start block 3305.

Figure 34:
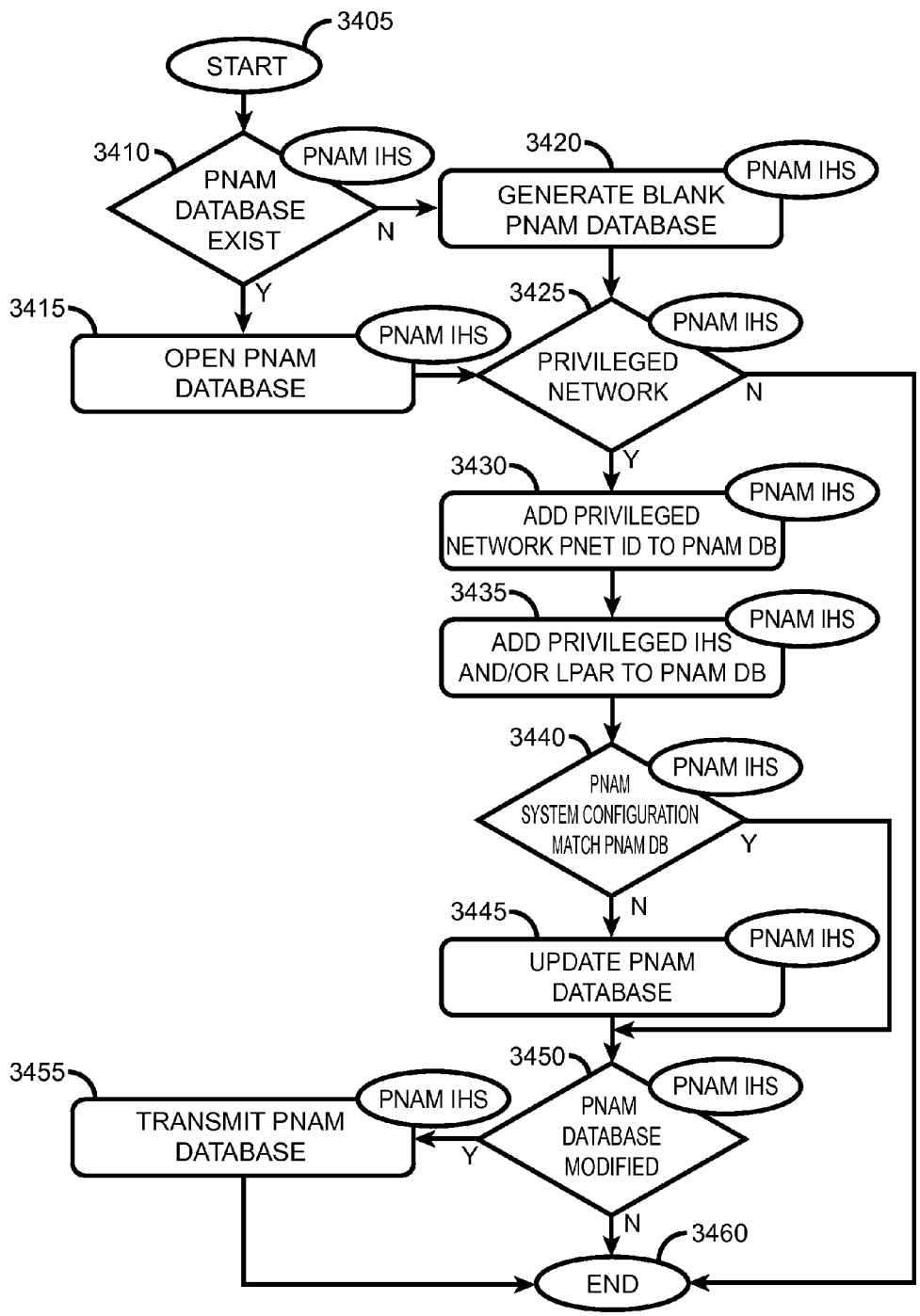
FIG. 34 is a flowchart that shows a representative process flow of a privileged network access management (PNAM) tool that may be used in the disclosed privileged network access system.

FIG. 34 is a flowchart that shows a representative process flow of a privileged network access management (PNAM) tool 3400 that may be used in the disclosed privileged network access system. Process flow commences when PNAM tool 3400 in PNAM IHS 3200 is initialized, as per block 3405. PNAM tool 3400 may determine if PNAM database 3280 exists in PNAM IHS 3200, as per block 3410. If PNAM database 3280 exists in PNAM IHS 3200, PNAM tool 3400 opens PNAM database 3280 for modification, as per block 3415. However, if PNAM database 3280 does not exist in PNAM IHS 3200, PNAM tool 3400 generates a blank PNAM database 3280 in PNAM IHS 3200 and opens the PNAM database 3280 for modification, as per block 3420.

PNAM database 3280 may store entries on a per privileged network, per PNA IHS basis, i.e., each row in PNAM database 3280 may contain information that pertains to the PNet ID of a particular privileged access network that couples to a particular PNA IHS, to which the particular PNA IHS may have access. Process flow continues as PNAM tool 3400 checks the PNA system for IHSs with access to privileged networks, as per block 3425. If PNAM tool 3400 determines that the PNA system does not include PNA IHSs with access to privileged access networks, as per block 3425, process flow terminates at end block 3460.

If PNAM tool 3400 determines that the PNA system includes PNA IHSs with access to privileged access networks, PNAM tool 3400 may add the PNet IDs of the privileged access networks to which the PNA IHSs have privileged access, to PNAM database 3280, as per block 3430. For example, PNAM tool 3400 may add the PNet ID of "NETB" to PNAM database 3280 for privileged NETWORK B 2519, to which PNA IHS 2504 has privileged access. In one embodiment, a user may input PNet IDs of physical networks to the PNAM tool 3400. PNAM tool 3400 may then store the input PNet IDs of the physical networks in PNAM database 3280, thereby listing the PNet IDs and respective physical networks as privileged access networks.

PNAM tool 3400 may modify rows of PNAM database 3280 to include the PNA IHSs and/or logical partition (LPAR) designations of LPARs in the particular PNA IHS that may access each particular network adapter, as per block 3435. For example, as shown in FIGS. 25A, 25B and 27, PNAM tool 3400 may modify the first row of PNAM database 2700, that has a "PNET ID" of "NET B" to include the "MSN" of PNA IHS 2504, "0CCC0AB2" and the "LPAR ACCESS LIST" to include LPARs "04" and "05", thereby listing that LPAR 2529-4 and LPAR 2529-5 in PNA IHS 2504 may access privileged NETWORK B 2519. In one embodiment, a user may input LPAR designations of LPARs in particular PNA IHSs that may access particular privileged networks, to the PNAM tool 3400. The PNAM tool 3400 may then modify the rows of PNAM database 3280 to include the LPAR designations of LPARs in particular PNA IHSs that may access the particular privileged networks.

PNAM tool 3400 inspects the configuration of the PNA system that may include the PNet ID, MSN and LPAR access list on a per privileged network, per PNA IHS basis, as per block 3440. If PNAM tool 3400 determines that the PNA system configuration does not match PNAM database 3280, as per block 3440, PNAM tool 3400 updates the information stored in PNAM database 3280 with the inspected configuration of the PNA system, as per block 3445. In one embodiment, a user may view PNAM database 3280 with PNAM tool 3400 and determine if PNAM database 3280 matches the PNA system configuration. If PNAM database 3280 does not match the PNA system configuration, the user may input the PNA system configuration to the PNAM tool 3400. PNAM tool 3400 may store the PNA system configuration input by the user to PNAM database 3280.

If PNAM tool 3400 determines that the PNA system configuration does match PNAM database 3280, as per block 3440, process flow continues at block 3450. If PNAM tool 3400 determines that PNAM database 3280 has been modified and/or generated, as per block 3450, PNAM tool 3400 may transmit PNAM database 3280 to any or all PNA IHSs, as per block 3455. For example, as shown in FIGS. 25A and 25B, PNAM tool 3400 may transmit PNAM database 2700 to PNA IHS 2504, 2507, 2509 and/or 2511 via administrative network 2502. In one embodiment, a user may input or select a transmit command in PNAM tool 3400, causing PNAM tool 3400 to transmit PNAM database 3280 to any or all PNA IHSs. In another embodiment PNAM tool 3400 may transmit PNAM database 3280 to any or all PNA IHSs at a user specified time interval. If PNAM tool 3400 determines that the PNAM database 3280 has not been modified and/or generated, as per block 3450, process flow continues at block 3460. Process flow terminates at end block 3470. Alternatively, process flow may continue at start block 3405.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 6, 12, 18, 24, 33 and 34 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIGS. 6, 12, 18, 24, 33 and 34 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIGS. 6, 12, 18, 24, 33 and 34 described above.

The flowchart of FIGS. 6, 12, 18, 24, 33 and 34 illustrate the architecture, functionality, and operation of possible implementations of systems, methods and computer program products that perform analysis in accordance with various embodiments of the present invention. In this regard, each block in the flowcharts of FIGS. 7 and 8 may represent a module, segment, or portion of code, which comprises one or more executable instructions for implementing the specified logical function(s). It should also be noted that, in some alternative implementations, the functions noted in the block may occur out of the order noted in FIGS. 6, 12, 18, 24, 33 and 34. For example, two blocks shown in succession may, in fact, be executed substantially concurrently, or the blocks may sometimes be executed in the reverse order, depending upon the functionality involved. It will also be noted that each block of FIGS. 6, 12, 18, 24, 33 and 34 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A converging information handling system (IHS) comprising:
    a processor, and
    a memory coupled to the processor, the memory including
        a hypervisor that is configured to:
            receive from another IHS, via a network, a hardware configuration management (HCM) database that includes configuration information including physical network identifier (PNet IDs) entries and respective associated physical adapter type entries and respective associated logical partition (LPAR) access information entries;
            transmit the HCM database to a remote direct memory access network interface controller (RNIC) converging tool in the memory;
            wherein the RNIC converging tool extracts configuration information from the HCM database, the configuration information including PNet IDs entries and respective associated physical adapter type entries and respective associated logical partition (LPAR) access information entries, thus providing extracted RNIC converging configuration information;
            wherein the RNIC converging tool groups on a per PNet ID basis particular physical adapter types from the extracted RNIC converging configuration information to form a converged RNIC adapter comprising a first physical adapter having an RNIC adapter type and a second physical adapter, wherein the first physical adapter and the second physical adapter connect to a same physical network and wherein the first physical adapter and the second physical adapter function together to perform RDMA communications over the same physical network; and
            wherein the RNIC converging tool determines if the converging IHS and the another IHS include the particular physical adapter types to initiate an RDMA communication, and wherein the RNIC converging tool initiates an RDMA connection between the converging IHS and the another IHS if it is determined that the converging IHS and the another IHS include the particular physical adapter types to initiate an RDMA communication.

2. The converging IHS of claim 1, wherein the RNIC converging tool sorts, on a per PNet ID basis, the extracted RNIC converging configuration information, thus providing extracted RNIC converging configuration information sorted by PNet ID.

3. The converging IHS of claim 1, wherein the RNIC converging tool sorts, on a per physical adapter type basis, the extracted RNIC converging configuration information sorted by physical adapter type, thus providing extracted RNIC converging configuration information sorted by physical adapter type and further sorted by PNet ID.

4. The converging IHS of claim 1, wherein the converging IHS includes a first logical partition (LPAR) and the another IHS includes a second LPAR, wherein the first LPAR on the converging IHS communicates with the second LPAR on the another IHS via the same physical network.

5. The converging IHS of claim 1, wherein the RNIC converging tool extracts physical location information from the HCM database.

6. The converging IHS of claim 1, wherein the second physical adapter has an open system adapter (OSA) adapter type.

7. The converging IHS of claim 1, wherein the converged RNIC adapter initiates transport control protocol/Internet protocol (TCP/IP) communications over the same physical network.

8. The converging IHS of claim 4, wherein the first LPAR on the converging IHS communicates with the second LPAR on the another IHS using the converged RNIC adapter.

9. The converging IHS of claim 4, wherein the first LPAR on the converging IHS includes an RNIC type virtual network adapter and an OSA type virtual network adapter.

10. A computer program product comprising a non-transitory computer readable storage medium having a computer readable program stored therein, wherein the computer readable program, when executed on a converging information handling system (IHS), causes the converging IHS to:
    receive from another IHS, via a network, a hardware configuration management (HCM) database that includes configuration information including physical network identifier (PNet IDs) entries and respective associated physical adapter type entries and respective associated logical partition (LPAR) access information entries;
    transmit the HCM database to a remote direct memory access network interface controller (RNIC) converging tool in the memory;
    wherein the RNIC converging tool extracts configuration information from the HCM database, the configuration information including PNet IDs entries and respective associated physical adapter type entries and respective associated logical partition (LPAR) access information entries, thus providing extracted RNIC converging configuration information;

wherein the RNIC converging tool groups on a per PNet ID basis particular physical adapter types from the extracted RNIC converging configuration information to form a converged RNIC adapter comprising a first physical adapter having an RNIC adapter type and a second physical adapter, wherein the first physical adapter and the second physical adapter connect to a same physical network and wherein the first physical adapter and the second physical adapter function together to perform RDMA communications over the same physical network; and wherein the RNIC converging tool determines if the converging IHS and the another IHS include the particular physical adapter types to initiate an RDMA communication, and wherein the RNIC converging tool initiates an RDMA connection between the converging IHS and the another IHS if it is determined that the converging IHS and the another IHS include the particular physical adapter types to initiate an RDMA communication.

11. The computer program product of claim 10, wherein the RNIC converging tool sorts, on a per PNet ID basis, the extracted RNIC converging configuration information, thus providing extracted RNIC converging configuration information sorted by PNet ID.

12. The computer program product of claim 10, wherein the RNIC converging tool sorts, on a per physical adapter type basis, the extracted RNIC converging configuration information sorted by physical adapter type, thus providing extracted RNIC converging configuration information sorted by physical adapter type and further sorted by PNet ID.

13. The computer program product of claim 10, wherein the converging IHS includes a first logical partition (LPAR) and the another IHS includes a second LPAR, wherein the first LPAR on the converging IHS communicates with the second LPAR on the another IHS via the same physical network.

14. The computer program product of claim 13, wherein the first LPAR on the converging IHS communicates with the second LPAR on the another IHS using the converged RNIC adapter.

15. The computer program product of claim 13, wherein the first LPAR on the converging IHS includes an RNIC type virtual network adapter and an OSA type virtual network adapter.

16. The computer program product of claim 10, wherein the RNIC converging tool extracts physical location information from the HCM database.

17. The computer program product of claim 10, wherein the second physical adapter has an open system adapter (OSA) adapter type.

18. The computer program product of claim 10, wherein the converged RNIC adapter initiates transport control protocol/Internet protocol (TCP/IP) communications over the same physical network.

* * * * *